(12) United States Patent
Harish et al.

(10) Patent No.: US 10,663,314 B2
(45) Date of Patent: May 26, 2020

(54) DISTRIBUTED DATA PROCESSING SYSTEMS FOR PROCESSING REMOTELY CAPTURED SENSOR DATA

(71) Applicant: Allstate Insurance Company, Northbrook, IL (US)

(72) Inventors: Pratheek M. Harish, Ontario (CA); Benjamin Robertson Yeomans, Greensboro, NC (US); Alexander Herrmann, Chicago, IL (US); Kyle Patrick Schmitt, Chicago, IL (US); Dipti Karmarkar, Hoffman Estates, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/028,614

(22) Filed: Jul. 6, 2018

(65) Prior Publication Data
US 2019/0019355 A1 Jan. 17, 2019

Related U.S. Application Data

(60) Provisional application No. 62/571,108, filed on Oct. 11, 2017, provisional application No. 62/532,514, filed on Jul. 14, 2017.

(51) Int. Cl.
*G01C 21/36* (2006.01)
*H04L 29/08* (2006.01)
(Continued)

(52) U.S. Cl.
CPC ........ *G01C 21/3617* (2013.01); *G01C 21/20* (2013.01); *G01C 21/3461* (2013.01);
(Continued)

(58) Field of Classification Search
None
See application file for complete search history.

(56) References Cited

U.S. PATENT DOCUMENTS

| 7,522,069 B2 * | 4/2009 | Tunnell | G07C 5/085 340/539.13 |
|---|---|---|---|
| 8,346,477 B2 | 1/2013 | Harding | |

(Continued)

FOREIGN PATENT DOCUMENTS

| WO | 2010151559 A2 | 12/2010 |
| WO | 2016126786 A1 | 8/2016 |
| WO | 2016206765 A1 | 12/2016 |

OTHER PUBLICATIONS

Oct. 4, 2018—(WO) International Search Report & Written Opinion—PCT/US18/41396.

(Continued)

*Primary Examiner* — Backhean Tiv
(74) *Attorney, Agent, or Firm* — Banner & Witcoff, Ltd.

(57) ABSTRACT

Aspects of the disclosure relate to processing remotely captured sensor data. A computing platform having at least one processor, a communication interface, and memory may receive, via the communication interface, from a user computing device, sensor data captured by the user computing device using one or more sensors built into the user computing device. Subsequently, the computing platform may analyze the sensor data received from the user computing device by executing one or more data processing modules. Then, the computing platform may generate trip record data based on analyzing the sensor data received from the user computing device and may store the trip record data in a trip record database. In addition, the computing platform may generate user record data based on analyzing the sensor data (Continued)

received from the user computing device and may store the user record data in a user record database.

20 Claims, 20 Drawing Sheets

(51) Int. Cl.
| | |
|---|---|
| G06F 3/147 | (2006.01) |
| H04W 4/029 | (2018.01) |
| G06F 3/14 | (2006.01) |
| G07C 5/08 | (2006.01) |
| G07C 5/00 | (2006.01) |
| G07C 5/02 | (2006.01) |
| H04W 4/38 | (2018.01) |
| G06Q 40/08 | (2012.01) |
| H04W 4/021 | (2018.01) |
| H04W 4/02 | (2018.01) |
| G06F 9/54 | (2006.01) |
| G01P 1/07 | (2006.01) |
| G01P 13/00 | (2006.01) |
| G01C 21/20 | (2006.01) |
| G01C 21/34 | (2006.01) |
| G08G 1/0968 | (2006.01) |
| G05D 1/00 | (2006.01) |
| G05D 1/02 | (2020.01) |
| H04W 4/40 | (2018.01) |
| G06F 16/22 | (2019.01) |
| G06F 3/0484 | (2013.01) |

(52) U.S. Cl.
CPC ....... *G01C 21/3476* (2013.01); *G01C 21/362* (2013.01); *G01P 1/07* (2013.01); *G01P 13/00* (2013.01); *G05D 1/0011* (2013.01); *G05D 1/0212* (2013.01); *G05D 1/0276* (2013.01); *G06F 3/14* (2013.01); *G06F 3/147* (2013.01); *G06F 3/1454* (2013.01); *G06F 9/542* (2013.01); *G06Q 40/08* (2013.01); *G07C 5/008* (2013.01); *G07C 5/02* (2013.01); *G07C 5/085* (2013.01); *G08G 1/096844* (2013.01); *H04L 67/10* (2013.01); *H04L 67/12* (2013.01); *H04L 67/18* (2013.01); *H04W 4/021* (2013.01); *H04W 4/026* (2013.01); *H04W 4/029* (2018.02); *H04W 4/38* (2018.02); *G05D 2201/0213* (2013.01); *G06F 3/0484* (2013.01); *G06F 16/22* (2019.01); *H04W 4/40* (2018.02)

(56) References Cited

U.S. PATENT DOCUMENTS

| | | | | |
|---|---|---|---|---|
| 8,509,987 | B2* | 8/2013 | Resner | G07C 5/008 |
| | | | | 340/438 |
| 8,655,375 | B2* | 2/2014 | Aceves | H04W 8/18 |
| | | | | 455/456.1 |
| 8,775,416 | B2 | 7/2014 | Heck | |
| 8,788,498 | B2 | 7/2014 | Kannan et al. | |
| 8,838,436 | B2 | 9/2014 | Liu et al. | |
| 8,862,486 | B2* | 10/2014 | Cordova | B60W 40/09 |
| | | | | 705/4 |
| 8,928,495 | B2 | 1/2015 | Hassib et al. | |
| 9,026,527 | B2 | 5/2015 | Wallace et al. | |
| 9,053,516 | B2* | 6/2015 | Stempora | G06Q 40/08 |
| 9,068,844 | B2 | 6/2015 | Kahn et al. | |
| 9,082,239 | B2* | 7/2015 | Ricci | H04W 4/44 |
| 9,245,396 | B2 | 1/2016 | Delong et al. | |
| 9,305,317 | B2 | 4/2016 | Grokop et al. | |
| 9,361,271 | B2 | 6/2016 | Mukhopadhyay et al. | |
| 9,390,431 | B2 | 7/2016 | Fletcher et al. | |
| 9,398,423 | B2 | 7/2016 | Cordova et al. | |
| 9,423,269 | B2* | 8/2016 | Miljkovic | G01C 21/3697 |
| 9,461,876 | B2 | 10/2016 | Van Dusen et al. | |
| 9,493,130 | B2 | 11/2016 | Penilla et al. | |
| 9,596,357 | B1 | 3/2017 | Ruperto | |
| 9,644,969 | B2* | 5/2017 | Koenig | G01C 21/20 |
| 9,703,940 | B2 | 7/2017 | Forbes et al. | |
| 9,812,015 | B1 | 11/2017 | Cox et al. | |
| 9,846,977 | B1* | 12/2017 | Cox | G07C 5/02 |
| 9,888,392 | B1 | 2/2018 | Snyder et al. | |
| 10,242,514 | B2* | 3/2019 | Harish | G01C 21/3476 |
| 10,360,636 | B1* | 7/2019 | Kraft | G06Q 40/08 |
| 10,365,117 | B2* | 7/2019 | Harish | G06F 3/147 |
| 2007/0070998 | A1* | 3/2007 | Sethuram | H04L 12/12 |
| | | | | 370/389 |
| 2008/0030376 | A1* | 2/2008 | Tunnell | G07C 5/085 |
| | | | | 340/988 |
| 2010/0035632 | A1 | 2/2010 | Catten | |
| 2011/0161116 | A1 | 6/2011 | Peak et al. | |
| 2012/0015625 | A1 | 1/2012 | Mendenhall et al. | |
| 2012/0029964 | A1 | 2/2012 | Tengler et al. | |
| 2012/0088462 | A1 | 4/2012 | Mader et al. | |
| 2012/0209634 | A1 | 8/2012 | Ling et al. | |
| 2012/0253656 | A1* | 10/2012 | Brandt | G01C 21/20 |
| | | | | 701/410 |
| 2013/0024203 | A1 | 1/2013 | Flores et al. | |
| 2013/0260791 | A1* | 10/2013 | Malinovskiy | H04W 4/024 |
| | | | | 455/456.1 |
| 2013/0302758 | A1 | 11/2013 | Wright | |
| 2014/0046701 | A1 | 2/2014 | Steinberg et al. | |
| 2014/0123323 | A1 | 5/2014 | Jung et al. | |
| 2014/0335893 | A1 | 11/2014 | Ronen | |
| 2015/0019266 | A1 | 1/2015 | Stempora | |
| 2015/0046197 | A1* | 2/2015 | Peng | G06Q 10/0639 |
| | | | | 705/4 |
| 2015/0154711 | A1* | 6/2015 | Christopulos | G06Q 40/08 |
| | | | | 705/7.29 |
| 2015/0154868 | A1 | 6/2015 | Neuner et al. | |
| 2015/0168169 | A1* | 6/2015 | Caceres | G01C 21/3492 |
| | | | | 701/537 |
| 2015/0198722 | A1* | 7/2015 | Ben-Akiva | G01S 19/49 |
| | | | | 701/472 |
| 2015/0242879 | A1 | 8/2015 | Lee et al. | |
| 2016/0063459 | A1 | 3/2016 | Li et al. | |
| 2016/0092899 | A1 | 3/2016 | Osberg | |
| 2016/0129913 | A1* | 5/2016 | Boesen | B60W 40/09 |
| | | | | 705/4 |
| 2016/0171617 | A1* | 6/2016 | Eshwar | G06Q 40/08 |
| | | | | 705/4 |
| 2016/0191120 | A1 | 6/2016 | Dobyns et al. | |
| 2016/0327397 | A1* | 11/2016 | Cordova | G06Q 40/08 |
| 2017/0057518 | A1* | 3/2017 | Finegold | H04M 1/725 |
| 2017/0099582 | A1* | 4/2017 | Boesen | H04W 4/029 |
| 2017/0135621 | A1* | 5/2017 | Lee | G05D 1/0221 |
| 2017/0144378 | A1 | 5/2017 | Giera | |
| 2017/0255966 | A1 | 9/2017 | Khoury | |
| 2017/0265044 | A1* | 9/2017 | Lundsgaard | G01C 21/10 |
| 2018/0012092 | A1 | 1/2018 | Gleeson-May et al. | |
| 2018/0213351 | A1* | 7/2018 | Gusikhin | H04W 4/02 |
| 2018/0288182 | A1 | 10/2018 | Tong et al. | |
| 2018/0315147 | A1* | 11/2018 | Mendels | G06Q 50/30 |
| 2019/0017828 | A1* | 1/2019 | Harish | G08G 1/0129 |
| 2019/0017837 | A1* | 1/2019 | Harish | G06Q 40/08 |
| 2019/0018037 | A1* | 1/2019 | Harish | H04W 4/38 |
| 2019/0018425 | A1* | 1/2019 | Harish | G06Q 40/08 |
| 2019/0019350 | A1* | 1/2019 | Harish | G06F 3/147 |
| 2019/0019351 | A1* | 1/2019 | Harish | G06F 3/14 |
| 2019/0019355 | A1* | 1/2019 | Harish | G01C 21/3476 |
| 2019/0092337 | A1 | 3/2019 | Chua et al. | |
| 2019/0170531 | A1* | 6/2019 | Harish | G08G 1/096844 |

OTHER PUBLICATIONS

Spruyt, David, "Driving Behavior Modeling Using Smart Phone Sensor Data," Sentiance, Feb. 11, 2016, retrieved from http://www.sentiance.com/2016/02/11/driving-behavior-modeling-using-smart-phone-sensor-data. 12 pages.

(56) References Cited

OTHER PUBLICATIONS

Chu, Hon Lung, "In-Vehicle Driver detection Using Mobile Phone Sensors," Submitted for Graduation with Departmental Distinction in Elecrical and Computer Engineering, Apr. 20, 2011, retrieved from http://ece.duke.edu/sites/ece.duke.edu/files/GWDD2011_Chu.pdf, 21 pages.

"What is Veery? Veery SDK: Predictive Geolocation for mobile applications" Roofstreet, Jun. 1, 2017, retrieved from http://roofstreet.io/whatisveery, 10 pages.

Neto, et al., "Prediction of Destinations and Routes in Urban Trips with Automated Identification of Place Types and Stay Points," Dec. 2, 2015, Proceeding XVI Geoinfo, Nov. 29-Dec. 2, 2015, Campos do Jordao, Brazil, p. 80-91.

Mar. 20, 2019—(US) Notice of Allowance—U.S. Appl. No. 16/267,541.

Oct. 11, 2018—(US) Notice of Allowance—U.S. Appl. No. 16/028,719.

Nov. 7, 2018 (US) Notice of Allowance and Fees Due—U.S. Appl. No. 16/028,719.

Nov. 14, 2018—(US) Non-Final Office Action—U.S. Appl. No. 16/028,499.

Apr. 8, 2019 (US) Notice of Allowance and Fees Due—U.S. Appl. No. 16/028,499.

Oct. 4, 2019—(US) Non-Final Office Action—U.S. Appl. No. 16/028,927.

Dec. 10, 2019 U.S. Non-Final Office Action—U.S. Appl. No. 16/026,785.

\* cited by examiner

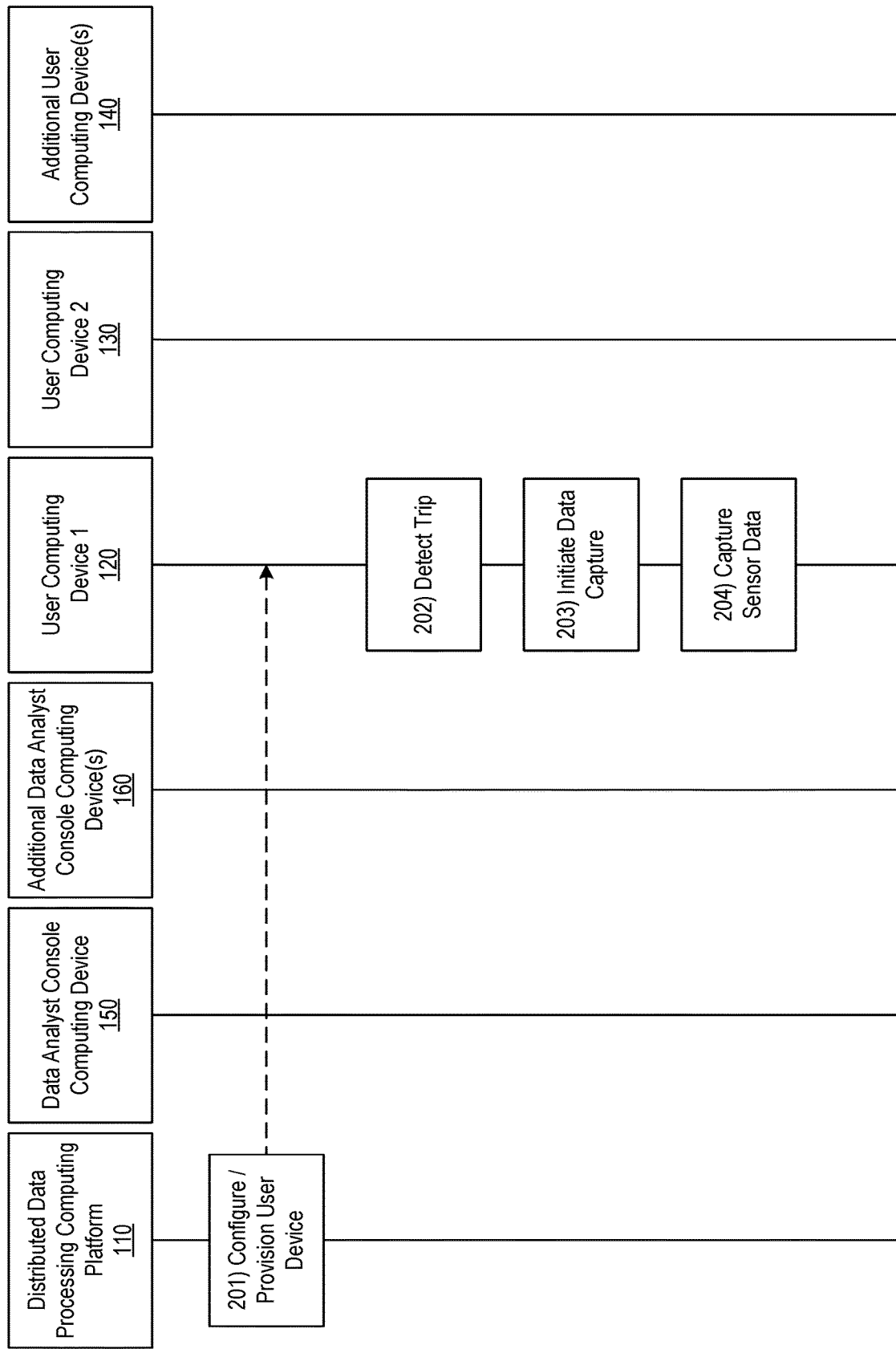

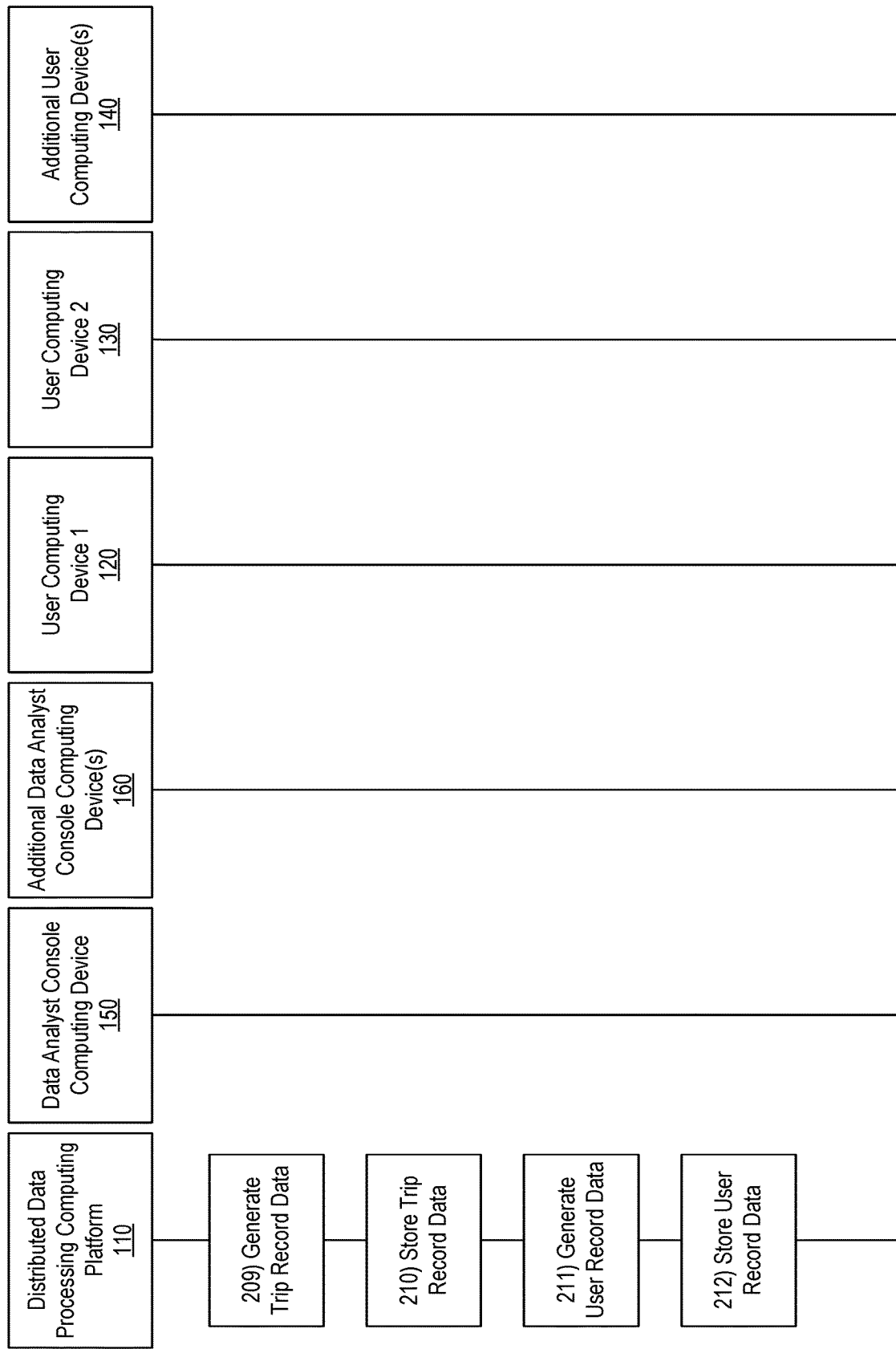

DISTRIBUTED DATA PROCESSING SYSTEMS FOR PROCESSING REMOTELY CAPTURED SENSOR DATA

CROSS-REFERENCE TO RELATED APPLICATIONS

This application claims the benefit of and priority to U.S. Provisional Patent Application Ser. No. 62/532,514, filed Jul. 14, 2017, and entitled "Distributed Data Processing Systems For Processing Remotely Captured Sensor Data," which is incorporated by reference herein in its entirety. This application also claims the benefit of and priority to U.S. Provisional Patent Application Ser. No. 62/571,108, filed Oct. 11, 2017, and entitled "Telematics-Based Driver Detection," which is incorporated by reference herein in its entirety.

TECHNICAL FIELD

Aspects of the disclosure relate to electrical computers and digital processing systems, multicomputer data transferring, and distributed data processing, and accordingly may be classified in U.S. Class No. 709.201. In particular, one or more aspects of the disclosure relate to distributed data processing systems for processing remotely captured sensor data.

BACKGROUND

Processing relatively large datasets may require a relatively large amount of processing power. In some instances, deploying, configuring, and implementing a system that can effectively process such large datasets while also efficiently using computing resources, such as processing power and network bandwidth, may be difficult and present various technical challenges. Aspects of the disclosure provide technical solutions that overcome these and/or other technical challenges, particularly in instances in a which a computer system is configured to process large datasets comprised of sensor data that is remotely captured by various mobile computing devices.

SUMMARY

Aspects of the disclosure provide effective, efficient, scalable, and convenient technical solutions that address and overcome the technical problems associated with processing remotely captured sensor data. For instance, one or more aspects of the disclosure relate to distributed data processing systems that are configured to receive sensor data that is remotely captured by various mobile computing devices and subsequently analyze the sensor data to derive various characteristics, such as detecting whether a user of a particular mobile computing device has taken an automobile trip and/or other features of such an automobile trip that may be identified based on the captured sensor data.

In accordance with one or more embodiments, a computing platform having at least one processor, a communication interface, and memory may receive, via the communication interface, from a user computing device, sensor data captured by the user computing device using one or more sensors built into the user computing device. Subsequently, the computing platform may analyze the sensor data received from the user computing device by executing one or more data processing modules. Then, the computing platform may generate trip record data based on analyzing the sensor data received from the user computing device and may store the trip record data in a trip record database. In addition, the computing platform may generate user record data based on analyzing the sensor data received from the user computing device and may store the user record data in a user record database.

In some embodiments, receiving the sensor data captured by the user computing device using the one or more sensors built into the user computing device may include receiving data captured by the user computing device using one or more of: an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor.

In some embodiments, analyzing the sensor data received from the user computing device by executing the one or more data processing modules may include executing one or more of a trip detection module, an axis alignment module, a driver detection module, a trip anomaly detection module, an exit point detection module, a left-right exit detection module, a front-rear detection module, an event detection module, a vehicle mode detection module, a places of interest determination module, a destination prediction module, a route prediction module, a customer insights module, or a car tracking module.

In one or more additional or alternative embodiments, a computing platform having at least one processor, a communication interface, and memory may receive, via the communication interface, from a first user computing device, sensor data captured by the first user computing device using one or more sensors built into the first user computing device. The computing platform may analyze the sensor data received from the first user computing device to determine whether a first trip recorded in the sensor data received from the first user computing device was taken using a vehicle mode of transport or a non-vehicle mode of transport. Based on determining that the first trip recorded in the sensor data received from the first user computing device was taken using the vehicle mode of transport, the computing platform may generate first vehicular trip record data indicating that the first trip recorded in the sensor data received from the first user computing device was taken using the vehicle mode of transport. In addition, the computing platform may store the first vehicular trip record data in a driver detection database. Alternatively, based on determining that the first trip recorded in the sensor data received from the first user computing device was taken using the non-vehicle mode of transport, the computing platform may generate first non-vehicular trip record data indicating that the first trip recorded in the sensor data received from the first user computing device was taken using the non-vehicle mode of transport. In addition, the computing platform may store the first non-vehicular trip record data in the driver detection database.

In one or more additional or alternative embodiments, a computing platform having at least one processor, a communication interface, and memory may receive, via the communication interface, from a first user computing device, sensor data captured by the first user computing device using one or more sensors built into the first user computing device. The computing platform may analyze the sensor data received from the first user computing device to determine a first set of one or more places of interest for a first user of the first user computing device. Subsequently, the computing platform may generate a first geo-fence configuration file for the first user computing device based on determining the first set of one or more places of interest for the first user of the first user computing device, and the first geo-fence configuration file generated for the first user computing device may include configuration information defining at least one geo-fence around each place of interest of the first set of one or more places of interest for the first user of the first user computing device. Then, the computing platform may send, via the communication interface, to the first user computing device, the first geo-fence configuration file generated for the first user computing device, and sending the first geo-fence configuration file to the first user computing device may cause the first user computing device to update one or more configuration settings to implement the at least one geo-fence defined by the configuration information included in the first geo-fence configuration file.

In one or more additional or alternative embodiments, a computing device having at least one processor, a communication interface, and memory may receive, via the communication interface, from a data processing computing platform, first provisioning information. Subsequently, the computing device may monitor first sensor data associated with one or more sensors built into the computing device based on the first provisioning information received from the data processing computing platform. Based on monitoring the first sensor data associated with the one or more sensors built into the computing device, the computing device may detect that a first trip has started, and the first trip may correspond to movement of the computing device from a first location to a second location. In response to detecting that the first trip has started, the computing device may wake a data recording process on the computing device, and waking the data recording process on the computing device may cause the computing device to capture and store second sensor data received from the one or more sensors built into the computing device while the first trip is occurring.

In one or more additional or alternative embodiments, a computing platform having at least one processor, a communication interface, and memory may receive, via the communication interface, from a first user computing device, sensor data captured by the first user computing device using one or more sensors built into the first user computing device. Subsequently, the computing platform may analyze the sensor data received from the first user computing device to determine whether a first user associated with the first user computing device exited a vehicle to a left side of the vehicle or a right side of the vehicle at a conclusion of a trip. Based on determining that the first user associated with the first user computing device exited the vehicle to the left side of the vehicle or the right side of the vehicle at the conclusion of the trip, the computing platform may generate output data indicating a side of the vehicle which the first user associated with the first user computing device exited the vehicle. Subsequently, the computing platform may send, to a driver detection module, the output data indicating the side of the vehicle which the first user associated with the first user computing device exited the vehicle, and sending the output data indicating the side of the vehicle which the first user associated with the first user computing device exited the vehicle to the driver detection module may cause the driver detection module to determine whether the first user associated with the first user computing device was a driver or a passenger during the trip.

In one or more additional or alternative embodiments, a computing platform having at least one processor, a communication interface, and memory may receive, via the communication interface, from a first user computing device, sensor data captured by the first user computing device using one or more sensors built into the first user computing device during a trip in a vehicle. Subsequently, the computing platform may analyze the sensor data received from the first user computing device to align at least one axis of a reference frame of the first user computing device with at least one axis of a reference frame of the vehicle. Based on aligning the at least one axis of the reference frame of the first user computing device with the at least one axis of the reference frame of the vehicle, the computing platform may generate alignment data relating the sensor data received from the first user computing device to the reference frame of the vehicle. Thereafter, the computing platform may store, in at least one database maintained by the computing platform and accessible to one or more data analysis modules associated with the computing platform, the alignment data relating the sensor data received from the first user computing device to the reference frame of the vehicle.

In one or more additional or alternative embodiments, a computing platform having at least one processor, a communication interface, and memory may receive, via the communication interface, from a first user computing device, sensor data captured by the first user computing device using one or more sensors built into the first user computing device during a trip in a vehicle. Subsequently, the computing platform may analyze the sensor data received from the first user computing device to determine whether a user of the first user computing device was a driver of the vehicle or a passenger of the vehicle during the trip in the vehicle. Based on determining that the user of the first user computing device was a driver of the vehicle during the trip in the vehicle, the computing platform may generate driver-trip data comprising at least a portion of the sensor data received from the first user computing device and information identifying a time of the trip and one or more locations associated with the trip. In addition, the computing platform may store, in at least one database maintained by the computing platform and accessible to one or more data analysis modules associated with the computing platform, the driver-trip data. Alternatively, based on determining that the user of the first user computing device was a passenger of the vehicle during the trip in the vehicle, the computing platform may generate passenger-trip data comprising at least a portion of the sensor data received from the first user computing device and information identifying a time of the trip and one or more locations associated with the trip. In addition, the computing platform may store, in at least one database maintained by the computing platform and accessible to one or more data analysis modules associated with the computing platform, the passenger-trip data.

In one or more additional or alternative embodiments, a computing platform having at least one processor, a communication interface, and memory may receive, via the communication interface, from a first user computing device, sensor data captured by the first user computing device using one or more sensors built into the first user computing device during a trip in a vehicle. Subsequently, the computing platform may analyze the sensor data received from the first user computing device to determine a point in time at which a user of the first user computing device exited the vehicle. Based on determining the point in time at which the user of the first user computing device exited the vehicle, the computing platform may generate exit-point-detection data relating the point in time at which the user of the first user computing device exited the vehicle to the sensor data received from the first user computing device. Thereafter, the computing platform may store, in at least one database maintained by the computing platform and accessible to one or more data analysis modules associated with the computing platform, the exit-point-detection data relating the point in time at which the user of the first user computing device exited the vehicle to the sensor data received from the first user computing device.

In one or more additional or alternative embodiments, a computing platform having at least one processor, a communication interface, and memory may receive, via the communication interface, from a first user computing device, sensor data captured by the first user computing device using one or more sensors built into the first user computing device during a trip in a vehicle. Subsequently, the computing platform may analyze the sensor data received from the first user computing device to determine whether a user of the first user computing device was located in a front portion of the vehicle during the trip or a rear portion of the vehicle during the trip. Based on determining that the user of the first user computing device was located in the front portion of the vehicle during the trip, the computing platform may generate front-rear detection data indicating that the user of the first user computing device was located in the front portion of the vehicle during the trip. In addition, the computing platform may store, in at least one database maintained by the computing platform and accessible to one or more data analysis modules associated with the computing platform, the front-rear detection data indicating that the user of the first user computing device was located in the front portion of the vehicle during the trip. Alternatively, based on determining that the user of the first user computing device was located in the rear portion of the vehicle during the trip, the computing platform may generate front-rear detection data indicating that the user of the first user computing device was located in the rear portion of the vehicle during the trip. In addition, the computing platform may store, in the at least one database maintained by the computing platform and accessible to the one or more data analysis modules associated with the computing platform, the front-rear detection data indicating that the user of the first user computing device was located in the rear portion of the vehicle during the trip.

In one or more additional or alternative embodiments, a computing platform having at least one processor, a communication interface, and memory may load a sample dataset comprising first sensor data captured by a first user computing device using one or more sensors built into the first user computing device during a first trip in a first vehicle. Subsequently, the computing platform may build a labeled dataset based on the sample dataset. Thereafter, the computing platform may receive, via the communication interface, from a second user computing device, second sensor data captured by the second user computing device using one or more sensors built into the second user computing device during a second trip in a second vehicle. The computing platform may analyze the second sensor data captured by the second user computing device to identify one or more phone-handling events associated with the second user computing device during the second trip in the second vehicle. Based on analyzing the second sensor data captured by the second user computing device to identify the one or more phone-handling events associated with the second user computing device during the second trip in the second vehicle, the computing platform may generate event-detection data identifying the one or more phone-handling events associated with the second user computing device during the second trip in the second vehicle. Subsequently, the computing platform may store, in at least one database maintained by the computing platform and accessible to one or more data analysis modules associated with the computing platform, the event-detection data identifying the one or more phone-handling events associated with the second user computing device during the second trip in the second vehicle.

In one or more additional or alternative embodiments, a computing platform having at least one processor, a communication interface, and memory may receive, via the communication interface, from a first user computing device, sensor data captured by the first user computing device using one or more sensors built into the first user computing device during a trip in a vehicle. While the trip in the vehicle is in progress, the computing platform may analyze the sensor data received from the first user computing device to predict one or more potential destinations of a first user of the first user computing device. Based on analyzing the sensor data received from the first user computing device to predict the one or more potential destinations of the first user of the first user computing device, the computing platform may generate one or more alerts associated with the one or more potential destinations predicted for the first user of the first user computing device. Subsequently, the computing platform may send, via the communication interface, to the first user computing device, the one or more alerts associated with the one or more potential destinations predicted for the first user of the first user computing device.

In one or more additional or alternative embodiments, a computing platform having at least one processor, a communication interface, and memory may receive, via the communication interface, from a first user computing device, first sensor data captured by the first user computing device using one or more sensors built into the first user computing device during a first trip in a vehicle. Subsequently, the computing platform may analyze the first sensor data received from the first user computing device to identify an end location of the first trip in the vehicle. Based on analyzing the first sensor data received from the first user computing device to identify the end location of the first trip in the vehicle, the computing platform may update a user-specific listing of trip-end locations. After updating the user-specific listing of trip-end locations, the computing platform may receive, via the communication interface, from the first user computing device, second sensor data captured by the first user computing device using one or more sensors built into the first user computing device during a second trip in the vehicle. Subsequently, the computing platform may determine a distance between the end location of the first trip in the vehicle and a start location of the second trip in the vehicle. Based on the distance between the end location of the first trip in the vehicle and the start location of the second trip in the vehicle, the computing platform may generate driver-detection data indicative of a user of whether the first user computing device is a driver of the vehicle during the second trip in the vehicle or a passenger of the vehicle during the second trip in the vehicle. Then, the computing platform may store, in at least one database maintained by the computing platform and accessible to one or more data analysis modules associated with the computing platform, the driver-detection data indicative of whether the user of the first user computing device is a driver of the vehicle during the second trip in the vehicle or a passenger of the vehicle during the second trip in the vehicle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, and 2D depict an illustrative event sequence for processing remotely captured sensor data in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to distributed data processing systems. For example, a distributed data processing system may be configured to receive sensor data that is remotely captured by various mobile computing devices. The distributed data processing system may be further configured to analyze the sensor data to derive various characteristics. For instance, the distributed data processing system may analyze the sensor data to detect whether a user of a particular mobile computing device has taken an automobile trip or another type of trip (e.g., a train trip, a boat trip, etc.), to detect whether the user of the particular mobile computing device was a driver or a passenger during an automobile trip, and/or to detect other features associated with one or more trips taken by the user of the particular mobile computing device. In some instances, the distributed data processing system may store, execute, and/or otherwise use different modules to receive sensor data from various mobile computing devices, distinguish and/or classify car trips, detect whether a particular device user was a driver or a passenger during a particular trip, identify other features of trips taken by device users, and/or perform other functions. Additionally or alternatively, the distributed data processing system may aggregate sensor data and/or processed trip data associated with different trips taken by different users to provide various functions, such as different trip prediction functions and user insights functions, as discussed below.

Figure 1A:
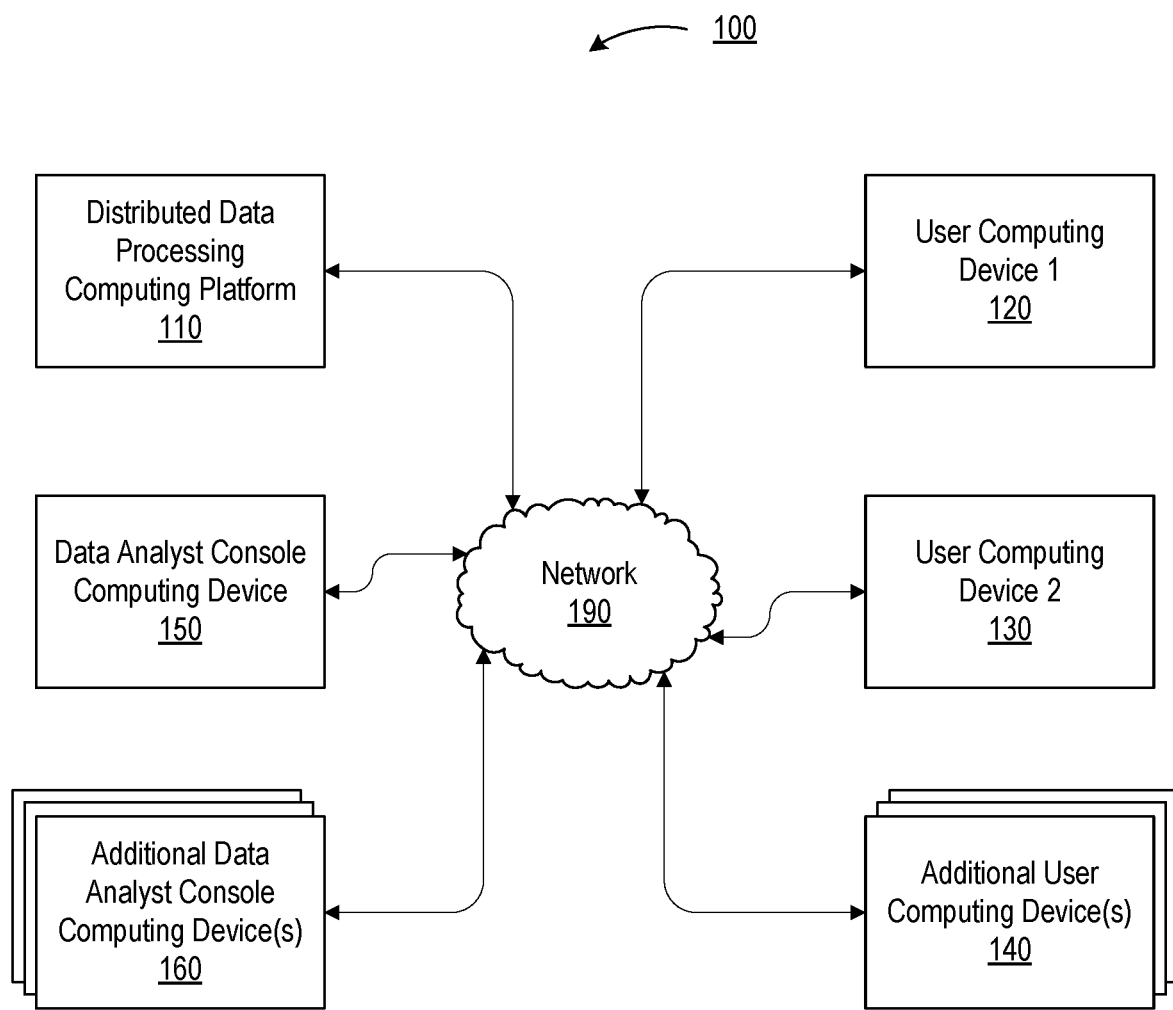
FIGS. 1A, 1B, and 1C depict an illustrative operating environment for processing remotely captured sensor data in accordance with one or more example embodiments.
Figure 1B:
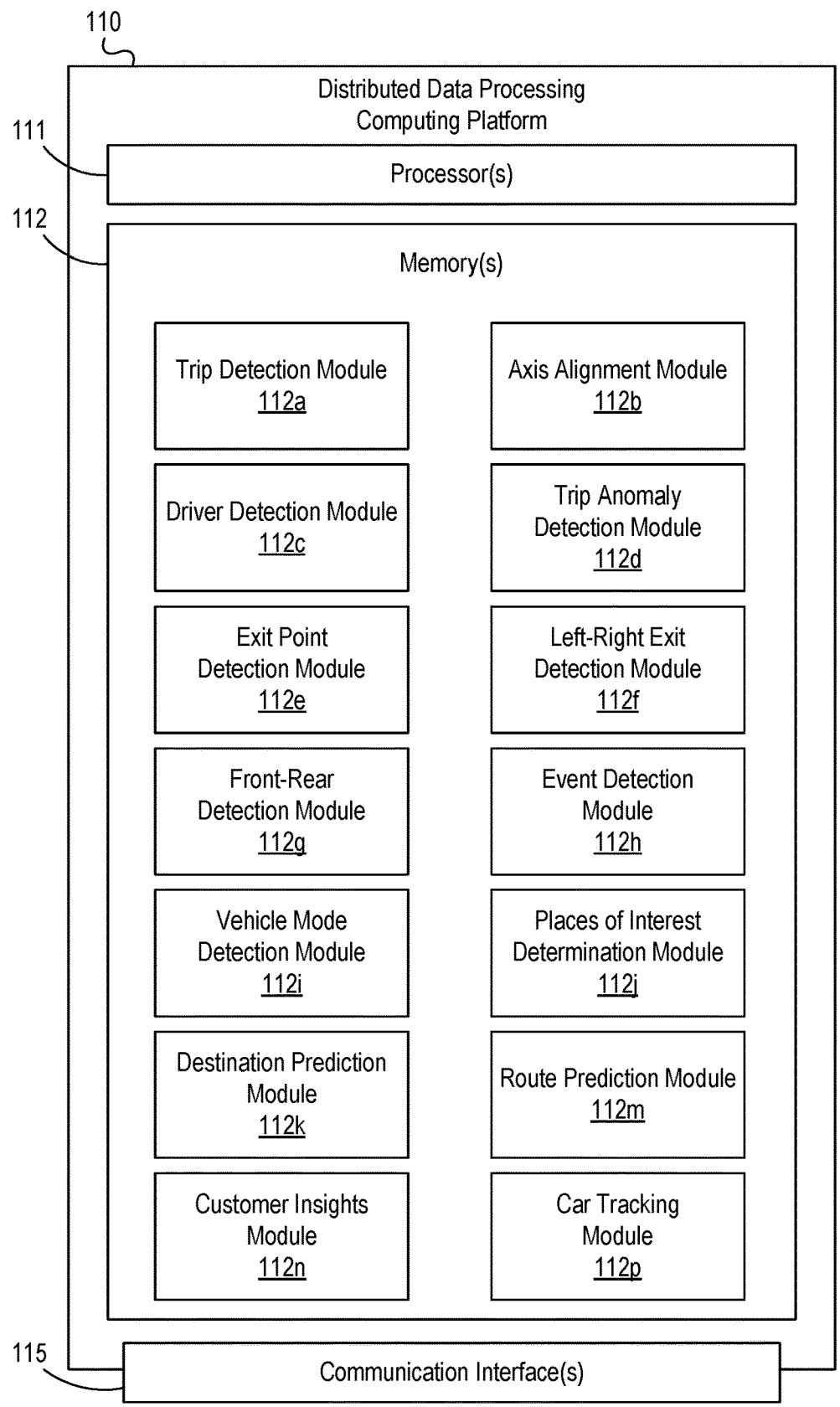
Figure 1C:
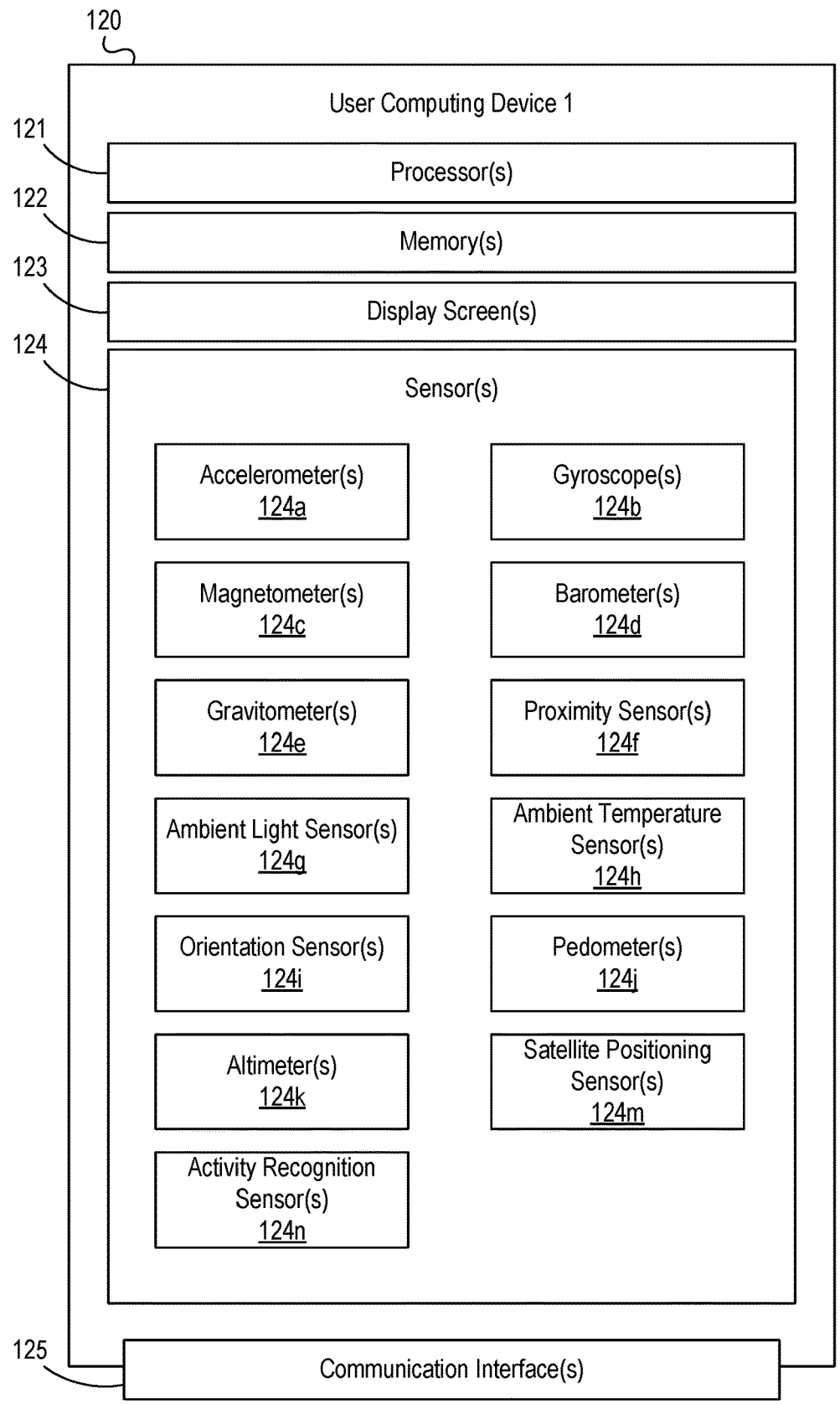

FIGS. 1A, 1B, and 1C depict an illustrative operating environment for processing remotely captured sensor data in accordance with one or more example embodiments. Referring to FIG. 1A, computing environment 100 may include various computer systems, computing devices, networks, and/or other operating infrastructure. For example, computing environment 100 may include distributed data processing computing platform 110, a first user computing device 120, a second user computing device 130, one or more additional user computing devices 140, a data analyst console computing device 150, and one or more additional data analyst console computing devices 160. In addition, distributed data processing computing platform 110, user computing device 120, user computing device 130, additional user computing devices 140, data analyst console computing device 150, and additional data analyst console computing devices 160 may be connected by network 190, which may include one or more wired networks and/or one or more wireless networks. In addition, each of distributed data processing computing platform 110, user computing device 120, user computing device 130, additional user computing devices 140, data analyst console computing device 150, and additional data analyst console computing devices 160 may be special purpose computing devices configured to perform specific functions, as illustrated in greater detail below, and may include specific computing components such as processors, memories, communication interfaces, and/or the like.

For example, distributed data processing computing platform 110 may be configured to receive and analyze sensor data and perform various other functions, as illustrated in greater detail below. User computing device 120 may be configured to capture data from various sensors included in and/or connected to user computing device 120, and may be further configured to perform various other functions, as illustrated in greater detail below. In some instances, user computing device 120 also may be configured to be used by a first user (who may, e.g., be individually and/or uniquely recognized by user computing device 120 and/or distributed data processing computing platform 110). Similar to user computing device 120, user computing device 130 may be configured to capture data from various sensors included in and/or connected to user computing device 130, and may be further configured to perform various other functions. In some instances, user computing device 130 also may be configured to be used by a second user (who may, e.g., be individually and/or uniquely recognized by user computing device 130 and/or distributed data processing computing platform 110), and the second user associated with user computing device 130 may be different from the first user associated with user computing device 120. Similar to user computing device 120 and user computing device 130, additional user computing devices 140 may be configured to capture data from various sensors included in and/or connected to additional user computing devices 140, and may be further configured to perform various other functions. In addition, additional user computing devices 140 may be configured to be used by one or more users different from the first user associated with user computing device 120 and/or different from the second user associated with user computing device 130.

Data analyst console computing device 150 may, for example, be configured to present one or more user interfaces and/or receive user input enabling a user of data analyst console computing device 150 to view sensor data that has been received and/or processed by distributed data processing computing platform 110, control operations of distributed data processing computing platform 110, and/or perform other functions. Similar to data analyst console computing device 150, additional data analyst console computing devices 160 may be configured to present one or more user interfaces and/or receive user input enabling one or more users of additional data analyst console computing devices 160 to view sensor data that has been received and/or processed by distributed data processing computing platform 110, control operations of distributed data processing computing platform 110, and/or perform other functions.

Referring to FIG. 1B, distributed data processing computing platform 110 may include one or more processor(s) 111, one or more memory(s) 112, and one or more communication interface(s) 115. In some instances, distributed data processing computing platform 110 may be made up of a plurality of different computing devices, which may be distributed with a single data center or a plurality of different data centers. In these instances, the one or more processor(s) 111, one or more memory(s) 112, and one or more communication interface(s) 115 included in distributed data processing computing platform 110 may be part of and/or otherwise associated with the different computing devices that form distributed data processing computing platform 110.

In one or more arrangements, processor(s) 111 may control operations of distributed data processing computing platform 110. Memory(s) 112 may store instructions that, when executed by processor(s) 111, cause distributed data processing computing platform 110 to perform one or more functions, as discussed below. Communication interface(s) 115 may include one or more wired and/or wireless network interfaces, and communication interface(s) 115 may connect distributed data processing computing platform 110 to one or more networks (e.g., network 190) and/or enable distributed data processing computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause distributed data processing computing platform 110 to perform various functions). For example, memory(s) 112 may store and/or otherwise provide a trip detection module 112a, an axis alignment module 112b, a driver detection module 112c, a trip anomaly detection module 112d, an exit point detection module 112e, a left-right exit detection module 112f, a front-rear detection module 112g, an event detection module 112h, a vehicle mode detection module 112i, a places of interest determination module 112j, a destination prediction module 112k, a route prediction module 112m, a customer insights module 112n, and a car tracking module 112p. In some instances, executing instructions associated with one or more of the modules stored in memory(s) 112 may cause distributed data processing computing platform 110 to perform and/or provide one or more machine learning functions.

In some instances, executing instructions associated with vehicle mode detection module 112i may cause distributed data processing computing platform 110 and/or one or more other systems and/or devices included in computing environment 100 to perform one or more steps of the example method discussed below with respect to FIG. 4. In some instances, executing instructions associated with places of interest determination module 112j may cause distributed data processing computing platform 110 and/or one or more other systems and/or devices included in computing environment 100 to perform one or more steps of the example method discussed below with respect to FIG. 5. In some instances, executing instructions associated with trip detection module 112a may cause distributed data processing computing platform 110 and/or one or more other systems and/or devices included in computing environment 100 to perform one or more steps of the example method discussed below with respect to FIG. 6. In some instances, executing instructions associated with left-right exit detection module 112f may cause distributed data processing computing platform 110 and/or one or more other systems and/or devices included in computing environment 100 to perform one or more steps of the example method discussed below with respect to FIG. 7. In some instances, executing instructions associated with axis alignment module 112b may cause distributed data processing computing platform 110 and/or one or more other systems and/or devices included in computing environment 100 to perform one or more steps of the example method discussed below with respect to FIG. 8. In some instances, executing instructions associated with driver detection module 112c may cause distributed data processing computing platform 110 and/or one or more other systems and/or devices included in computing environment 100 to perform one or more steps of the example method discussed below with respect to FIG. 9. In some instances, executing instructions associated with exit point detection module 112e may cause distributed data processing computing platform 110 and/or one or more other systems and/or devices included in computing environment 100 to perform one or more steps of the example method discussed below with respect to FIG. 10. In some instances, executing instructions associated with front-rear detection module 112g may cause distributed data processing computing platform 110 and/or one or more other systems and/or devices included in computing environment 100 to perform one or more steps of the example method discussed below with respect to FIG. 11. In some instances, executing instructions associated with event detection module 112h may cause distributed data processing computing platform 110 and/or one or more other systems and/or devices included in computing environment 100 to perform one or more steps of the example method discussed below with respect to FIG. 12. In some instances, executing instructions associated with destination prediction module 112k and/or route prediction module 112m may cause distributed data processing computing platform 110 and/or one or more other systems and/or devices included in computing environment 100 to perform one or more steps of the example method discussed below with respect to FIG. 13. In some instances, executing instructions associated with car tracking module 112p may cause distributed data processing computing platform 110 and/or one or more other systems and/or devices included in computing environment 100 to perform one or more steps of the example method discussed below with respect to FIG. 14.

Trip detection module 112a may store instructions and/or information that may be executed and/or otherwise used by distributed data processing computing platform 110 to configure and/or control various user devices (e.g., user computing device 120, user computing device 130, additional user computing devices 140) to capture motion data and/or otherwise collect data (e.g., using one or more sensors included in and/or connected to such user devices). For instance, using trip detection module 112a, distributed data processing computing platform 110 may provision a user device (e.g., user computing device 120, user computing device 130, additional user computing devices 140) with a data collection application and/or configure the user device (e.g., user computing device 120, user computing device 130, additional user computing devices 140) to capture sensor data and provide captured sensor data to distributed data processing computing platform 110 after the user device (e.g., user computing device 120, user computing device 130, additional user computing devices 140) detects a trip. In some instances, a trip may refer to an extended period of motion (e.g., detected by a user device (e.g., user computing device 120, user computing device 130, additional user computing devices 140) using one or more sensors) above a threshold of velocity and/or distance in which events may occur. In one or more arrangements, trip detection module 112a may store instructions and/or information that may enable distributed data processing computing platform 110 and/or one or more other computer systems and/or devices to provide one or more trip detection functions, as described in greater detail below.

Axis alignment module 112b may store instructions and/or information that may be executed and/or otherwise used by distributed data processing computing platform 110 to align a reference frame of a user device (e.g., user computing device 120, user computing device 130, additional user computing devices 140) with the reference frame of a vehicle in which the user device (e.g., user computing device 120, user computing device 130, additional user computing devices 140) was transported during a particular trip in which the user device (e.g., user computing device 120, user computing device 130, additional user computing devices 140) captured sensor data. This reference-frame alignment may, for instance, enable distributed data processing computing platform 110 to further align the reference frame of the sensor data captured by the user device (e.g., user computing device 120, user computing device 130, additional user computing devices 140) during the particular trip with the reference frame of the vehicle in which the user device (e.g., user computing device 120, user computing device 130, additional user computing devices 140) was transported during the particular trip to facilitate various sensor data processing and data analysis functions executed by distributed data processing computing platform 110. In some instances, functionality provided by axis alignment module 112b may support other functionality implemented by distributed data processing computing platform 110, such as event detection functionality provided by distributed data processing computing platform 110, vehicle mode detection functionality provided by distributed data processing computing platform 110, and driver detection functionality provided by distributed data processing computing platform 110, as discussed below. In one or more arrangements, axis alignment module 112b may store instructions and/or information that may enable distributed data processing computing platform 110 and/or one or more other computer systems and/or devices to provide one or more axis alignment functions, as described in greater detail below.

Driver detection module 112c may store instructions and/or information that may be executed and/or otherwise used by distributed data processing computing platform 110 to detect whether sensor data captured by a user device (e.g., user computing device 120, user computing device 130, additional user computing devices 140) is indicative of the user of the user device (e.g., user computing device 120, user computing device 130, additional user computing devices 140) being a driver or a passenger during a trip in which the sensor data was captured by the user device (e.g., user computing device 120, user computing device 130, additional user computing devices 140). In some instances, functionality provided by driver detection module 112c may enable distributed data processing computing platform 110 to infer labels associated with different trips associated with different datasets of captured sensor data. In some instances, driver detection module 112c may include and/or be comprised of a combination of several different population-level modules that function as label generators and/or function as personalized driver signature models (GMMs) on a per-user basis. In some instances, population-level modules may be used in connection with anomaly detection, car tracking, left-right detection, and/or front-back detection. Additionally or alternatively, population-level modules may be used in connection with other symmetry-breaking features on a population level, such as population density. Additionally or alternatively, functionality provided by driver detection module 112c may enable distributed data processing computing platform 110 to confirm inferred labels using user-applied labels for a relatively small number of inferred labels. In one or more arrangements, driver detection module 112c may store instructions and/or information that may enable distributed data processing computing platform 110 and/or one or more other computer systems and/or devices to provide one or more driver detection functions, as described in greater detail below.

Trip anomaly detection module 112d may store instructions and/or information that may be executed and/or otherwise used by distributed data processing computing platform 110 to detect anomalies in trips associated with captured sensor data analyzed by distributed data processing computing platform 110 and/or to infer labels (e.g., driver/passenger) associated with different trips corresponding to captured sensor data analyzed by distributed data processing computing platform 110. In some instances, functionality provided by trip anomaly detection module 112d may enable distributed data processing computing platform 110 to analyze captured sensor data (which may, e.g., be captured by and/or received from a user device (e.g., user computing device 120, user computing device 130, additional user computing devices 140)) using an isolation forest model. For example, functionality provided by trip anomaly detection module 112*d* may enable distributed data processing computing platform 110 to analyze captured sensor data to measure anomalies to determine if a trip is routine (e.g., if a trip is routine, the user of the user device may be driving; if a trip is an anomaly and not routine, the user of the user device might not be driving), and the isolation forest model may be used to identify and/or measure anomalies. In some instances, functionality provided by trip anomaly detection module 112*d* may enable distributed data processing computing platform 110 to analyze captured sensor data (which may, e.g., be captured by and/or received from a user device (e.g., user computing device 120, user computing device 130, additional user computing devices 140)) using one or more additional or alternative models different from an isolation forest model, such as Gaussian Mixture Models and/or other suitable models. In these instances, the one or more additional or alternative models similarly may be used to identify and/or measure anomalies.

Exit point detection module 112*e* may store instructions and/or information that may be executed and/or otherwise used by distributed data processing computing platform 110 to determine, based on sensor data captured by and/or received from a user device (e.g., user computing device 120, user computing device 130, additional user computing devices 140), a point of exit from a vehicle by a user of the user device (e.g., user computing device 120, user computing device 130, additional user computing devices 140). In some instances, functionality provided by exit point detection module 112*e* may enable distributed data processing computing platform 110 to apply information associated with the determined point of exit to other event detection analysis functionality and/or driver detection functionality that may be provided by distributed data processing computing platform 110, such as identifying a direction of exit at a particular time based on sensor data captured by and/or received from a user device (e.g., user computing device 120, user computing device 130, additional user computing devices 140). In one or more arrangements, exit point detection module 112*e* may store instructions and/or information that may enable distributed data processing computing platform 110 and/or one or more other computer systems and/or devices to provide one or more exit point detection functions, as described in greater detail below.

Left-right exit detection module 112*f* may store instructions and/or information that may be executed and/or otherwise used by distributed data processing computing platform 110 to determine, based on sensor data captured by and/or received from a user device (e.g., user computing device 120, user computing device 130, additional user computing devices 140), a direction of exit from a vehicle by a user of the user device (e.g., user computing device 120, user computing device 130, additional user computing devices 140). For example, rotation around a vertical axis indicated in gyroscope data included in the sensor data captured by and/or received from the user device (e.g., user computing device 120, user computing device 130, additional user computing devices 140) may be identified and/or analyzed by distributed data processing computing platform 110, and distributed data processing computing platform 110 may determine that left rotation around the vertical axis is indicative of the user device being used by a driver of a car, whereas right rotation around the vertical axis is indicative of the user device being used by a passenger of the car. In some instances, functionality provided by left-right exit detection module 112*f* may enable distributed data processing computing platform 110 to apply information associated with the determined direction of exit to other event detection analysis functionality and/or driver detection functionality that may be provided by distributed data processing computing platform 110.

Front-rear detection module 112*g* may store instructions and/or information that may be executed and/or otherwise used by distributed data processing computing platform 110 to determine, based on sensor data captured by and/or received from a user device (e.g., user computing device 120, user computing device 130, additional user computing devices 140), whether the user device (e.g., user computing device 120, user computing device 130, additional user computing devices 140) was located in the front of a car or in the rear of the rear during a particular trip associated with the sensor data captured by and/or received from the user device (e.g., user computing device 120, user computing device 130, additional user computing devices 140). For examples, potholes and other bumps encountered during a trip may exert different force patterns at and/or between front and rear smartphone positions, which in turn may create different effects in the sensor data captured by and/or received from the user device (e.g., user computing device 120, user computing device 130, additional user computing devices 140), and these effects may be identified and/or analyzed by distributed data processing computing platform 110 to determine the location of the user device inside of a car (e.g., whether the user device is in the front of the car or in the back of the car). In some instances, functionality provided by front-rear detection module 112*g* may enable distributed data processing computing platform 110 to apply information associated with the determined location of the user device (e.g., user computing device 120, user computing device 130, additional user computing devices 140) within a car during a particular trip to other event detection analysis functionality and/or driver detection functionality that may be provided by distributed data processing computing platform 110.

Event detection module 112*h* may store instructions and/or information that may be executed and/or otherwise used by distributed data processing computing platform 110 to identify features in sensor data captured by and/or received from a user device (e.g., user computing device 120, user computing device 130, additional user computing devices 140) indicative of how the user device (e.g., user computing device 120, user computing device 130, additional user computing devices 140) was physically handled by a user during a particular trip associated with the sensor data. In some instances, these features, which may be identified by distributed data processing computing platform 110, may be used by distributed data processing computing platform 110 to determine whether the user of the user device (e.g., user computing device 120, user computing device 130, additional user computing devices 140) was a passenger or a driver during the particular trip associated with the sensor data, as phone-handling motion patterns identified in the sensor data may look different depending on whether the user was the driver driving the vehicle or, alternatively, a passenger in the vehicle. Additionally or alternatively, these features, which may be identified by distributed data processing computing platform 110, may be used by distributed data processing computing platform 110 to detect and/or otherwise identify distracted driving by the user of the user device (e.g., user computing device 120, user computing device 130, additional user computing devices 140) and/or other events associated with the user device (e.g., user computing device 120, user computing device 130, additional user computing devices 140). In some instances, functionality provided by event detection module 112h may enable distributed data processing computing platform 110 to apply information associated with the identified phone-handling motion patterns during a particular trip to other event detection analysis functionality and/or driver detection functionality that may be provided by distributed data processing computing platform 110. In one or more arrangements, event detection module 112h may store instructions and/or information that may enable distributed data processing computing platform 110 and/or one or more other computer systems and/or devices to provide one or more even detection functions, as described in greater detail below.

Vehicle mode detection module 112i may store instructions and/or information that may be executed and/or otherwise used by distributed data processing computing platform 110 to determine, based on sensor data captured by and/or received from a user device (e.g., user computing device 120, user computing device 130, additional user computing devices 140), whether a particular trip associated with the sensor data was taken via a vehicle mode of transport (e.g., in a car) or via another mode of transport (e.g., in a train, boat, motorcycle, bicycle, plane, etc.). In some instances, functionality provided by vehicle mode detection module 112i may enable distributed data processing computing platform 110 to apply information associated with the determined mode of transport for a particular trip to other event detection analysis functionality and/or driver detection functionality that may be provided by distributed data processing computing platform 110. In one or more arrangements, vehicle mode detection module 112i may store instructions and/or information that may enable distributed data processing computing platform 110 and/or one or more other computer systems and/or devices to provide one or more vehicle mode detection functions, as described in greater detail below.

Places of interest determination module 112j may store instructions and/or information that may be executed and/or otherwise used by distributed data processing computing platform 110 to identify, based on sensor data captured by and/or received from a user device (e.g., user computing device 120, user computing device 130, additional user computing devices 140), places that are relevant to a user of the user device (e.g., user computing device 120, user computing device 130, additional user computing devices 140). In some instances, functionality provided by places of interest determination module 112j may enable distributed data processing computing platform 110 to anonymize captured sensor data (e.g., by removing satellite positioning and/or other trails that may be specific to the user) prior to aggregating captured sensor data for a plurality of different users. Additionally or alternatively, functionality provided by places of interest determination module 112j may enable distributed data processing computing platform 110 to offer location-based services, adjust insurance offerings and/or pricing (e.g., based on identifying actual car parking location(s) in addition to garaging location(s) specified in insurance policy document(s)), and/or provide other functions. In one or more arrangements, places of interest determination module 112j may store instructions and/or information that may enable distributed data processing computing platform 110 and/or one or more other computer systems and/or devices to provide one or more places of interest functions, as described in greater detail below.

Destination prediction module 112k may store instructions and/or information that may be executed and/or otherwise used by distributed data processing computing platform 110 to predict destinations for a particular user based on sensor data captured by and/or received from a user device (e.g., user computing device 120, user computing device 130, additional user computing devices 140), trip data associated with the user, and/or other meta data. In some instances, by detecting and/or predicting a destination of a particular user of a particular user device (e.g., user computing device 120, user computing device 130, additional user computing devices 140), distributed data processing computing platform 110 may be able to generate and/or send one or more pre-trip alerts and/or in-trip alerts to the particular user device being used by the particular user. For example, after distributed data processing computing platform 110 has identified one or more points of interest for a particular user of a particular user device (e.g., user computing device 120, user computing device 130, additional user computing devices 140), distributed data processing computing platform 110 may use a historical distribution of pairs of clusters forming the start points and end points of various trips to predict a destination of the particular user of a particular user device (e.g., user computing device 120, user computing device 130, additional user computing devices 140), who may have started a trip. In some instances, distributed data processing computing platform 110 may use a predetermined distance (e.g., 500 m) to snap a trip start point to an existing points-of-interest cluster. Subsequently, distributed data processing computing platform 110 may look up a historical distribution of start point and end point pairs to determine the likelihood of the particular user of the particular user device (e.g., user computing device 120, user computing device 130, additional user computing devices 140) ending the trip at one or more known user-specific points of interest. If distributed data processing computing platform 110 is not able to look up information about trips starting at a known cluster, distributed data processing computing platform 110 may generate a message indicating that a prediction cannot be made, or alternatively, distributed data processing computing platform 110 may generate a general prediction based on a most-visited point of interest for the particular user. In some instances, distributed data processing computing platform 110 may enhance the accuracy of destination predictions by building and/or utilizing different location distributions based on the day of the week and the time of day. Additionally or alternatively, distributed data processing computing platform 110 may enhance the accuracy of destination predictions by generating destination predictions based on the user's immediate travel history leading up to the current trip and/or other historical information (e.g., whether the user's previous trip ended at a point of interest, whether the user's previous trip started at a particular point of interest, whether there is a pattern of travel amongst the user's previous trips starting at the particular point of interest, etc.). In some instances, distributed data processing computing platform 110 may generate destination predictions at various points of a trip (e.g., at the start of a trip, after the user has been driving for a few minutes, after the user has driven a few miles, etc.).

In some instances, functionality provided by destination prediction module 112k may enable distributed data processing computing platform 110 to perform grid-based destination prediction. For example, distributed data processing computing platform 110 may, in some instances, use grid-based destination prediction functions in conjunction with point-of-interest-based destination prediction functions. Such grid-based destination prediction functions (which may, e.g., be executed and/or otherwise implemented by distributed data processing computing platform 110) may provide updated destination predictions during the course of a particular trip, as new information becomes available the particular trip progresses. In executing and/or otherwise implementing grid-based destination prediction functions, distributed data processing computing platform 110 may, for example, divide a map into grids and build grid-to-grid probabilities at a user level. In some instances, to reduce processing resources consumed by distributed data processing computing platform 110 in executing one or more destination prediction functions, distributed data processing computing platform 110 might only process grids that have been previously traveled by the user at least once or above another predetermined threshold number of times. In addition, distributed data processing computing platform 110 may use transitions from one grid to the next as new information to update a previous predicted destination.

In some instances, functionality provided by destination prediction module 112$k$ may enable distributed data processing computing platform 110 to apply a paradigm of predictions across differing granularities. For example, each destination prediction generated by distributed data processing computing platform 110 may be made at a country, state, county, neighborhood, census block, or specific address level. In addition, functionality provided by destination prediction module 112$k$ may enable distributed data processing computing platform 110 to apply a general destination-prediction baseline that might not be dependent on the particular user's specific travel history but instead may apply factors at a population level based on other contextual information. For instance, based on location and/or time of day, distributed data processing computing platform 110 may determine that users in general may be more likely to travel to certain types of destinations. As another example, based on trend data, distributed data processing computing platform 110 may determine that users in a general area may be traveling to a large event, such as a sporting event or concert.

Route prediction module 112$m$ may store instructions and/or information that may be executed and/or otherwise used by distributed data processing computing platform 110 to predict a route that may be taken by a particular user during a particular trip based on sensor data captured by and/or received from a user device (e.g., user computing device 120, user computing device 130, additional user computing devices 140), trip data associated with the user (e.g., data associated with prior trips taken by the user, which may, e.g., include clustering and calculating one or more scores using open-ended dynamic time warping), and/or other factors. In some instances, functionality provided by route prediction module 112$m$ may enable distributed data processing computing platform 110 to provide valuable in-trip alerts to enhance safety, convenience, and/or financial savings. In some instances, such in-trip alerts may include advertisements that may be customized by distributed data processing computing platform 110 based on the user population that might be traveling along certain routes at certain times. In addition, distributed data processing computing platform 110 may provide routing recommendations by proactively evaluating real-time information and/or other information about traffic, weather, and/or hazards along different routes.

For example, after distributed data processing computing platform 110 has identified one or more points of interest for a particular user of a particular user device (e.g., user computing device 120, user computing device 130, additional user computing devices 140) and has predicted a destination to which the user may be traveling during a particular trip, distributed data processing computing platform 110 may predict the route that the user may take to reach that destination using functionality provided by route prediction module 112$m$. For instance, distributed data processing computing platform 110 may cluster all previous routes to describe all unique routes to the predicted destination, and then distributed data processing computing platform 110 may assign a probability to each unique route to the predicted destination based on various factors, such as time of day. After a trip involving the particular user of the particular user device (e.g., user computing device 120, user computing device 130, additional user computing devices 140) starts, distributed data processing computing platform 110 may match a portion of the trip with each possible unique route candidate to identify a particular route as the predicted route to be taken by the particular user. In addition, distributed data processing computing platform 110 may provide additional functionality to the particular user device (e.g., user computing device 120, user computing device 130, additional user computing devices 140) after identified a predicted route, such as route-specific notifications. In addition, as with destination prediction functionality, route prediction functionality provided by distributed data processing computing platform 110 may improve over time as a particular progresses and distributed data processing computing platform 110 acquires additional information about the trip that can be used by distributed data processing computing platform 110 to update the route prediction.

Customer insights module 112$n$ may store instructions and/or information that may be executed and/or otherwise used by distributed data processing computing platform 110 to analyze aggregated data across different users of different devices. In some instances, functionality provided by customer insights module 112$n$ may enable distributed data processing computing platform 110 to predict imminent trips, predict routes, and/or predict user behavior in general and/or in the aggregate across a population of users, which may enable distributed data processing computing platform 110 to provide functionality to various users that improves safety, convenience, and financial savings. In some instances, distributed data processing computing platform 110 may generate user profiles based on data gathered from various user devices, such as trip information, sensor data, and/or other information. Such user profiles may, for instance, include information identifying each user's travel preferences, points of interest, and/or other information, which may be used by distributed data processing computing platform 110 to predict when an imminent trip is about to begin and/or when an in-progress trip is about to end. In addition, distributed data processing computing platform 110 may generate alerts and/or implemented rewards-based programs that are tailored for different users based on their individual user profiles.

Car tracking module 112$p$ may store instructions and/or information that may be executed and/or otherwise used by distributed data processing computing platform 110 to track potential locations of where particular cars of particular users might be parked. In some instances, functionality provided by car tracking module 112$p$ may enable distributed data processing computing platform 110 to identify a potential car trip for a particular user of a particular user device (e.g., user computing device 120, user computing device 130, additional user computing devices 140) based on where the particular user's last car trip ended and/or the distance between the ending location of the particular user's last car trip and the starting location of a potential trip being analyzed by distributed data processing computing platform 110. In one or more arrangements, car tracking module 112*p* may store instructions and/or information that may enable distributed data processing computing platform 110 and/or one or more other computer systems and/or devices to provide one or more vehicle tracking functions, as described in greater detail below.

Referring to FIG. 1C, user computing device 120 may include one or more processor(s) 121, one or more memory(s) 122, one or more display screen(s) 123, one or more sensor(s) 124, and one or more communication interface(s) 125. In some instances, user computing device 120 may be a mobile computing device, such as a smart phone, tablet computer, wearable device, or other mobile device, that may be used by a particular user. In addition, user computing device 120 may be configured to capture sensor data and/or other data (which may, e.g., be associated with various trips taken by the user of user computing device 120), and subsequently provide the captured data to distributed data processing computing platform 110 for processing and analysis (which may, e.g., enable distributed data processing computing platform 110 to perform one or more of the driver detection functions and/or other functions discussed above).

In one or more arrangements, processor(s) 121 may control operations of user computing device 120. Memory(s) 122 may store instructions that, when executed by processor(s) 121, cause user computing device 120 to perform one or more functions, as discussed below. Display screen(s) 123 may include one or more video display devices, including one or more touch-sensitive display screens, that may be display graphical output of user computing device 120 and/or receive touch-based input from a user of user computing device 120. Sensor(s) 124 may include one or more physical sensors and/or one or more logical sensors, as discussed below. Communication interface(s) 125 may include one or more wired and/or wireless network interfaces, and communication interface(s) 125 may connect user computing device 120 to one or more networks (e.g., network 190) and/or enable user computing device 120 to exchange information and/or otherwise communicate with one or more devices connected to such networks.

In one or more arrangements, sensor(s) 124 may include one or more physical sensors and/or one or more logical sensors. One or more of sensor(s) 124 may include electronic circuits and/or micro-electro-mechanical systems (MEMS) devices configured to detect physical conditions of user computing device 120, including movement of user computing device 120 and/or various conditions associated with the ambient surroundings of user computing device 120, and output electronic signals and/or data (which may, e.g., be received, stored, and/or processed by processor(s) 121 and/or subsequently provided by user computing device 120 to distributed data processing computing platform 110). For example, sensor(s) 124 of user computing device 120 may include one or more accelerometers 124*a*, one or more gyroscopes 124*b*, one or more magnetometers 124*c*, one or more barometers 124*d*, one or more gravitometers 124*e*, one or more proximity sensors 124*f*, one or more ambient light sensors 124*g*, one or more ambient temperature sensors 124*h*, one or more orientation sensors 124*i*, one or more pedometers 124*j*, one or more altimeters 124*k*, one or more satellite positioning sensors 124*m*, and/or one or more activity recognition sensors 124*n*. Any and/or all of sensor(s) 124 may include a plurality of hardware subcomponents that may be selectively powered on and/or off by user computing device 120 and/or controlled by processor(s) 121. Additionally or alternatively, any and/or all of sensor(s) 124 may output analog signals and/or digital data that may be received by processor(s) 121 and that may form any and/or all of the sensor data that may be captured by user computing device 120 (e.g., in connection with a particular trip taken by a user of user computing device 120) and/or provided by user computing device 120 to distributed data processing computing platform 110.

Figure 2B:
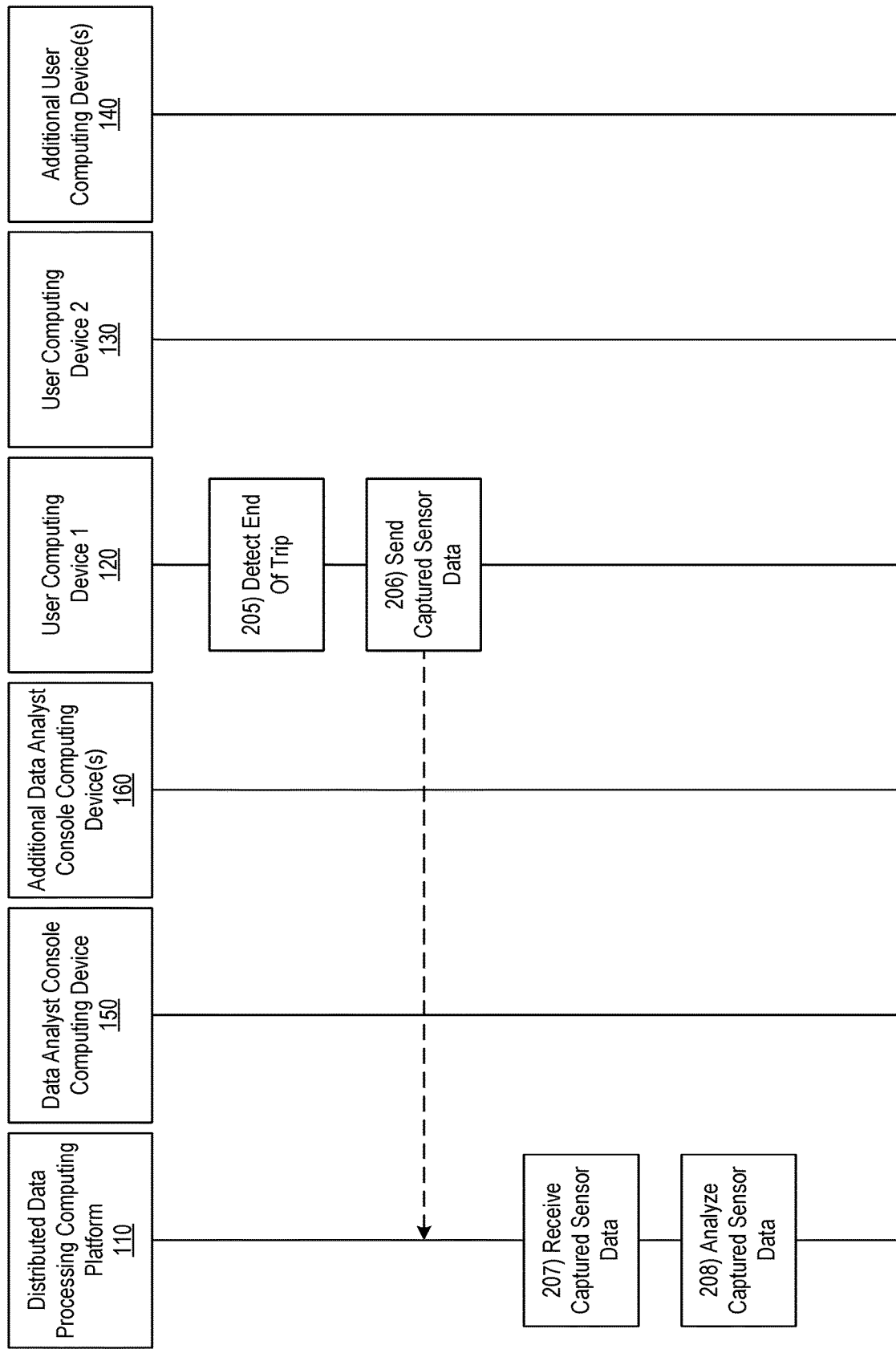

FIGS. 2A, 2B, 2C, and 2D depict an illustrative event sequence for processing remotely captured sensor data in accordance with one or more example embodiments. Referring to FIG. 2A, at step 201, distributed data processing computing platform 110 may configure and/or provision user computing device 120. For example, at step 201, distributed data processing computing platform 110 may configure user computing device 120 to detect one or more trips, capture sensor data associated with detected trips, and/or send captured sensor data back to distributed data processing computing platform 110. In addition, distributed data processing computing platform 110 may provision user computing device 120 with a software application that enables user computing device 120 to detect one or more trips, capture sensor data associated with detected trips, and/or send captured sensor data back to distributed data processing computing platform 110 (e.g., by sending to and/or installing on user computing device 120 a data capture application). In some instances, in configuring and/or provisioning user computing device 120, distributed data processing computing platform 110 may generate and/or send one or more configuration instructions to user computing device 120 directing user computing device 120 to perform one or more specific actions.

At step 202, user computing device 120 may detect that a trip has started (e.g., based on processing one or more notifications and/or sensor data indicating that a geo-fence has been broken, based on instructions and/or configuration settings defined by distributed data processing computing platform 110 and/or trip detection module 112*a*, etc.). At step 203, user computing device 120 may initiate data capture (e.g., based on detecting that the trip has started). At step 204, user computing device 120 may capture sensor data (e.g., by receiving and/or storing analog signals and/or digital data received from one or more of sensor(s) 124).

Referring to FIG. 2B, at step 205, user computing device 120 may detect that the trip has ended (e.g., based on processing one or more notifications and/or sensor data indicating that motion has stopped for a predetermined amount of time, based on instructions and/or configuration settings defined by distributed data processing computing platform 110 and/or trip detection module 112*a*, etc.). At step 206, user computing device 120 may send captured sensor data to distributed data processing computing platform 110 (e.g., by sending any and/or all of the raw analog signals and/or digital data received from one or more of sensor(s) 124 to distributed data processing computing platform 110 and/or any and/or all of processed sensor data that may have been locally processed by user computing device 120 after being captured). In some instances, user computing device 120 may send captured sensor data to distributed data processing computing platform 110 in real-time, as sensor data is captured, while the trip is still in progress. In other instances, user computing device 120 may send captured sensor data to distributed data processing computing platform 110 after detecting the end of the trip, as illustrated in the example event sequence.

At step 207, distributed data processing computing platform 110 may receive captured sensor data from user computing device 120. For example, at step 207, distributed data processing computing platform 110 may receive, via the communication interface (e.g., communication interface(s) 115), from a user computing device (e.g., user computing device 120), sensor data captured by the user computing device (e.g., user computing device 120) using one or more sensors (e.g., sensor(s) 124) built into the user computing device (e.g., user computing device 120).

In some instances, receiving the sensor data captured by the user computing device using the one or more sensors built into the user computing device may include receiving data captured by the user computing device using one or more of: an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor. For example, in receiving the sensor data captured by the user computing device (e.g., user computing device 120) using the one or more sensors (e.g., sensor(s) 124) built into the user computing device (e.g., user computing device 120), distributed data processing computing platform 110 may receive data captured by the user computing device (e.g., user computing device 120) using one or more of the one or more accelerometers 124a, the one or more gyroscopes 124b, the one or more magnetometers 124c, the one or more barometers 124d, the one or more gravitometers 124e, the one or more proximity sensors 124f, the one or more ambient light sensors 124g, the one or more ambient temperature sensors 124h, the one or more orientation sensors 124i, the one or more pedometers 124j, the one or more altimeters 124k, the one or more satellite positioning sensors 124m, and/or the one or more activity recognition sensors 124n included in user computing device 120.

At step 208, distributed data processing computing platform 110 may analyze the captured sensor data received from user computing device 120. For example, at step 208, distributed data processing computing platform 110 may analyze the sensor data received from the user computing device (e.g., user computing device 120) by executing one or more data processing modules, such as one or more of the modules stored in memory(s) 112 and described above.

In some instances, analyzing the sensor data received from the user computing device by executing the one or more data processing modules may include executing one or more of a trip detection module, an axis alignment module, a driver detection module, a trip anomaly detection module, an exit point detection module, a left-right exit detection module, a front-rear detection module, an event detection module, a vehicle mode detection module, a places of interest determination module, a destination prediction module, a route prediction module, a customer insights module, or a car tracking module. For instance, in analyzing the sensor data received from the user computing device (e.g., user computing device 120) by executing the one or more data processing modules, distributed data processing computing platform 110 may execute one or more of trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

Referring to FIG. 2C, at step 209, distributed data processing computing platform 110 may generate trip record data (which may, e.g., include information identifying one or more features of the trip associated with the captured sensor data received from user computing device 120). For example, at step 209, distributed data processing computing platform 110 may generate trip record data based on analyzing the sensor data received from the user computing device (e.g., user computing device 120). At step 210, distributed data processing computing platform 110 may store the trip record data. For instance, at step 210, distributed data processing computing platform 110 may store the trip record data in a trip record database. At step 211, distributed data processing computing platform 110 may generate user data (which may, e.g., include new and/or updated user-specific data determined by distributed data processing computing platform 110 for the user of user computing device 120 as a result of the occurrence of the trip associated with the captured sensor data received from user computing device 120, such as new and/or updated user-specific points-of-interest data). For example, at step 211, distributed data processing computing platform 110 may generate user record data based on analyzing the sensor data received from the user computing device (e.g., user computing device 120). At step 212, distributed data processing computing platform 110 may store the user data. For instance, at step 212, distributed data processing computing platform 110 may store the user record data in a user record database.

Figure 2D:
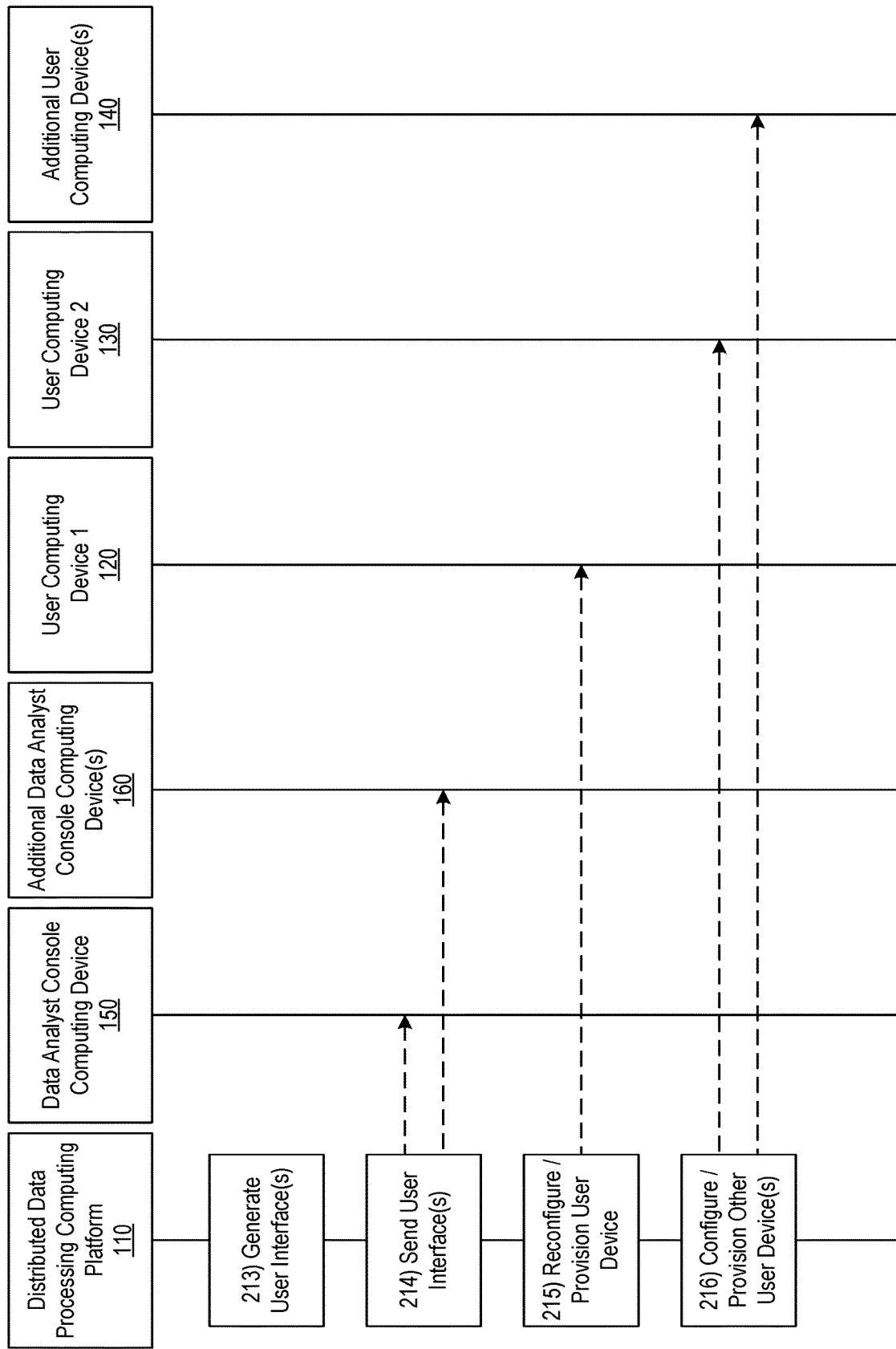

Referring to FIG. 2D, at step 213, distributed data processing computing platform 110 may generate one or more user interfaces (which may, e.g., include data analysis results specific to the user of user computing device 120 and/or aggregated across different users of different user computing devices, and/or which may, e.g., enable a data analyst to view and/or interact with the data analysis results, configure distributed data processing computing platform 110 and/or one or more user computing devices, and/or perform other functions). At step 214, distributed data processing computing platform 110 may send the one or more user interfaces to data analyst console computing device 150 and/or additional data analyst console computing devices 160.

At step 215, distributed data processing computing platform 110 may reconfigure and/or re-provision user computing device 120 (e.g., based on the occurrence of the previously detected trip, based on new and/or updated configuration settings implemented by distributed data processing computing platform 110, based on new and/or updated configuration input received from data analyst console computing device 150 and/or additional data analyst console computing devices 160, etc.). At step 216, distributed data processing computing platform 110 may configure and/or provision one or more other user computing devices, such as user computing device 130 and/or additional user computing devices 140, similar to how distributed data processing computing platform 110 may configure and/or reconfigure user computing device 120.

In one or more examples discussed above, functionality provided by (and/or functions performed by) distributed data processing computing platform 110 may be distributed across a plurality of different computing devices and/or computer systems that may make up and/or be included in distributed data processing computing platform 110. In one or more alternative arrangements, similar functionality may be provided by (and/or similar functions may be performed by) a single source system. Such a single source system might not be a distributed system, for instance, but may otherwise incorporate one or more aspects of distributed data processing computing platform 110 and thus may embody one or more alternative aspects of the disclosure.

Figure 3:
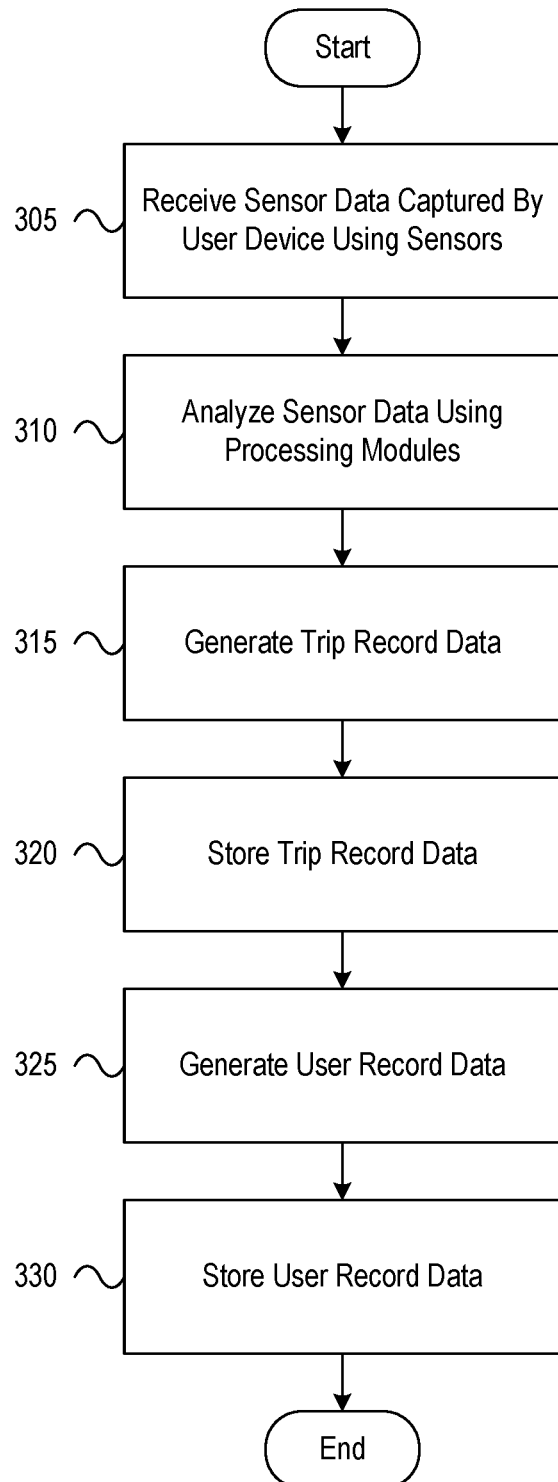
FIG. 3 depicts an illustrative method for processing remotely captured sensor data in accordance with one or more example embodiments.

FIG. 3 depicts an illustrative method for processing remotely captured sensor data in accordance with one or more example embodiments. Referring to FIG. 3, at step 305, a computing platform having at least one processor, a communication interface, and memory storing computer-readable instructions may receive, via the communication interface, from a user computing device, sensor data captured by the user computing device using one or more sensors built into the user computing device. At step 310, the computing platform may analyze the sensor data received from the user computing device by executing one or more data processing modules. At step 315, the computing platform may generate trip record data based on analyzing the sensor data received from the user computing device. At step 320, the computing platform may store the trip record data in a trip record database. At step 325, the computing platform may generate user record data based on analyzing the sensor data received from the user computing device. At step 330, the computing platform may store the user record data in a user record database.

Figure 4:
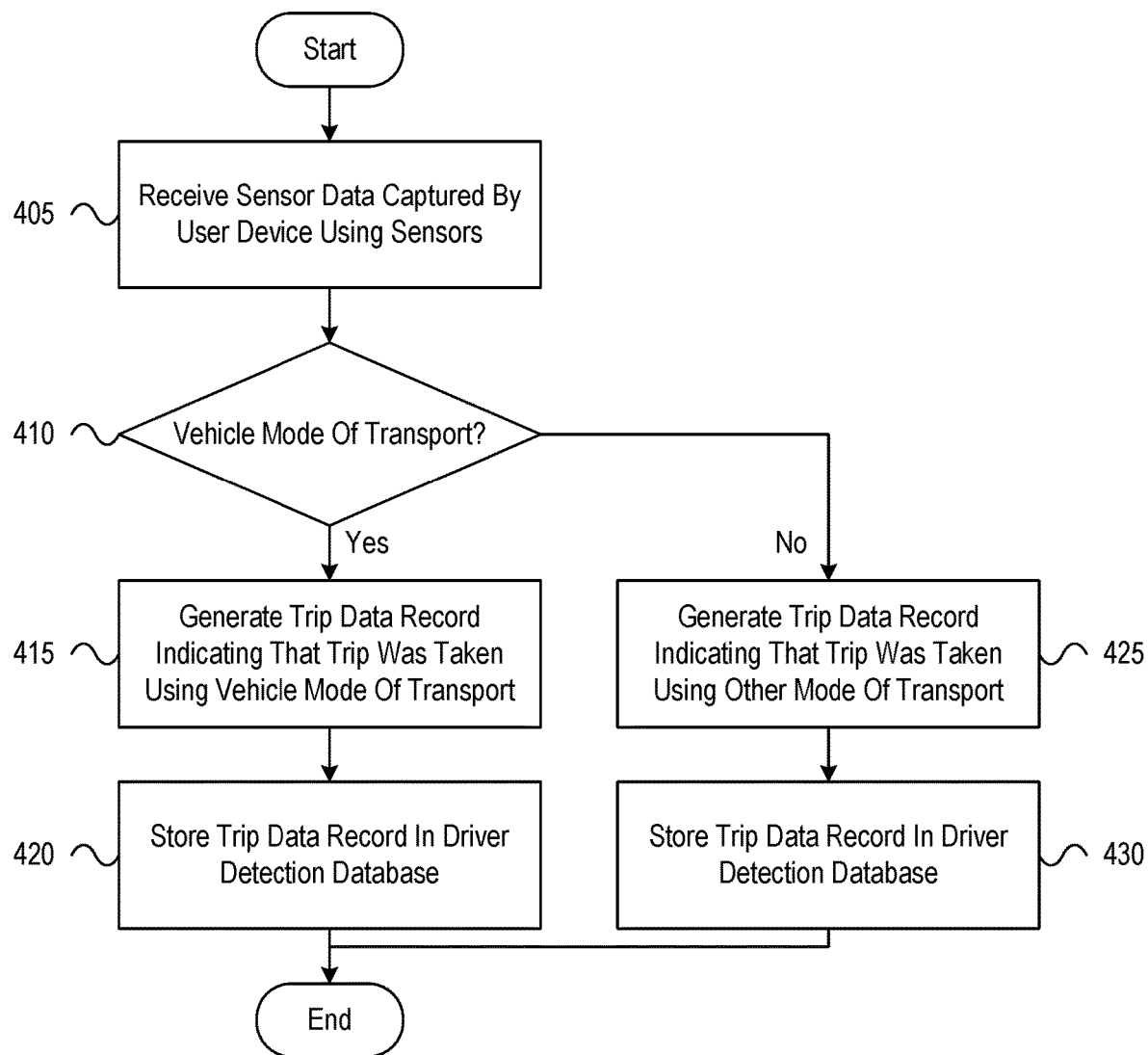
FIG. 4 depicts an illustrative method for processing sensor data to determine a mode of transport associated with a trip in accordance with one or more example embodiments.

FIG. 4 depicts an illustrative method for processing sensor data to determine a mode of transport associated with a trip in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 4, at step 405, distributed data processing computing platform 110 may receive sensor data captured by a user device. For example, at step 405, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120).

At step 410, distributed data processing computing platform 110 may analyze the sensor data. For example, at step 410, distributed data processing computing platform 110 may analyze the sensor data received from the first user computing device (e.g., user computing device 120) to determine whether a first trip recorded in the sensor data received from the first user computing device (e.g., user computing device 120) was taken using a vehicle mode of transport or a non-vehicle mode of transport. For instance, a trip taken using a vehicle mode of transport may correspond to a trip taken in a car or other type of automobile. A trip taken using a non-vehicle mode of transport may correspond to a trip taken in a train, a boat, a motorcycle, a bicycle, a plane, or another type of non-automobile trip.

If the trip was taken using a vehicle mode of transport, at step 415, distributed data processing computing platform 110 may generate trip record data. For example, at step 415, based on determining that the first trip recorded in the sensor data received from the first user computing device (e.g., user computing device 120) was taken using the vehicle mode of transport, distributed data processing computing platform 110 may generate first vehicular trip record data indicating that the first trip recorded in the sensor data received from the first user computing device (e.g., user computing device 120) was taken using the vehicle mode of transport. At step 420, distributed data processing computing platform 110 may store the trip record data. For example, at step 420, distributed data processing computing platform 110 may store the first vehicular trip record data in a driver detection database (which may, e.g., be maintained by and/or otherwise associated with driver detection module 112c).

Alternatively, if the trip was taken using a non-vehicle mode of transport, at step 425, distributed data processing computing platform 110 may generate different trip record data. For example, at step 425, based on determining that the first trip recorded in the sensor data received from the first user computing device (e.g., user computing device 120) was taken using the non-vehicle mode of transport, distributed data processing computing platform 110 may generate first non-vehicular trip record data indicating that the first trip recorded in the sensor data received from the first user computing device (e.g., user computing device 120) was taken using the non-vehicle mode of transport. At step 430, distributed data processing computing platform 110 may store the trip record data. For example, at step 430, distributed data processing computing platform 110 may store the first non-vehicular trip record data in the driver detection database (which may, e.g., be maintained by and/or otherwise associated with driver detection module 112c).

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 405, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, analyzing the sensor data received from the first user computing device may include determining that the first trip recorded in the sensor data received from the first user computing device was taken using the vehicle mode of transport based on determining that the first trip recorded in the sensor data received from the first user computing device was taken using a car. For example, in analyzing the sensor data received from the first user computing device (e.g., user computing device 120) at step 410, distributed data processing computing platform 110 may determine that the first trip recorded in the sensor data received from the first user computing device (e.g., user computing device 120) was taken using the vehicle mode of transport based on determining that the first trip recorded in the sensor data received from the first user computing device (e.g., user computing device 120) was taken using a car. In some instances, distributed data processing computing platform 110 may identify a car trip (e.g., a vehicle trip) and/or distinguish between a car trip and a non-car trip based features of the trip that distributed data processing computing platform 110 may calculate based on the sensor data, such as location-based features and/or motion-based features, as discussed below.

In some instances, analyzing the sensor data received from the first user computing device may include determining that the first trip recorded in the sensor data received from the first user computing device was taken using the non-vehicle mode of transport based on determining that the first trip recorded in the sensor data received from the first user computing device was taken using a train, a plane, a boat, a motorcycle, or a bicycle. For example, in analyzing the sensor data received from the first user computing device (e.g., user computing device 120) at step 410, distributed data processing computing platform 110 may determine that the first trip recorded in the sensor data received from the first user computing device (e.g., user computing device 120) was taken using the non-vehicle mode of transport based on determining that the first trip recorded in the sensor data received from the first user computing device (e.g., user computing device 120) was taken using a train, a plane, a boat, a motorcycle, or a bicycle. In some instances, distributed data processing computing platform 110 may identify a non-car trip (e.g., a non-vehicle trip) and/or distinguish between a car trip and a non-car trip based features of the trip that distributed data processing computing platform 110 may calculate based on the sensor data, such as location-based features and/or motion-based features, as discussed below.

In some instances, analyzing the sensor data received from the first user computing device may include: calculating a plurality of features of the first trip based on the sensor data received from the first user computing device; determining a probability value indicative of whether the first trip recorded in the sensor data received from the first user computing device was taken using the vehicle mode of transport or the non-vehicle mode of transport based on the plurality of features of the first trip calculated based on the sensor data received from the first user computing device; determining that the first trip recorded in the sensor data received from the first user computing device was taken using the vehicle mode of transport based on the probability value exceeding a predetermined threshold; and determining that the first trip recorded in the sensor data received from the first user computing device was taken using the non-vehicle mode of transport based on the probability value not exceeding the predetermined threshold. For example, in analyzing the sensor data received from the first user computing device (e.g., user computing device 120) at step 410, distributed data processing computing platform 110 may calculate a plurality of features of the first trip based on the sensor data received from the first user computing device (e.g., user computing device 120). The features may be statistical features that distributed data processing computing platform 110 may calculate using statistical functions, such as statistical functions that take the sensor data received from user computing device 120 as an input and compute changes in acceleration and/or other variables during the trip based on the sensor data. Subsequently, distributed data processing computing platform 110 may determine a probability value indicative of whether the first trip recorded in the sensor data received from the first user computing device (e.g., user computing device 120) was taken using the vehicle mode of transport or the non-vehicle mode of transport based on the plurality of features of the first trip calculated based on the sensor data received from the first user computing device (e.g., user computing device 120). The probability value may be determined by distributed data processing computing platform 110 using statistical functions that relate the computed features of the current trip to corresponding features of past trips for which distributed data processing computing platform 110 maintains records. Subsequently, distributed data processing computing platform 110 may determine that the first trip recorded in the sensor data received from the first user computing device (e.g., user computing device 120) was taken using the vehicle mode of transport based on the probability value exceeding a predetermined threshold (which may, e.g., be determined and/or set by distributed data processing computing platform 110 based on records of past trips maintained by distributed data processing computing platform 110). Alternatively, distributed data processing computing platform 110 may determine that the first trip recorded in the sensor data received from the first user computing device (e.g., user computing device 120) was taken using the non-vehicle mode of transport based on the probability value not exceeding the predetermined threshold.

In some instances, calculating the plurality of features of the first trip based on the sensor data received from the first user computing device may include calculating one or more location-based features of the first trip based on the sensor data received from the first user computing device. For example, in calculating the plurality of features of the first trip based on the sensor data received from the first user computing device (e.g., user computing device 120), distributed data processing computing platform 110 may calculate one or more location-based features of the first trip based on the sensor data received from the first user computing device (e.g., user computing device 120). In some instances, calculating the plurality of features of the first trip based on the sensor data received from the first user computing device may include calculating one or more motion-based features of the first trip based on the sensor data received from the first user computing device. For example, in calculating the plurality of features of the first trip based on the sensor data received from the first user computing device (e.g., user computing device 120), distributed data processing computing platform 110 may calculate one or more motion-based features of the first trip based on the sensor data received from the first user computing device (e.g., user computing device 120).

In some instances, the location-based features calculated by distributed data processing computing platform 110 may correspond to location-oriented elements extracted by distributed data processing computing platform 110 from the sensor data received from user computing device 120. For example, the sensor data (which may, e.g., also be referred to as a "signal") may correspond to a single trip taken by the user of user computing device 120 from a starting point to a destination and may include several time series of points associated with the trip. Each point in the one or more location-oriented time series may include a latitude, a longitude, and a timestamp, and these data points may form the raw signal that is processed by distributed data processing computing platform 110. Distributed data processing computing platform 110 also may addition location context to this raw signal by retrieving other location information from other sources, such as map data that may be obtained from shape files or map information databases. Distributed data processing computing platform 110 may merge this information together to calculate variables or other features that describe the mode of transport used in the trip based on location.

Additionally or alternatively, the motion-based features calculated by distributed data processing computing platform 110 might not be specific to a particular location and instead may be location-independent. So, for instance, motion-based features may describe motion captured by accelerometers, gyroscopes, and other sensors, as opposed to motion captured as changes in location by a satellite positioning system, for example. In some instances, distributed data processing computing platform 110 may determine motion-based features by recognizing and/or comparing patterns in the captured sensor data. In addition, distributed data processing computing platform 110 may determine location-based features based on map data, which may, for instance, indicate businesses and other places that are close to the user and/or other map features, such as population density, that may be used by distributed data processing computing platform 110 in determining whether the user of distributed data processing computing platform 110 was a driver during a particular trip and/or in making other determinations. For example, at a population level, it may be more likely that a vehicle trip taken in a densely populated area is not taken in a user's own vehicle, whereas it may be more likely that a vehicle trip taken in a less populated area is taken in a user's own vehicle, and distributed data processing computing platform 110 may use such an assumption in calculating probability values associated with driver detection data (which may, e.g., be determined by distributed data processing computing platform 110, as discussed below, and may indicate whether the user of a user device, such as user computing device 120, was likely a driver of a vehicle during a particular trip or a passenger of the vehicle during the particular trip).

In some instances, in calculating motion-based features from captured sensor data, distributed data processing computing platform 110 may use one or more Gaussian mixture models. For example, accelerometers, gyroscopes, and other sensors in a user device, such as user computing device 120, may output relatively high-frequency data, and distributed data processing computing platform 110 may use a Gaussian mixture model to determine features and/or fit models on top of such high-frequency data, as such a Gaussian mixture model may identify specific components of the signal data in terms of several Gaussian distributions. For example, a Gaussian mixture model applied to accelerometer data associated with a vehicle trip may have two Gaussian distributions (e.g., one distribution corresponding to braking and one distribution corresponding to accelerating). Distributed data processing computing platform 110 may then use patterns in these distributions to distinguish between car trips, bus trips, train trips, and/or the like to then figure out whether the user of user computing device 120 is driving or not.

In some instances, distributed data processing computing platform 110 may use location-based features and motion-based features in combination to more accurately determine the probability whether a particular trip was a vehicle trip or not. In addition, based on the probability determined by distributed data processing computing platform 110, distributed data processing computing platform 110 may assign a label to a record corresponding to the trip, and the label may indicate whether there is a strong likelihood that the trip was a vehicle trip, a medium likelihood that the trip was a vehicle trip, a low likelihood that the trip was a vehicle trip, or the like. Additionally or alternatively, the probability value itself and/or the label determined by distributed data processing computing platform 110 may be shared with the driver detection module (e.g., driver detection module 112c).

In some instances, based on determining that the first trip recorded in the sensor data received from the first user computing device (e.g., user computing device 120) was taken using the vehicle mode of transport (e.g., at step 410), distributed data processing computing platform 110 may generate a notification indicating that the first trip recorded in the sensor data received from the first user computing device (e.g., user computing device 120) was taken using the vehicle mode of transport. In addition, distributed data processing computing platform 110 may send, via the communication interface (e.g., communication interface 115), to the first user computing device (e.g., user computing device 120), the notification indicating that the first trip recorded in the sensor data received from the first user computing device (e.g., user computing device 120) was taken using the vehicle mode of transport. In addition, by sending the notification to the first user computing device (e.g., user computing device 120), distributed data processing computing platform 110 may cause the first user computing device (e.g., user computing device 120) to wake and display the notification indicating that the first trip recorded in the sensor data received from the first user computing device (e.g., user computing device 120) was taken using the vehicle mode of transport. In some instances, the notification also may prompt the user of user computing device 120 to confirm the determination made by distributed data processing computing platform 110 (e.g., to confirm whether or not the trip was actually taken using the vehicle mode of transport). The user's responsive input may be communicated back to distributed data processing computing platform 110 and may be used by distributed data processing computing platform 110 in improving future predictions (e.g., input confirming the determination suggests that the models being used by distributed data processing computing platform 110 have a relatively high degree of confidence, whereas input rejecting the determination suggests that the models being used by distributed data processing computing platform 110 require revision and/or have a relatively low degree of confidence).

In some instances, based on generating the first vehicular trip record data indicating that the first trip recorded in the sensor data received from the first user computing device (e.g., user computing device 120) was taken using the vehicle mode of transport (e.g., at step 415), distributed data processing computing platform 110 may send the first vehicular trip record data to a data analyst console computing device (e.g., data analyst console computing device 150). In addition, by sending the first vehicular trip record data to the data analyst console computing device (e.g., data analyst console computing device 150), distributed data processing computing platform 110 may cause the data analyst console computing device (e.g., data analyst console computing device 150) to wake and display the first vehicular trip record data indicating that the first trip recorded in the sensor data received from the first user computing device (e.g., user computing device 120) was taken using the vehicle mode of transport. For instance, data analyst console computing device 150 may display such data to an analyst and prompt the analyst to review and/or confirm the vehicle-mode determination that was automatically made by distributed data processing computing platform 110 based on the modeling and calculations discussed above.

In some instances, based on determining that the first trip recorded in the sensor data received from the first user computing device (e.g., user computing device 120) was taken using the vehicle mode of transport (e.g., at step 410), distributed data processing computing platform 110 may generate one or more autonomous driving commands for a vehicle used in completing the first trip recorded in the sensor data received from the first user computing device (e.g., user computing device 120). Subsequently, distributed data processing computing platform 110 may send the one or more autonomous driving commands to the vehicle used in completing the first trip recorded in the sensor data received from the first user computing device (e.g., user computing device 120). In addition, by sending the one or more autonomous driving commands to the vehicle used in completing the first trip recorded in the sensor data received from the first user computing device (e.g., user computing device 120), distributed data processing computing platform 110 may cause the vehicle to execute one or more autonomous driving actions in accordance with the one or more autonomous driving commands. For example, distributed data processing computing platform 110 may send such autonomous driving commands to the vehicle to control acceleration, deceleration, steering, navigation, all-wheel drive, and/or safety features of the vehicle during a future trip based on the identified mode of travel and/or based on other features identified by distributed data processing computing platform 110 during processing of the captured sensor data.

In some instances, after analyzing the sensor data received from user computing device 120 at step 410, distributed data processing computing platform 110 may receive and analyze sensor data from another user device, such as user computing device 130. For example, distributed data processing computing platform 110 may receive, via the communication interface, from a second user computing device (e.g., user computing device 130), sensor data captured by the second user computing device (e.g., user computing device 130) using one or more sensors built into the second user computing device (e.g., user computing device 130). Subsequently, distributed data processing computing platform 110 may analyze the sensor data received from the second user computing device (e.g., user computing device 130) to determine whether a second trip recorded in the sensor data received from the second user computing device (e.g., user computing device 130) was taken using a vehicle mode of transport or a non-vehicle mode of transport.

Based on determining that the second trip recorded in the sensor data received from the second user computing device (e.g., user computing device 130) was taken using the vehicle mode of transport, distributed data processing computing platform 110 may generate second vehicular trip record data indicating that the second trip recorded in the sensor data received from the second user computing device (e.g., user computing device 130) was taken using the vehicle mode of transport. In addition, distributed data processing computing platform 110 may store the second vehicular trip record data in the driver detection database (which may, e.g., be maintained by and/or otherwise associated with driver detection module 112*c*). Alternatively, based on determining that the second trip recorded in the sensor data received from the second user computing device (e.g., user computing device 130) was taken using the non-vehicle mode of transport, distributed data processing computing platform 110 may generate second non-vehicular trip record data indicating that the second trip recorded in the sensor data received from the second user computing device (e.g., user computing device 130) was taken using the non-vehicle mode of transport. In addition, distributed data processing computing platform 110 may store the second non-vehicular trip record data in the driver detection database (which may, e.g., be maintained by and/or otherwise associated with driver detection module 112*c*).

Figure 5:
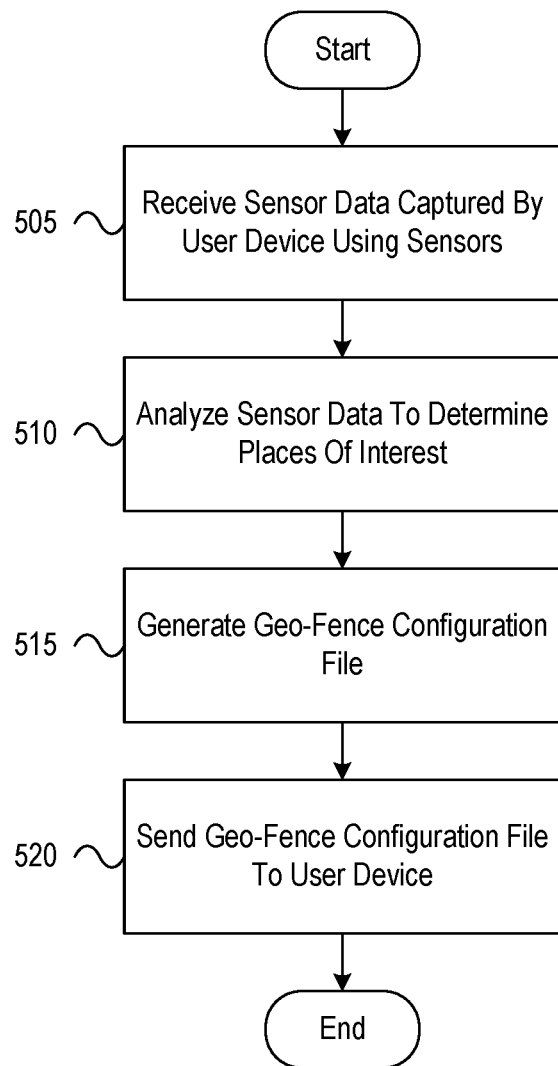
FIG. 5 depicts an illustrative method for processing sensor data to determine one or more places of interest associated with a user in accordance with one or more example embodiments.

FIG. 5 depicts an illustrative method for processing sensor data to determine one or more places of interest associated with a user in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 5, at step 505, distributed data processing computing platform 110 may receive sensor data captured by a user device. For example, at step 505, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120). At step 510, distributed data processing computing platform 110 may analyze the sensor data to determine one or more places of interest. For example, at step 510, distributed data processing computing platform 110 may analyze the sensor data received from the first user computing device (e.g., user computing device 120) to determine a first set of one or more places of interest for a first user of the first user computing device (e.g., user computing device 120).

At step 515, distributed data processing computing platform 110 may generate a geo-fence configuration file. For example, at step 515, distributed data processing computing platform 110 may generate a first geo-fence configuration file for the first user computing device (e.g., user computing device 120) based on determining the first set of one or more places of interest for the first user of the first user computing device (e.g., user computing device 120). In addition, the first geo-fence configuration file generated for the first user computing device (e.g., user computing device 120) by distributed data processing computing platform 110 may include configuration information defining at least one geo-fence around each place of interest of the first set of one or more places of interest for the first user of the first user computing device (e.g., user computing device 120).

At step 520, distributed data processing computing platform 110 may send the geo-fence configuration file to the user device. For example, at step 520, distributed data processing computing platform 110 may send, via the communication interface (e.g., communication interface 115), to the first user computing device (e.g., user computing device 120), the first geo-fence configuration file generated for the first user computing device (e.g., user computing device 120). In addition, by sending the first geo-fence configuration file to the first user computing device (e.g., user computing device 120), distributed data processing computing platform 110 may cause the first user computing device (e.g., user computing device 120) to update one or more configuration settings to implement the at least one geo-fence defined by the configuration information included in the first geo-fence configuration file. For instance, distributed data processing computing platform 110 may cause user computing device 120 to update settings that implement the geo-fences defined around the places of interest that were determined and/or otherwise identified for the user of user computing device 120 by distributed data processing computing platform 110. Such places of interests may, for instance, correspond to the user's home, workplace, or other frequently visited places. When a geo-fence is broken, user computing device 120 may initiate a data recording process in which sensor data is captured and/or shared with distributed data processing computing platform 110. In addition, such geo-fences may be used to anonymize the sensor data captured by user computing device 120, such that the user's home, workplace, etc. is not identifiable in future data that is captured and/or shared with distributed data processing computing platform 110.

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 505, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, in analyzing the sensor data received from the first user computing device to determine the first set of one or more places of interest for the first user of the first user computing device, distributed data processing computing platform 110 may use a clustering algorithm to identify the places of interest for the first user of the first user computing device. For example, in analyzing the sensor data received from the first user computing device (e.g., user computing device 120) to determine the first set of one or more places of interest for the first user of the first user computing device (e.g., user computing device 120) at step 510, distributed data processing computing platform 110 may retrieve, from a historical trip information database (which may, e.g., be stored and/or maintained by distributed data processing computing platform 110), trip information identifying a plurality of trips taken by the first user of the first user computing device (e.g., user computing device 120) and captured by the first user computing device (e.g., user computing device 120). Such trip information may, for instance, include geographic coordinates of locations and corresponding timestamps associated with each trip of the plurality of trips taken by the first user of the first user computing device (e.g., user computing device 120).

Subsequently, distributed data processing computing platform 110 may generate a list of trip endpoints for the first user of the first user computing device (e.g., user computing device 120) based on the trip information retrieved from the historical trip information database. Each endpoint may, for instance, include geographic coordinates (e.g., latitude and longitude) of an ending location of a trip. Then, distributed data processing computing platform 110 may apply a clustering algorithm to the list of trip endpoints for the first user of the first user computing device (e.g., user computing device 120) to identify a plurality of clusters associated with the first user of the first user computing device (e.g., user computing device 120). For instance, distributed data processing computing platform 110 may use a DBSCAN clustering algorithm (which may, e.g., not require a pre-analysis indication of how many clusters to identify) to cluster the endpoints. This clustering might be needed, for instance, because satellite location signals, such as GPS, often have noise, and the clustering algorithm may enable distributed data processing computing platform 110 to group points together that are close enough to be considered a point of interest despite such signal noise.

Subsequently, distributed data processing computing platform 110 may determine a cluster center point for each cluster of the plurality of clusters associated with the first user of the first user computing device (e.g., user computing device 120). The cluster center point of a particular cluster may, for instance, be determined by distributed data processing computing platform 110 by computing the centroid of the plurality of points associated with the particular cluster. Then, distributed data processing computing platform 110 may determine a cluster radius for each cluster of the plurality of clusters associated with the first user of the first user computing device. The cluster radius of a particular cluster may, for instance, be determined by distributed data processing computing platform 110 by computing the average length from the cluster center point to each point of the plurality of points associated with the particular cluster.

Subsequently, distributed data processing computing platform 110 may identify one or more clusters of the plurality of clusters associated with the first user of the first user computing device (e.g., user computing device 120) as the first set of one or more places of interest for the first user of the first user computing device (e.g., user computing device 120). In some instances, distributed data processing computing platform 110 may identify all of the clusters of the plurality of clusters associated with the first user of the first user computing device (e.g., user computing device 120) as being the first set of one or more places of interest for the first user of the first user computing device (e.g., user computing device 120), while in other instances, distributed data processing computing platform 110 might identify only a subset of the clusters of the plurality of clusters associated with the first user of the first user computing device (e.g., user computing device 120) as being the first set of one or more places of interest for the first user of the first user computing device (e.g., user computing device 120). In some instances, each identified point of interest may be labeled (e.g., automatically by distributed data processing computing platform 110 and/or manually by prompting the user of user computing device 120). In some instances, it might not be necessary to label points of interest, for instance, when distributed data processing computing platform 110 is identifying points of interest to anonymize trip trails of particular users.

In some instances, retrieving the trip information identifying the plurality of trips taken by the first user of the first user computing device and captured by the first user computing device may include retrieving data associated with a predetermined number of most recent trips taken by the first user of the first user computing device and captured by the first user computing device. For example, in retrieving the trip information identifying the plurality of trips taken by the first user of the first user computing device (e.g., user computing device 120) and captured by the first user computing device (e.g., user computing device 120) when analyzing sensor data at step 510, distributed data processing computing platform 110 may retrieve data associated with a predetermined number of most recent trips taken by the first user of the first user computing device (e.g., user computing device 120) and captured by the first user computing device (e.g., user computing device 120). For instance, distributed data processing computing platform 110 may retrieve data associated with the last fifty of the most recent trips taken by the first user of the first user computing device (e.g., user computing device 120).

In some instances, generating the list of trip endpoints for the first user of the first user computing device may include identifying each trip endpoint of the list of trip endpoints in terms of latitude and longitude coordinates. For example, in generating the list of trip endpoints for the first user of the first user computing device (e.g., user computing device 120) when analyzing sensor data at step 510, distributed data processing computing platform 110 may identify each trip endpoint of the list of trip endpoints in terms of latitude and longitude coordinates. Distributed data processing computing platform 110 may identify trips in this manner because distributed data processing computing platform 110 may use an application programming interface associated with user computing device 120 to instruct user computing device 120 to draw a geo-fence based on the coordinates of a center point for the geo-fence and a radius of the geo-fence. Distributed data processing computing platform 110 may define a plurality of geo-fences for user computing device 120 by generating a configuration file storing the center point and radius data and sending this configuration file to user computing device 120.

In some instances, generating the first geo-fence configuration file for the first user computing device may include generating the configuration information defining the at least one geo-fence around each place of interest of the first set of one or more places of interest for the first user of the first user computing device based on the cluster center point determined for each cluster of the plurality of clusters associated with the first user of the first user computing device and the cluster radius determined for each cluster of the plurality of clusters associated with the first user of the first user computing device. For example, in generating the first geo-fence configuration file for the first user computing device (e.g., user computing device 120) at step 515, distributed data processing computing platform 110 may generate the configuration information defining the at least one geo-fence around each place of interest of the first set of one or more places of interest for the first user of the first user computing device (e.g., user computing device 120) based on the cluster center point determined for each cluster of the plurality of clusters associated with the first user of the first user computing device (e.g., user computing device 120) and the cluster radius determined for each cluster of the plurality of clusters associated with the first user of the first user computing device (e.g., user computing device 120). For instance, distributed data processing computing platform 110 may create and insert, into the configuration information, data specifying the cluster center points and the corresponding cluster radii to generate the geo-fence configuration file.

In some instances, the at least one geo-fence defined by the configuration information included in the first geo-fence configuration file may anonymize location data associated with the first user of the first user computing device. For example, the at least one geo-fence defined by the configuration information included in the first geo-fence configuration file (which may, e.g., be generated by distributed data processing computing platform 110 at step 515) may anonymize location data associated with the first user of the first user computing device (e.g., user computing device 120). For instance, the geo-fence(s) may be used to start sensor-data recording a little bit after the user leaves their home or workplace and/or end sensor-data recording a little bit before the user arrives at their home or workplace. Additionally or alternatively, the geo-fence(s) may be used to anonymize data from real-time services (which may, e.g., integrate with distributed data processing computing platform 110) such as real-time traffic aggregation services.

In some instances, the at least one geo-fence defined by the configuration information included in the first geo-fence configuration file may enable one or more trip detection algorithms to be executed. For example, the at least one geo-fence defined by the configuration information included in the first geo-fence configuration file (which may, e.g., be generated by distributed data processing computing platform 110 at step 515) may enable one or more trip detection algorithms to be executed by and/or on a user device, such as user computing device 120, when initiating and/or ending sensor data recording processes.

In some instances, after sending the geo-fence configuration file to the user device at step 520, distributed data processing computing platform 110 may generate and send one or more notifications to the user device. For example, based on sending the first geo-fence configuration file generated for the first user computing device (e.g., user computing device 120) to the first user computing device (e.g., user computing device 120), distributed data processing computing platform 110 may generate a notification indicating that the at least one geo-fence defined by the configuration information included in the first geo-fence configuration file has been set. In addition, distributed data processing computing platform 110 may send, via the communication interface (e.g., communication interface 115), to the first user computing device (e.g., user computing device 120), the notification indicating that the at least one geo-fence defined by the configuration information included in the first geo-fence configuration file has been set. In addition, by sending the notification to the first user computing device (e.g., user computing device 120), distributed data processing computing platform 110 may cause the first user computing device (e.g., user computing device 120) to wake and display the notification indicating that the at least one geo-fence defined by the configuration information included in the first geo-fence configuration file has been set. For instance, the notification may cause user computing device 120 to wake and/or otherwise switch out of an offline and/or passive mode to an online and/or active mode, and then display content and/or other information associated with the notification.

In some instances, after sending the geo-fence configuration file to the user device at step 520, distributed data processing computing platform 110 may generate and send one or more notifications to an administrative device, such as an analyst device. For example, based on sending the first geo-fence configuration file generated for the first user computing device (e.g., user computing device 120) to the first user computing device (e.g., user computing device 120), distributed data processing computing platform 110 may send the first geo-fence configuration file generated for the first user computing device (e.g., user computing device 120) to a data analyst console computing device (e.g., data analyst console computing device 150). In addition, by sending the first geo-fence configuration file generated for the first user computing device (e.g., user computing device 120) to the data analyst console computing device (e.g., data analyst console computing device 150), distributed data processing computing platform 110 may cause the data analyst console computing device (e.g., data analyst console computing device 150) to wake and display map information associated with the at least one geo-fence defined by the configuration information included in the first geo-fence configuration file. For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

In some instances, after sending the geo-fence configuration file to the user device at step 520, distributed data processing computing platform 110 may generate and send one or more autonomous driving commands to a vehicle and/or an autonomous vehicle control system associated with the user device. For example, based on sending the first geo-fence configuration file generated for the first user computing device (e.g., user computing device 120) to the first user computing device (e.g., user computing device 120), distributed data processing computing platform 110 may generate one or more autonomous driving commands for a vehicle used in completing a vehicle trip recorded in the sensor data received from the first user computing device (e.g., user computing device 120). Subsequently, distributed data processing computing platform 110 may send the one or more autonomous driving commands to the vehicle used in completing the vehicle trip recorded in the sensor data received from the first user computing device (e.g., user computing device 120). In addition, by sending the one or more autonomous driving commands to the vehicle used in completing the vehicle trip recorded in the sensor data received from the first user computing device (e.g., user computing device 120), distributed data processing computing platform 110 may cause the vehicle to execute one or more autonomous driving actions in accordance with the one or more autonomous driving commands.

In some instances, after sending the geo-fence configuration file to the user device at step 520, distributed data processing computing platform 110 may update and/or otherwise modify one or more datasets maintained by distributed data processing computing platform 110. For example, based on sending the first geo-fence configuration file generated for the first user computing device (e.g., user computing device 120) to the first user computing device (e.g., user computing device 120), distributed data processing computing platform 110 may modify one or more aggregate data sets maintained by the computing platform (e.g., distributed data processing computing platform 110) to remove information associating the first set of one or more places of interest with the first user of the first user computing device (e.g., user computing device 120). In some instances, distributed data processing computing platform 110 may modify one or more aggregate data sets maintained by the computing platform (e.g., distributed data processing computing platform 110) to remove information associating the first set of one or more places of interest with the first user of the first user computing device (e.g., user computing device 120) so as to anonymize the one or more aggregate data sets maintained by the computing platform (e.g., distributed data processing computing platform 110), such that the first user of the first user computing device (e.g., user computing device 120) is not identifiable from information included in the one or more aggregate data sets maintained by the computing platform (e.g., distributed data processing computing platform 110). In some instances, this approach may improve privacy and/or data security. Additionally or alternatively, this approach may enable offers and/or other content to be generated and sent based on user locations at a population-level.

For example, until a user device exits an area encircled by a geo-fence and/or otherwise breaks a geo-fence around an anonymized point of interest, distributed data processing computing platform 110 may prevent any and/or all sensor data received from the user device from being shared with other services, such as a real-time traffic aggregation service and/or other services. Similarly, until a user enters an area encircled by a geo-fence around an anonymized point of interest, distributed data processing computing platform 110 may cause any and/or all sensor data received from the user device to be shared with other services, such as a real-time traffic aggregation service and/or other services. In some instances, instead of and/or in addition to anonymizing data using geo-fences, distributed data processing computing platform 110 may similarly anonymize data captured in areas corresponding to particular census blocks. For instance, if a user of a user device traveling in and/or visiting a location in a low-density area, any and/or all sensor data from the user device may be anonymized (e.g., by preventing such data from being shared, since little or no other data may be captured from other user devices in the same area).

In some instances, after sending the geo-fence configuration file to the user device at step 520, distributed data processing computing platform 110 may share and/or otherwise send any and/or all of the sensor data received from the user device to one or more other systems and/or platforms. For example, based on modifying the one or more aggregate data sets maintained by the computing platform (e.g., distributed data processing computing platform 110) to remove the information associating the first set of one or more places of interest with the first user of the first user computing device (e.g., user computing device 120), distributed data processing computing platform 110 may transmit, via the communication interface (e.g., communication interface 115), to a multi-user location services computer system, at least a portion of the sensor data received from the first user computing device in real-time as the sensor data is received. Such a multi-user location services computer system may, for instance, be configured to provide one or more real-time services to other systems and/or devices, such as real-time traffic aggregation services.

In some instances, after sending the geo-fence configuration file to the user device at step 520, distributed data processing computing platform 110 may receive and process sensor data received from another user device, such as user computing device 130, similar to how distributed data processing computing platform 110 may receive and process sensor data received from user computing device 120. For example, after sending the geo-fence configuration file to the user device at step 520, distributed data processing computing platform 110 may receive, via the communication interface (e.g., communication interface 115), from a second user computing device (e.g., user computing device 130), sensor data captured by the second user computing device (e.g., user computing device 130) using one or more sensors built into the second user computing device (e.g., user computing device 130). Subsequently, distributed data processing computing platform 110 may analyze the sensor data received from the second user computing device (e.g., user computing device 130) to determine a second set of one or more places of interest for a second user of the second user computing device (e.g., user computing device 130). Then, distributed data processing computing platform 110 may generate a second geo-fence configuration file for the second user computing device (e.g., user computing device 130) based on determining the second set of one or more places of interest for the second user of the second user computing device (e.g., user computing device 130). In addition, the second geo-fence configuration file generated for the second user computing device (e.g., user computing device 130) may include second configuration information defining at least one geo-fence around each place of interest of the second set of one or more places of interest for the second user of the second user computing device (e.g., user computing device 130). Subsequently, distributed data processing computing platform 110 may send, via the communication interface (e.g., communication interface 115), to the second user computing device (e.g., user computing device 130), the second geo-fence configuration file generated for the second user computing device (e.g., user computing device 130). In addition, by sending the second geo-fence configuration file to the second user computing device (e.g., user computing device 130), distributed data processing computing platform 110 may cause the second user computing device (e.g., user computing device 130) to update one or more configuration settings to implement the at least one geo-fence defined by the second configuration information included in the second geo-fence configuration file.

Figure 6:
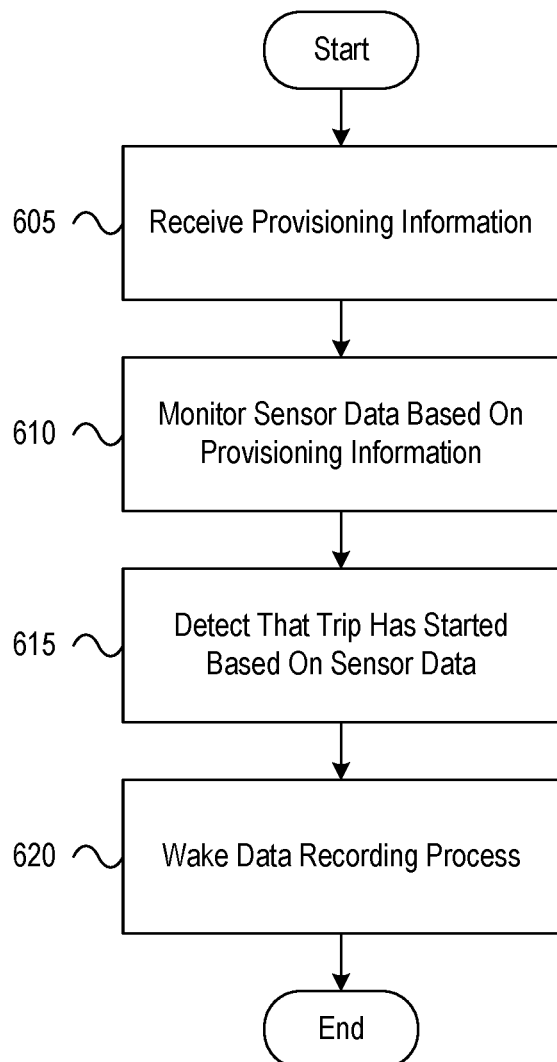
FIG. 6 depicts an illustrative method for processing sensor data to determine when a trip has started in accordance with one or more example embodiments.

FIG. 6 depicts an illustrative method for processing sensor data to determine when a trip has started in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 6, at step 605, user computing device 120 may receive provisioning information. For example, at step 605, user computing device 120 may receive, via the communication interface (e.g., communication interface 125), from a data processing computing platform (e.g., distributed data processing computing platform 110), first provisioning information. At step 610, user computing device 120 may monitor sensor data using one or more built-in sensors. For example, at step 610, user computing device 120 may monitor first sensor data associated with one or more sensors (e.g., the one or more accelerometers 124a, the one or more gyroscopes 124b, the one or more magnetometers 124c, the one or more barometers 124d, the one or more gravitometers 124e, the one or more proximity sensors 124f, the one or more ambient light sensors 124g, the one or more ambient temperature sensors 124h, the one or more orientation sensors 124i, the one or more pedometers 124j, the one or more altimeters 124k, the one or more satellite positioning sensors 124m, and/or the one or more activity recognition sensors 124n) built into the computing device (e.g., user computing device 120) based on the first provisioning information received from the data processing computing platform (e.g., distributed data processing computing platform 110).

At step 615, user computing device 120 may detect that a trip has started based on the sensor data. For example, at step 615, based on monitoring the first sensor data associated with the one or more sensors built into the computing device (e.g., user computing device 120), user computing device 120 may detect that a first trip has started. In some instances, the first trip may correspond to movement of the computing device (e.g., user computing device 120) from a first location to a second location.

At step 620, user computing device 120 may wake a data recording process. For example, at step 620, in response to detecting that the first trip has started, user computing device 120 may wake a data recording process on the computing device (e.g., user computing device 120). In addition, by waking the data recording process on the computing device (e.g., user computing device 120), user computing device 120 may cause the computing device (e.g., user computing device 120) to capture and store second sensor data received from the one or more sensors built into the computing device (e.g., user computing device 120) while the first trip is occurring.

In some instances, receiving the first provisioning information from the data processing computing platform may include receiving configuration information that is generated by the data processing computing platform and that is specific to a specific user of the computing device. For example, in receiving the first provisioning information from the data processing computing platform (e.g., distributed data processing computing platform 110) at step 605, user computing device 120 may receive configuration information that is generated by the data processing computing platform (e.g., distributed data processing computing platform 110) and that is specific to a specific user of the computing device (e.g., user computing device 120). For instance, user computing device 120 may receive configuration information that includes one or more user-specific monitoring parameters, one or more user-specific geo-fences (which may, e.g., be associated with one or more user-specific points of interest), one or more user-specific preferences, and/or other information.

In some instances, receiving the first provisioning information from the data processing computing platform may include receiving configuration information that is generated by the data processing computing platform and that is specific to a current location of the computing device. For example, in receiving the first provisioning information from the data processing computing platform (e.g., distributed data processing computing platform 110) at step 605, user computing device 120 may receive configuration information that is generated by the data processing computing platform (e.g., distributed data processing computing platform 110) and that is specific to a current location of the computing device (e.g., user computing device 120). For instance, user computing device 120 may receive configuration information that includes one or more location-specific monitoring parameters, one or more location-specific geo-fences (which may, e.g., be associated with one or more population-level points of interest that are location-specific), one or more location-specific preferences, and/or other information.

In some instances, receiving the first provisioning information from the data processing computing platform may include receiving a geo-fence configuration file from the data processing computing platform, and the geo-fence configuration file may include configuration information defining at least one geo-fence around each place of interest of a first set of one or more places of interest associated with a specific user of the computing device. For example, in receiving the first provisioning information from the data processing computing platform (e.g., distributed data processing computing platform 110) at step 605, user computing device 120 may receive a geo-fence configuration file from the data processing computing platform (e.g., distributed data processing computing platform 110), and the geo-fence configuration file may include configuration information defining at least one geo-fence around each place of interest of a first set of one or more places of interest associated with a specific user of the computing device (e.g., user computing device 120). For instance, user computing device 120 may receive a geo-fence configuration file that is generated by distributed data processing computing platform 110 in the example process discussed above with respect to FIG. 5.

In some instances, the geo-fence configuration file may be generated by the data processing computing platform based on analyzing sensor data received from the computing device and captured by the computing device using one or more sensors built into the computing device. For example, the geo-fence configuration file (which may, e.g., be received by user computing device 120 at step 605) may be generated by the data processing computing platform (e.g., distributed data processing computing platform 110) based on distributed data processing computing platform 110 analyzing sensor data received from the computing device (e.g., user computing device 120) and captured by the computing device (e.g., user computing device 120) using one or more sensors built into the computing device (e.g., user computing device 120).

In some instances, monitoring the first sensor data associated with the one or more sensors built into the computing device may include analyzing sensor data received from a subset of the one or more sensors built into the computing device while operating in a passive processing state. For example, in monitoring the first sensor data associated with the one or more sensors built into the computing device (e.g., user computing device 120) at step 610, user computing device 120 may analyze sensor data received from a subset of the one or more sensors built into the computing device (e.g., user computing device 120) while operating in a passive processing state. For instance, in the passive processing state, user computing device 120 might only perform limited monitoring of certain sensors, different from the full set of sensors available to and/or installed in user computing device 120, so as to conserve power and/or other processing resources while capturing sensor data.

In some instances, detecting that the first trip has started may include determining that a first geo-fence of one or more geo-fences defined in a geo-fence configuration file received from the data processing computing platform has been broken. For example, in detecting that the first trip has started at step 615, user computing device 120 may determine that a first geo-fence of one or more geo-fences defined in a geo-fence configuration file received from the data processing computing platform (e.g., distributed data processing computing platform 110) has been broken.

In some instances, determining that the first geo-fence of the one or more geo-fences defined in the geo-fence configuration file received from the data processing computing platform has been broken may include determining that a last-known-location geo-fence defined in the geo-fence configuration file received from the data processing computing platform has been broken. For example, in determining that the first geo-fence of the one or more geo-fences defined in the geo-fence configuration file received from the data processing computing platform (e.g., distributed data processing computing platform 110) has been broken (e.g., when detecting that the first trip has started at step 615), user computing device 120 may determine that a last-known-location geo-fence defined in the geo-fence configuration file received from the data processing computing platform (e.g., distributed data processing computing platform 110) has been broken.

In some instances, determining that the first geo-fence of the one or more geo-fences defined in the geo-fence configuration file received from the data processing computing platform has been broken may include determining that a places-of-interest geo-fence defined in the geo-fence configuration file received from the data processing computing platform has been broken. For example, in determining that the first geo-fence of the one or more geo-fences defined in the geo-fence configuration file received from the data processing computing platform (e.g., distributed data processing computing platform 110) has been broken (e.g., when detecting that the first trip has started at step 615), user computing device 120 may determine that a places-of-interest geo-fence defined in the geo-fence configuration file received from the data processing computing platform (e.g., distributed data processing computing platform 110) has been broken. Such a places-of-interest geo-fence defined in the geo-fence configuration file received from the data processing computing platform (e.g., distributed data processing computing platform 110) may, for instance, be a geo-fence that was calculated and/or otherwise determined by distributed data processing computing platform 110 in the example process discussed above with respect to FIG. 5.

In some instances, determining that the first geo-fence of the one or more geo-fences defined in the geo-fence configuration file received from the data processing computing platform has been broken may include determining that a frequently-visited-location geo-fence defined in the geo-fence configuration file received from the data processing computing platform has been broken. For example, in determining that the first geo-fence of the one or more geo-fences defined in the geo-fence configuration file received from the data processing computing platform (e.g., distributed data processing computing platform 110) has been broken (e.g., when detecting that the first trip has started at step 615), user computing device 120 may determine that a frequently-visited-location geo-fence defined in the geo-fence configuration file received from the data processing computing platform (e.g., distributed data processing computing platform 110) has been broken. Such a frequently-visited-location geo-fence may, for instance, be a geo-fence that is calculated and/or otherwise determined by an operating system running on user computing device 120 (e.g., instead of being determined by distributed data processing computing platform 110, like the places-of-interest geo-fence discussed in the example above).

In some instances, detecting that the first trip has started may include determining that a vehicle trip has started based on analyzing the first sensor data associated with the one or more sensors built into the computing device. For example, in detecting that the first trip has started at step 615, user computing device 120 may determine that a vehicle trip has started based on analyzing the first sensor data associated with the one or more sensors built into the computing device (e.g., user computing device 120). For instance, user computing device 120 may recognize a vehicle trip and/or otherwise determine that a vehicle trip has started using one or more of the techniques and/or methods described above with respect to the vehicle mode of transport detection module and/or FIG. 4. Additionally or alternatively, user computing device 120 may use activity recognition information obtained from an activity recognition sensor or module (e.g., to recognize vehicle trips while filtering out subway trips being taken by the user of user computing device 120). In some instances, user computing device 120 might only record vehicle trips, while in other instances, user computing device 120 may record vehicle trips along with other types of trips, such as subway trips. This approach may enable user computing device 120 and/or distributed data processing computing platform 110 to distinguish between data from different types of trips (e.g., vehicle trips vs. subway trips) so as to identify patterns and/or signatures that subsequently enable user computing device 120 and/or distributed data processing computing platform 110 to distinguish vehicle trips from other types of trips automatically based only on sensor data being captured by a user device, such as user computing device 120. Additionally or alternatively, information associated with the types of trips being taken by a user of a user device, such as user computing device 120, when in a particular location or locations, may enable user computing device 120 and/or distributed data processing computing platform 110 to generate and/or provide location-based offers and/or other location-specific content.

In some instances, waking the data recording process on the computing device may include recording data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the computing device. For example, in waking the data recording process on the computing device (e.g., user computing device 120) at step 620, user computing device 120 may start capturing and/or otherwise may record data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the computing device (e.g., user computing device 120).

In some instances, waking the data recording process on the computing device may cause the computing device to send at least a portion of the second sensor data received from the one or more sensors built into the computing device to the data processing computing platform in real-time while the first trip is occurring. For example, in waking the data recording process on the computing device (e.g., user computing device 120) at step 620, user computing device 120 may cause the computing device (e.g., user computing device 120) to send at least a portion of the second sensor data received from the one or more sensors built into the computing device (e.g., user computing device 120) to the data processing computing platform (e.g., distributed data processing computing platform 110) in real-time while the first trip is occurring and/or is otherwise in progress. This arrangement may, for instance, enable distributed data processing computing platform 110 to process such sensor data and provide other functionality to user computing device 120 in real-time and/or in near-real-time while the trip is occurring and/or is otherwise in progress.

In some instances, waking the data recording process on the computing device may cause the computing device to send at least a portion of the second sensor data received from the one or more sensors built into the computing device to the data processing computing platform when the first trip is completed. For in waking the data recording process on the computing device (e.g., user computing device 120) at step 620, user computing device 120 may cause the computing device (e.g., user computing device 120) to send at least a portion of the second sensor data received from the one or more sensors built into the computing device (e.g., user computing device 120) to the data processing computing platform (e.g., distributed data processing computing platform 110) when the first trip is completed. For instance, instead of or in addition to sending such sensor data to distributed data processing computing platform 110 in real-time, user computing device 120 may send the sensor data to distributed data processing computing platform 110 when the trip is completed (e.g., when or shortly after user computing device 120 detects and/or otherwise determines that the trip has concluded).

In some instances, after waking the data recording process on the computing device (e.g., user computing device 120) at step 620, user computing device 120 may detect that the first trip has ended. Subsequently, based on detecting that the first trip has ended, user computing device 120 send, via the communication interface (e.g., communication interface 125), to the data processing computing platform (e.g., distributed data processing computing platform 110), a notification comprising information indicating that the first trip has ended. In addition, by sending the notification comprising the information indicating that the first trip has ended, user computing device 120 may cause the data processing computing platform (e.g., distributed data processing computing platform 110) to generate and send second provisioning information to the computing device (e.g., user computing device 120), and the second provisioning information may be associated with an ending location of the first trip. For instance, the notification may indicate that the trip is complete and may inform distributed data processing computing platform 110 of the new, current location of user computing device 120, so that distributed data processing computing platform 110 may draw new geo-fences around the new, current location of user computing device 120. Distributed data processing computing platform 110 may execute a new analysis for the new, current location of user computing device 120, determine new geo-fences, generate a new geo-fence configuration file and/or other new provisioning information, and may send the new provisioning information (which may, e.g., include the new geo-fence configuration file) to user computing device 120. In some instances, this new provisioning process may occur even if the recently-completed trip was not a vehicle trip. For instance, if the user of user computing device 120 walks to a new location that is a significant distance away from a previous location (e.g., two or more miles), user computing device 120 may send a notification to distributed data processing computing platform 110 indicating that there has been a significant location change, even if a vehicle trip has not been detected, so that distributed data processing computing platform 110 may generate new geo-fences and/or provide other updated provisioning information to user computing device 120.

Figure 7:
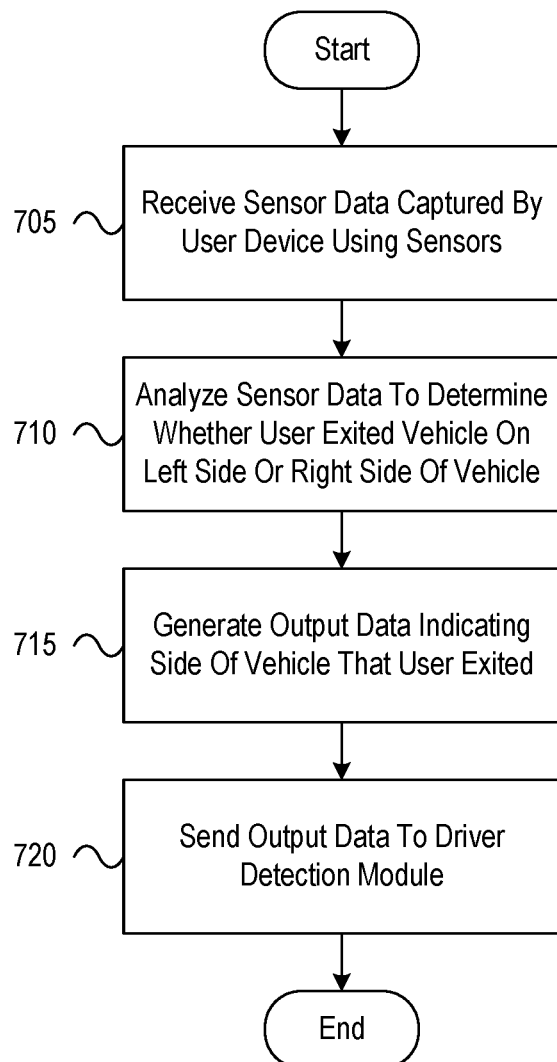
FIG. 7 depicts an illustrative method for processing sensor data to determine an exit direction of a user from a vehicle in accordance with one or more example embodiments.

FIG. 7 depicts an illustrative method for processing sensor data to determine an exit direction of a user from a vehicle in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 7, at step 705, distributed data processing computing platform 110 may receive sensor data captured by a user device during a trip. For example, at step 705, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120). At step 710, distributed data processing computing platform 110 may analyze the sensor data to determine how a user of the user device exited a vehicle at the end of the trip. For example, at step 710, distributed data processing computing platform 110 may analyze the sensor data received from the first user computing device (e.g., user computing device 120) to determine whether a first user associated with the first user computing device (e.g., user computing device 120) exited a vehicle to a left side of the vehicle or a right side of the vehicle at a conclusion of a trip.

At step 715, distributed data processing computing platform 110 may generate output data indicating how the user of the user device exited the vehicle at the end of the trip. For example, based on determining that the first user associated with the first user computing device (e.g., user computing device 120) exited the vehicle to the left side of the vehicle or the right side of the vehicle at the conclusion of the trip, distributed data processing computing platform 110 may generate output data indicating a side of the vehicle which the first user associated with the first user computing device (e.g., user computing device 120) exited the vehicle. At step 720, distributed data processing computing platform 110 may send the output data to a driver detection module, such as the driver detection module maintained by and/or executed on distributed data processing computing platform 110. For example, at step 720, distributed data processing computing platform 110 may send, to a driver detection module (e.g., driver detection module 112c), the output data indicating the side of the vehicle which the first user associated with the first user computing device (e.g., user computing device 120) exited the vehicle. In addition, by sending the output data indicating the side of the vehicle which the first user associated with the first user computing device (e.g., user computing device 120) exited the vehicle to the driver detection module (e.g., driver detection module 112c), distributed data processing computing platform 110 may cause the driver detection module (e.g., driver detection module 112c) to determine whether the first user associated with the first user computing device (e.g., user computing device 120) was a driver or a passenger during the trip (e.g., by executing one or more of the steps described below with respect to FIG. 9 and/or by performing and/or otherwise implementing various features described herein).

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 705, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, in analyzing the sensor data at step 710, distributed data processing computing platform 110 may extract and analyze gyroscope data to determine how the user of the user device exited the vehicle. For example, in analyzing the sensor data received from the first user computing device (e.g., user computing device 120) to determine whether the first user associated with the first user computing device (e.g., user computing device 120) exited the vehicle to the left side of the vehicle or the right side of the vehicle at the conclusion of the trip at step 710, distributed data processing computing platform 110 may extract gyroscope data from the sensor data captured by the first user computing device (e.g., user computing device 120) using the one or more sensors built into the first user computing device (e.g., user computing device 120). In addition, the gyroscope data may have been captured by a gyroscope built into the first user computing device (e.g., user computing device 120) such as the one or more gyroscopes 124b. Subsequently, distributed data processing computing platform 110 may analyze the gyroscope data to identify a direction of rotation around a vertical axis indicated in the gyroscope data. As discussed below, the direction of rotation around the vertical axis indicated in the gyroscope data may be indicative of the direction in which the user exited the vehicle and thus which side of the vehicle the user was sitting in during the trip.

In some instances, in analyzing the sensor data at step 710, distributed data processing computing platform 110 may align one or more axes (e.g., using one or more of the axis alignment techniques described below and/or elsewhere herein). For example, in analyzing the sensor data received from the first user computing device (e.g., user computing device 120) to determine whether the first user associated with the first user computing device (e.g., user computing device 120) exited the vehicle to the left side of the vehicle or the right side of the vehicle at the conclusion of the trip at step 710, distributed data processing computing platform 110 may, prior to analyzing the gyroscope data to identify the direction of rotation around the vertical axis indicated in the gyroscope data, align at least one axis of a reference frame of the first user computing device (e.g., user computing device 120) with at least one axis of a reference frame of the vehicle. For instance, distributed data processing computing platform 110 may align at least one axis of a reference frame of user computing device 120 with at least one axis of a reference frame of the vehicle based on the captured sensor data, as discussed below. In some instances, after separating out data corresponding to X, Y, and Z axes, distributed data processing computing platform 110 might only analyze data associated with the Z axis to determine rotation relevant to the exit direction determination, as such data may correspond to a vertically aligned reference frame (e.g., as the axis that is perpendicular to the horizontal plane of the vehicle).

In some instances, analyzing the gyroscope data to identify the direction of rotation around the vertical axis indicated in the gyroscope data may include determining that the first user associated with the first user computing device exited the vehicle to the left side of the vehicle based on the gyroscope data matching a left-rotation pattern. For example, in analyzing the gyroscope data to identify the direction of rotation around the vertical axis indicated in the gyroscope data, distributed data processing computing platform 110 may determine that the first user associated with the first user computing device (e.g., user computing device 120) exited the vehicle to the left side of the vehicle based on the gyroscope data matching a left-rotation pattern. Such a left-rotation pattern may, for instance, be and/or correspond to a peak in the accelerometer data received from user computing device 120 in connection with the user exiting the vehicle.

In some instances, analyzing the gyroscope data to identify the direction of rotation around the vertical axis indicated in the gyroscope data may include determining that the first user associated with the first user computing device exited the vehicle to the right side of the vehicle based on the gyroscope data matching a right-rotation pattern. For example, in analyzing the gyroscope data to identify the direction of rotation around the vertical axis indicated in the gyroscope data, distributed data processing computing platform 110 may determine that the first user associated with the first user computing device (e.g., user computing device 120) exited the vehicle to the right side of the vehicle based on the gyroscope data matching a right-rotation pattern. Such a right-rotation pattern may, for instance, be and/or correspond to a valley in the accelerometer data received from user computing device 120 in connection with the user exiting the vehicle.

In some instances, after sending the output data to the driver detection module at step 720, distributed data processing computing platform 110 may determine which quadrant of the vehicle the user was located in during the trip using a bump detection algorithm. For example, after sending the output data to the driver detection module at step 720, distributed data processing computing platform 110 may apply a bump detection algorithm to the sensor data received from the first user computing device (e.g., user computing device 120) to determine whether the first user associated with the first user computing device (e.g., user computing device 120) was located in a front portion of the vehicle or a rear portion of the vehicle during the trip. The bump detection algorithm may, for instance, compare the timing and amplitudes of related spikes (e.g., corresponding to a single bump in the road driven over by the vehicle) in accelerometer data received from user computing device 120 to predict whether user computing device 120 experienced the bump while located in the front of the vehicle or in the rear of the vehicle. Based on determining that the first user associated with the first user computing device (e.g., user computing device 120) was located in the front portion of the vehicle or the rear portion of the vehicle during the trip, distributed data processing computing platform 110 may generate output data indicating a quadrant of the vehicle in which the first user associated with the first user computing device (e.g., user computing device 120) was located during the trip. For instance, distributed data processing computing platform 110 may combine the results of the front-rear determination with the results of the left-right-exit determination and accordingly generate output data indicating that the user of user computing device 120 was located in the front-left quadrant of the vehicle, the front-right quadrant of the vehicle, the rear-left quadrant of the vehicle, or the rear-right quadrant of the vehicle based on these two determinations. Subsequently, distributed data processing computing platform 110 may send, to the driver detection module (e.g., driver detection module 112*c*), the output data indicating the quadrant of the vehicle in which the first user associated with the first user computing device (e.g., user computing device 120) was located during the trip. This quadrant data may, for instance, improve the accuracy and precision with which driver detection module 112*c* may be able to predict whether the user of user computing device 120 was driving the vehicle or riding as a passenger in the vehicle during the trip.

In some instances, prior to sending the output data to the driver detection module at step 720, distributed data processing computing platform 110 may generate and send one or more notifications to user computing device 120 (e.g., to prompt the user of user computing device 120 to confirm the determination made by distributed data processing computing platform 110 at step 710). For example, prior to sending the output data indicating the side of the vehicle which the first user associated with the first user computing device (e.g., user computing device 120) exited the vehicle to the driver detection module (e.g., driver detection module 112*c*), distributed data processing computing platform 110 may generate a notification indicating the side of the vehicle which the first user associated with the first user computing device (e.g., user computing device 120) exited the vehicle. Subsequently, distributed data processing computing platform 110 may send, via the communication interface (e.g., communication interface 115), to the first user computing device (e.g., user computing device 120), the notification indicating the side of the vehicle which the first user associated with the first user computing device (e.g., user computing device 120) exited the vehicle. In addition, by sending the notification to the first user computing device (e.g., user computing device 120), distributed data processing computing platform 110 may cause the first user computing device (e.g., user computing device 120) to prompt the first user associated with the first user computing device (e.g., user computing device 120) to confirm the side of the vehicle which the first user associated with the first user computing device (e.g., user computing device 120) exited the vehicle at the conclusion of the trip. For instance, distributed data processing computing platform 110 may cause user computing device 120 to wake and display one or more graphical user interfaces prompting the user of user computing device 120 to confirm the determination made by distributed data processing computing platform 110 with regard to exit direction. Distributed data processing computing platform 110 then may update its prediction model(s) based on receiving a response from user computing device 120 indicating whether the user of user computing device 120 confirmed or rejected the determination by distributed data processing computing platform 110, as this user response may serve as verified, actual, and/or "truth" data that is usable by distributed data processing computing platform 110 to validate and/or improve its left-right exit detection algorithms.

In some instances, after sending the output data to the driver detection module at step 720, distributed data processing computing platform 110 may generate and send one or more notifications to an administrative device, such as an analyst device. For example, based on sending the output data indicating the side of the vehicle which the first user associated with the first user computing device (e.g., user computing device 120) exited the vehicle to the driver detection module (e.g., driver detection module 112c), distributed data processing computing platform 110 may send the output data indicating the side of the vehicle which the first user associated with the first user computing device (e.g., user computing device 120) exited the vehicle to a data analyst console computing device (e.g., data analyst console computing device 150). In addition, by sending the output data indicating the side of the vehicle which the first user associated with the first user computing device (e.g., user computing device 120) exited the vehicle to the data analyst console computing device (e.g., data analyst console computing device 150), distributed data processing computing platform 110 may cause the data analyst console computing device (e.g., data analyst console computing device 150) to wake and display exit information corresponding to the output data indicating the side of the vehicle which the first user associated with the first user computing device (e.g., user computing device 120) exited the vehicle. For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

Figure 8:
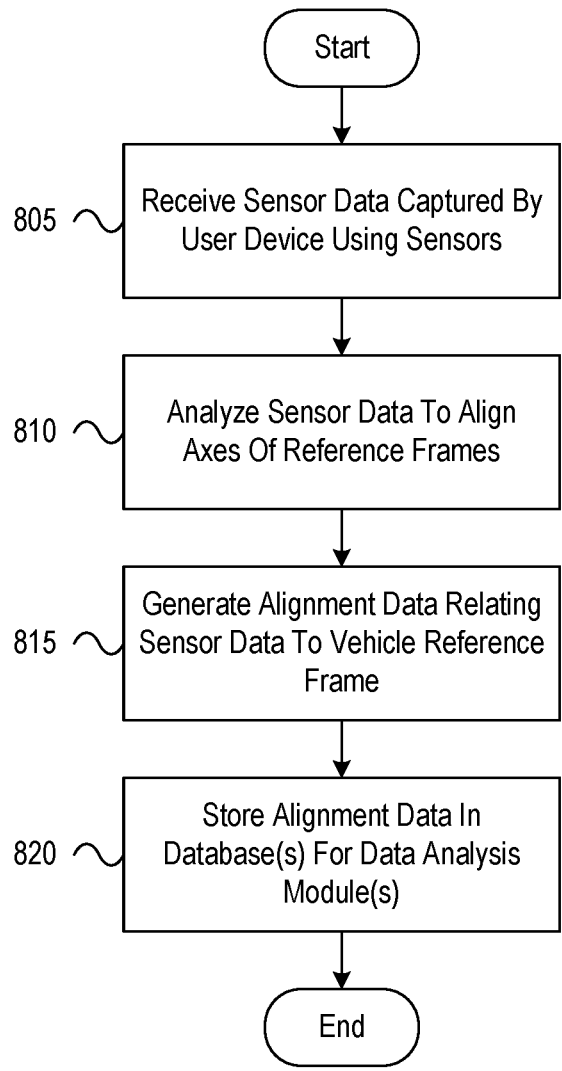
FIG. 8 depicts an illustrative method for processing sensor data to align axes across different reference frames in accordance with one or more example embodiments.

FIG. 8 depicts an illustrative method for processing sensor data to align axes across different reference frames in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 8, at step 805, distributed data processing computing platform 110 may receive sensor data captured by a user device during a trip. For example, at step 805, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120) during a trip in a vehicle. At step 810, distributed data processing computing platform 110 may analyze the sensor data to align axes of different reference frames, such as the reference frame of the user device with the reference frame of the vehicle. For example, at step 810, distributed data processing computing platform 110 may analyze the sensor data received from the first user computing device (e.g., user computing device 120) to align at least one axis of a reference frame of the first user computing device (e.g., user computing device 120) with at least one axis of a reference frame of the vehicle.

At step 815, distributed data processing computing platform 110 may generate alignment data that relates the sensor data, which may be expressed in terms of the user device's reference frame, to the vehicle's reference frame. For example, at step 815, based on aligning the at least one axis of the reference frame of the first user computing device (e.g., user computing device 120) with the at least one axis of the reference frame of the vehicle, distributed data processing computing platform 110 may generate alignment data relating the sensor data received from the first user computing device (e.g., user computing device 120) to the reference frame of the vehicle.

At step 820, distributed data processing computing platform 110 may store the alignment data in a database, such as a driver detection database, so that the alignment data can be used by the driver detection module and/or other modules of distributed data processing computing platform 110 (e.g., when processing sensor data to provide driver detection functions and/or various other functions as described herein). For example, at step 820, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the alignment data relating the sensor data received from the first user computing device (e.g., user computing device 120) to the reference frame of the vehicle. For instance, distributed data processing computing platform 110 may store the alignment data such that the alignment data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 805, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, analyzing the sensor data received from the first user computing device to align the at least one axis of the reference frame of the first user computing device with the at least one axis of a reference frame of the vehicle may include using gravity measurement data and principal component analysis to perform vertical axis alignment. For example, in analyzing the sensor data received from the first user computing device (e.g., user computing device 120) to align the at least one axis of the reference frame of the first user computing device (e.g., user computing device 120) with the at least one axis of a reference frame of the vehicle at step 810, distributed data processing computing platform 110 may use gravity measurement data and principal component analysis to perform vertical axis alignment. For instance, distributed data processing computing platform 110 may align a vertical axis of the reference frame of user computing device 120 with a vertical axis of the reference frame of the vehicle by making calculations based on the assumption that a gravity vector (which may, e.g., be represented in gravity measurement data obtained from a magnetometer and/or other sensors built into user computing device 120) points downward. In some instances, distributed data processing computing platform 110 may need to adjust calculations based on this assumption, for instance, if the vehicle is located on a slope, which may be estimated using data obtained from a barometer included in user computing device 120 (e.g., if the vehicle is on a slope, a change in altitude may be detected in the barometer data, as discussed below). In addition, distributed data processing computing platform 110 may utilize the principal component analysis to identify the direction(s) of largest variation in the captured sensor data received from user computing device 120 (e.g., the accelerometer data, the gravity measurement data, etc.) and project corresponding feature vectors onto the identified direction(s).

The example computation below illustrates how distributed data processing computing platform 110 may execute vertical axis alignment to generate alignment data relating the reference frames when operating on the assumption that there is zero slope. For example, if $\hat{g}_p$ and $\hat{g}_c$ are gravity unit vectors in the user device (e.g., phone) and vehicle (e.g., car) coordinate systems, respectively, the following sequence of example computations and equations may define the unit vector $\hat{u}$ in the direction of the rotation axis and the rotation angle $\alpha$, thereby enabling the construction of the quaternion operator $q$, as well as the calculation and relation of any vector $a_p$ in the phone's reference frame to any vector $a^v$ in the vertically aligned reference frame:

$$\hat{u} = (u_x, u_y, u_z) = \frac{\hat{g}_p \times \hat{g}_c}{\|\hat{g}_p \times \hat{g}_c\|} \quad \cos(\alpha) = \hat{g}_p \cdot \hat{g}_c = \cos(\angle \hat{g}_p, \hat{g}_c)$$

$$\cos\left(\frac{\alpha}{2}\right) = \sqrt{\frac{1+\cos\alpha}{2}} \text{ and } \sin\left(\frac{\alpha}{2}\right) = \sqrt{\frac{1-\cos\alpha}{2}},$$

$$q = e^{\frac{\alpha}{2}(u_x i + u_y j + u_z k)} = \cos\left(\frac{\alpha}{2}\right) + (u_x i + u_y j + u_z k) \cdot \sin\left(\frac{\alpha}{2}\right)$$

$$a_v = q a_p q^{-1} = e^{\frac{\alpha}{2}(u_x i + u_y j + u_z k)} \cdot (a_x i + a_y j + a_z k) \cdot e^{-\frac{\alpha}{2}(u_x i + u_y j + u_z k)}$$

$$\hat{g}_p = i \text{ and } \hat{g}_c = -k$$

$$\hat{u} = (u_x, u_y, u_z) = \frac{\hat{g}_p \times \hat{g}_c}{\|\hat{g}_p \times \hat{g}_c\|} = \frac{i \times (-k)}{\|i \times (-k)\|} = j$$

-continued $$\alpha = \arccos(i \cdot (-k)) = \frac{\pi}{2}$$

$$a_v = q a_p q^{-1} = \left(\cos\left(\frac{\alpha}{2}\right) + j \cdot \sin\left(\frac{\alpha}{2}\right)\right) \cdot i \cdot \left(\cos\left(\frac{\alpha}{2}\right) - j \cdot \sin\left(\frac{\alpha}{2}\right)\right)$$

$$= \left(\frac{1}{\sqrt{2}} + j \cdot \frac{1}{\sqrt{2}}\right) \cdot i \cdot \left(\frac{1}{\sqrt{2}} - j \cdot \frac{1}{\sqrt{2}}\right) = \frac{1}{2}(i + j \cdot i) \cdot (1 - j)$$

$$= \frac{1}{2}(i - k)(1 - j) = \frac{1}{2}(i - k - i \cdot j + k \cdot j) = \frac{1}{2}(i - k - k - i) = -k$$

In some instances, analyzing the sensor data received from the first user computing device to align the at least one axis of the reference frame of the first user computing device with the at least one axis of a reference frame of the vehicle may include using gravity measurement data and principal component analysis to perform full axis alignment. For example, in analyzing the sensor data received from the first user computing device (e.g., user computing device 120) to align the at least one axis of the reference frame of the first user computing device (e.g., user computing device 120) with the at least one axis of a reference frame of the vehicle at step 810, distributed data processing computing platform 110 may use gravity measurement data and principal component analysis to perform full axis alignment. For instance, distributed data processing computing platform 110 may use the gravity measurement data and principal component analysis like in the example discussed above, but may align both horizontal axes of the reference frames in addition to aligning the vertical axes of the reference frames. In some instances, distributed data processing computing platform 110 might only be able to perform a full axis alignment if user computing device 120 is not handled by the user during the trip in the vehicle (e.g., if user computing device 120 is mounted in a cradle or the like) because any phone handling events may change the relationship between the reference frames of user computing device 120 and the vehicle.

In some instances, using gravity measurement data and principal component analysis to perform the full axis alignment may include using a Butterworth low-pass filter to perform the full axis alignment. For example, in using gravity measurement data and principal component analysis to perform the full axis alignment, distributed data processing computing platform 110 may use a Butterworth low-pass filter to perform the full axis alignment. For instance, the raw accelerometer data (which may, e.g., be obtained from the captured sensor data received from user computing device 120) may be too noisy to perform principal component analysis. Thus, distributed data processing computing platform 110 may use the low-pass filter to remove high-frequency noise that might be irrelevant to the axis alignment analysis while keeping the relevant low-frequency components of the signal (e.g., in the range of 0.5 to 2 Hz) corresponding to the sensor data received from user computing device 120.

In some instances, analyzing the sensor data received from the first user computing device to align the at least one axis of the reference frame of the first user computing device with the at least one axis of a reference frame of the vehicle may include using quaternion time series data obtained from an orientation sensor and satellite course measurement data to perform vertical axis alignment. For example, in analyzing the sensor data received from the first user computing device (e.g., user computing device 120) to align the at least one axis of the reference frame of the first user computing device (e.g., user computing device 120) with the at least one axis of a reference frame of the vehicle at step 810, distributed data processing computing platform 110 may use quaternion time series data obtained from an orientation sensor (e.g., the one or more orientation sensors 124i) and satellite course measurement data (which may, e.g., be obtained from the one or more satellite positioning sensors 124m) to perform vertical axis alignment. For instance, distributed data processing computing platform 110 may compute a first rotation on a point-by-point basis at the frequency of the quaternion time series by applying the rotation encoded in the quaternion to every vector of interest. This computation may express the vector in a reference frame where the z-axis points upwards, the y-axis points towards the magnetic north pole, and the x-axis points approximately to the east (e.g., in a direction perpendicular to the z- and y-axes). In this reference frame, the vertical axis may, for instance, be aligned with that of the car reference frame (e.g., based on the assumption that the car is not on a slope).

In some instances, analyzing the sensor data received from the first user computing device to align the at least one axis of the reference frame of the first user computing device with the at least one axis of a reference frame of the vehicle may include using quaternion time series data obtained from an orientation sensor of the first user computing device and satellite course measurement data to perform full axis alignment. For example, in analyzing the sensor data received from the first user computing device (e.g., user computing device 120) to align the at least one axis of the reference frame of the first user computing device (e.g., user computing device 120) with the at least one axis of a reference frame of the vehicle at step 810, distributed data processing computing platform 110 may use quaternion time series data obtained from an orientation sensor of the first user computing device and satellite course measurement data to perform full axis alignment. For instance, distributed data processing computing platform 110 may use the quaternion time series data and satellite course measurement data like in the example discussed above, but may align both horizontal axes of the reference frames in addition to aligning the vertical axes of the reference frames.

In some instances, analyzing the sensor data received from the first user computing device to align the at least one axis of the reference frame of the first user computing device with the at least one axis of a reference frame of the vehicle may include using barometer data obtained from a barometer sensor of the first user computing device to estimate a slope traveled by the vehicle. For example, in analyzing the sensor data received from the first user computing device (e.g., user computing device 120) to align the at least one axis of the reference frame of the first user computing device (e.g., user computing device 120) with the at least one axis of a reference frame of the vehicle at step 810, distributed data processing computing platform 110 may use barometer data obtained from a barometer sensor (e.g., the one or more barometers 124d) of the first user computing device (e.g., user computing device 120) to estimate a slope traveled by the vehicle. For instance, the barometer data may indicate a change in altitude (e.g., height) during a particular segment of a trip. Using satellite positioning data and/or accelerometer data, distributed data processing computing platform 110 may calculate the distance traveled by user computing device 120 and the vehicle during the particular segment of the trip, and the slope may be calculated as an angle (e.g., distance traveled divided by the height difference between the start and end points of the segment of the trip). In some instances, distributed data processing computing platform 110 may use the following example computations and/or equations to compute height h(p) from the barometer reading, where $h_0$, $T_0$, $L_0$, R, M, and g correspond to a reference height, reference temperature, temperature lapse rate at the reference height, the universal gas constant, the molar mass of air, and the gravitational constant respectively:

$$h(p) = h_0 + \frac{T_0}{L_0}\left(\left(\frac{p_0}{p}\right)^{\frac{HL_0}{gM}} - 1\right)$$

If the distance traveled between two satellite positioning points is $D_{12}$ at times $t_1$ and $t_2$, then the slope angle may be estimated by distributed data processing computing platform 110 using this equation:

$$\sin(\theta) = \frac{h(p(t_2)) - h(p(t_1))}{D_{12}}$$

Then, distributed data processing computing platform 110 may compute the gravity vector gc to be used for vertical axis alignment using the following equation, with $\theta=0$ yielding the case where slope is assumed to be zero (e.g., as in the examples discussed above):

$$g_c = (0, \sin(\theta), \cos(\theta)) = (0, \sin(\theta), \sqrt{1-\sin^2(\theta)})$$

In some instances, after storing the alignment data in a database at step 820, distributed data processing computing platform 110 may send the alignment data to one or more other modules associated with distributed data processing computing platform 110. For example, distributed data processing computing platform 110 may send, to a driver detection module (e.g., driver detection module 112c), the alignment data relating the sensor data received from the first user computing device (e.g., user computing device 120) to the reference frame of the vehicle. For instance, driver detection module 112c may use such data in determining whether the user of user computing device 120 was a driver or a passenger of the vehicle during the trip and/or one or more other modules may use such data in processing sensor data received from user computing device 120 for other purposes (e.g., to detect events, such as hard braking events).

In some instances, after storing the alignment data in a database at step 820, distributed data processing computing platform 110 may send the alignment data to one or more other systems and/or devices. For example, based on storing the alignment data relating the sensor data received from the first user computing device (e.g., user computing device 120) to the reference frame of the vehicle, distributed data processing computing platform 110 may send the alignment data relating the sensor data received from the first user computing device (e.g., user computing device 120) to the reference frame of the vehicle to a data analyst console computing device (e.g., data analyst console computing device 150). In addition, by sending the alignment data relating the sensor data received from the first user computing device (e.g., user computing device 120) to the reference frame of the vehicle to the data analyst console computing device (e.g., data analyst console computing device 150), distributed data processing computing platform 110 may cause the data analyst console computing device (e.g., data analyst console computing device 150) to wake and display axis alignment information corresponding to the alignment data relating the sensor data received from the first user computing device (e.g., user computing device 120) to the reference frame of the vehicle. For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

Figure 9:
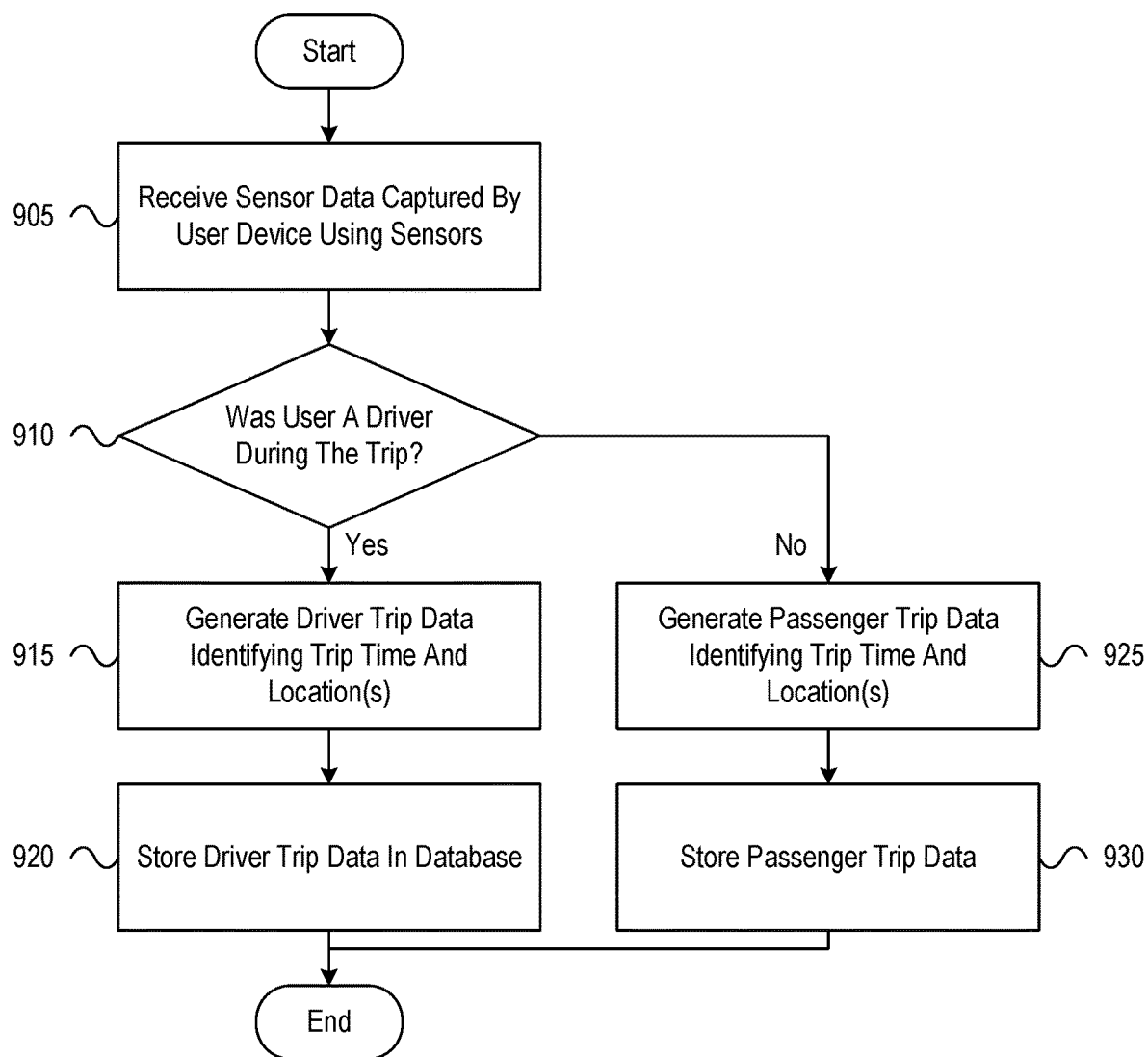
FIG. 9 depicts an illustrative method for processing sensor data to detect whether a user was a driver or a passenger of a vehicle during a trip in accordance with one or more example embodiments.

FIG. 9 depicts an illustrative method for processing sensor data to detect whether a user was a driver or a passenger of a vehicle during a trip in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 9, at step 905, distributed data processing computing platform 110 may receive sensor data captured by a user device. For example, at step 905, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120) during a trip in a vehicle.

At step 910, distributed data processing computing platform 110 may analyze the sensor data to perform a driver detection analysis. For example, at step 910, distributed data processing computing platform 110 may analyze the sensor data received from the first user computing device (e.g., user computing device 120) to determine whether a user of the first user computing device (e.g., user computing device 120) was a driver of the vehicle or a passenger of the vehicle during the trip in the vehicle.

If distributed data processing computing platform 110 determines that the user of user computing device 120 was a driver, then distributed data processing computing platform 110 may generate and store driver trip data at step 915 and 920. For example, at step 915, based on determining that the user of the first user computing device (e.g., user computing device 120) was a driver of the vehicle during the trip in the vehicle, distributed data processing computing platform 110 may generate driver-trip data comprising at least a portion of the sensor data received from the first user computing device (e.g., user computing device 120) and information identifying a time of the trip and one or more locations associated with the trip. For instance, the driver-trip data generated by distributed data processing computing platform 110 may include information indicating that the trip was a driver trip (e.g., that the user of user computing device 120 was driving a car during the trip). Subsequently, at step 920, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the driver-trip data. For instance, distributed data processing computing platform 110 may store the driver-trip data such that the driver-trip data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

Alternatively, if distributed data processing computing platform 110 determines that the user of user computing device 120 was a passenger, then distributed data processing computing platform 110 may generate and store passenger trip data at step 925 and 930. For example, at step 925, based on determining that the user of the first user computing device (e.g., user computing device 120) was a passenger of the vehicle during the trip in the vehicle, distributed data processing computing platform 110 may generate passenger-trip data comprising at least a portion of the sensor data received from the first user computing device (e.g., user computing device 120) and information identifying a time of the trip and one or more locations associated with the trip. For instance, the passenger-trip data generated by distributed data processing computing platform 110 may include information indicating that the trip was a passenger trip (e.g., that the user of user computing device 120 was riding as a passenger in a car during the trip). Subsequently, at step 930, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the passenger-trip data. For instance, distributed data processing computing platform 110 may store the passenger-trip data such that the passenger-trip data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p. Additionally or alternatively, distributed data processing computing platform 110 and/or one or more other systems and/or devices may adjust one or more insurance parameters (e.g., premiums, deductibles, discounts, etc.) based on the driver-trip data and/or the passenger-trip data. For example, distributed data processing computing platform 110 and/or one or more other systems and/or devices may adjust at least one insurance parameter for a user of user computing device 120 to account for increased risk (e.g., based on identifying and/or classifying the user's trip as a driver trip) and/or to account for decreased risk (e.g., based on identifying and/or classifying the user's trip as a passenger trip).

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 905, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, analyzing the sensor data received from the first user computing device to determine whether the user of the first user computing device was a driver of the vehicle or a passenger of the vehicle during the trip in the vehicle may include using a population-level model to analyze the sensor data received from the first user computing device. For example, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may use a population-level model to analyze the sensor data received from the first user computing device (e.g., user computing device 120). Such a population-level model may, for instance, be a prediction model that is used by distributed data processing computing platform 110 for all users and/or user devices for which distributed data processing computing platform 110 is processing sensor data, and may be contrasted with a user-specific model (which may, e.g., be a prediction model that is used by distributed data processing computing platform 110 only for specific user(s) and/or user device(s) for which distributed data processing computing platform 110 is processing sensor data). For instance, a quadrant-detection model used by distributed data processing computing platform 110 may be a population-level model (e.g., the same or similar code is executed on and/or for various user devices associated with different users to determine a quadrant of a vehicle in which a given user device was located during a given trip).

In some instances, analyzing the sensor data received from the first user computing device to determine whether the user of the first user computing device was a driver of the vehicle or a passenger of the vehicle during the trip in the vehicle may include using one or more user-personalized driver signature models to analyze the sensor data received from the first user computing device. For example, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may use one or more user-personalized driver signature models to analyze the sensor data received from the first user computing device (e.g., user computing device 120). For instance, a user-personalized driver signature model (which may, e.g., also be referred to in some instances as a GMM) may be a user-specific model, such that each model is unique to a particular user of a given user device.

In some instances, analyzing the sensor data received from the first user computing device to determine whether the user of the first user computing device was a driver of the vehicle or a passenger of the vehicle during the trip in the vehicle may include using a gyroscope module that processes the sensor data received from the first user computing device and determines whether the user of the first user computing device exited the vehicle on a left side of the vehicle or a right side of the vehicle. For example, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may use a gyroscope module that processes the sensor data received from the first user computing device (e.g., user computing device 120) and determines whether the user of the first user computing device (e.g., user computing device 120) exited the vehicle on a left side of the vehicle or a right side of the vehicle. For instance, distributed data processing computing platform 110 may perform a left-right exit detection process (which may, e.g., include and/or correspond to one or more of the features described above with respect to FIG. 7) using left-right exit detection module 112f to determine whether the user of user computing device 120 exited the vehicle to the left or the right, where a left exit may be considered by distributed data processing computing platform 110 to be more indicative of a driver trip and a right exit may be considered by distributed data processing computing platform 110 to be more indicative of a passenger trip (e.g., in countries where the driver typically sits on the left side of a vehicle and a passenger typically sits on the right side of a vehicle).

In some instances, analyzing the sensor data received from the first user computing device to determine whether the user of the first user computing device was a driver of the vehicle or a passenger of the vehicle during the trip in the vehicle may include using a phone-handling module that processes the sensor data received from the first user computing device and determines an amount of phone handling that occurred during the trip in the vehicle. For example, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may use a phone-handling module that processes the sensor data received from the first user computing device (e.g., user computing device 120) and determines an amount of phone handling that occurred during the trip in the vehicle. For instance, distributed data processing computing platform 110 may perform a phone-handling-analysis process (which may, e.g., include and/or correspond to one or more of the features described below with respect to FIG. 12) using event detection module 112h to determine an amount of phone handling during a trip, where a relatively smaller amount of phone handling may be considered by distributed data processing computing platform 110 to be more indicative of a driver trip and a relatively larger amount of phone handling may be considered by distributed data processing computing platform 110 to be more indicative of a passenger trip.

In some instances, analyzing the sensor data received from the first user computing device to determine whether the user of the first user computing device was a driver of the vehicle or a passenger of the vehicle during the trip in the vehicle may include using a car tracker module that processes the sensor data received from the first user computing device and evaluates a distance between a starting point of a current trip and an ending point of a previous trip. For example, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may use a car tracker module that processes the sensor data received from the first user computing device (e.g., user computing device 120) and evaluates a distance between a starting point of a current trip and an ending point of a previous trip. For instance, distributed data processing computing platform 110 may perform a car-tracking-analysis process (which may, e.g., include and/or correspond to one or more of the features described below with respect to FIG. 14) using car tracking module 112$p$ to evaluate the distance between the starting point of a current trip and the ending point of a previous trip, where a relatively closer distance may be considered by distributed data processing computing platform 110 to be more indicative of a driver trip and a relatively farther distance may be considered by distributed data processing computing platform 110 to be more indicative of a passenger trip.

In some instances, distributed data processing computing platform 110 may utilize all three modules (e.g., left-right exit detection module 112$f$, event detection module 112$h$, and car tracking module 112$p$) in combination and in an integrated fashion when determining whether the user of the first user computing device (e.g., user computing device 120) was a driver of the vehicle or a passenger of the vehicle during the trip in the vehicle at step 910. For instance, distributed data processing computing platform 110 might classify a trip as a driver trip only if all three modules determine the trip to be a driver trip, otherwise distributed data processing computing platform 110 might classify the trip as a passenger trip. In some instances, additional and/or alternative modules may be used by distributed data processing computing platform 110 instead of and/or in addition to left-right exit detection module 112$f$, event detection module 112$h$, and car tracking module 112$p$ when determining whether the user of the first user computing device (e.g., user computing device 120) was a driver of the vehicle or a passenger of the vehicle during the trip in the vehicle at step 910. For instance, distributed data processing computing platform 110 may utilize trip anomaly detection module 112$d$ (which may, e.g., evaluate whether the current trip can be classified as a routine trip or as an anomaly, using one or more of an isolation forest model and/or a Gaussian mixture model), and this module may provide a classification indicating that the trip is likely a driver trip if it is classified as routine or, alternatively, is likely a passenger trip if it is classified as an anomaly.

In some instances, analyzing the sensor data received from the first user computing device to determine whether the user of the first user computing device was a driver of the vehicle or a passenger of the vehicle during the trip in the vehicle may include evaluating a vertical acceleration profile experienced by the vehicle during the trip based on the sensor data received from the first user computing device. For example, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may evaluate a vertical acceleration profile experienced by the vehicle during the trip based on the sensor data received from the first user computing device (e.g., user computing device 120). For instance, a bump or a pothole encountered by the vehicle during the trip may create a different vertical acceleration profile (e.g., in the accelerometer data captured by user computing device 120 and/or in other sensor data captured by user computing device 120) depending on whether user computing device 120 experienced the bump or the pothole while being located in the front of the car (which may, e.g., be indicative of a driver trip) or in the rear of the car (which may, e.g., be indicative of a passenger trip).

For instance, if user computing device 120 experiences a bump or a pothole in the front of the vehicle, the accelerometer data captured by user computing device 120 and/or the other sensor data captured by user computing device 120 may reflect a high-amplitude impact followed by a low-amplitude impact during a time segment of the trip. Alternatively, if user computing device 120 experiences a bump or a pothole in the rear of the vehicle, the accelerometer data captured by user computing device 120 and/or the other sensor data captured by user computing device 120 may reflect a low-amplitude impact followed by a high-amplitude impact during a time segment of the trip. By evaluating the temporal relationships in these signals, distributed data processing computing platform 110 may be able to determine where user computing device 120 was located during the trip and thus predict whether the user of user computing device 120 was sitting in the front of the vehicle (where, e.g., he or she may have been driving the vehicle) or in the rear of the vehicle (where, e.g., he or she could not have been driving the vehicle).

In some instances, in analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may combine any and/or all of the above-discussed analysis techniques and/or other features described herein to identify and evaluate information derived from the sensor data received from user computing device 120 that is indicative of whether the user of user computing device 120 was more likely a driver of the vehicle or a passenger of the vehicle during the trip.

In some instances, after analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may generate and send one or more notifications to one or more other systems and/or devices, such as one or more notifications to the first user computing device (e.g., user computing device 120). For example, based on analyzing the sensor data received from the first user computing device (e.g., user computing device 120), distributed data processing computing platform 110 may generate a notification indicating whether the user of the first user computing device (e.g., user computing device 120) was determined to be a driver of the vehicle or a passenger of the vehicle during the trip in the vehicle. Subsequently, distributed data processing computing platform 110 may send, via the communication interface (e.g., communication interface 115), to the first user computing device (e.g., user computing device 120), the notification indicating whether the user of the first user computing device (e.g., user computing device 120) was determined to be a driver of the vehicle or a passenger of the vehicle during the trip in the vehicle. In addition, by sending the notification indicating whether the user of the first user computing device (e.g., user computing device 120) was determined to be a driver of the vehicle or a passenger of the vehicle during the trip in the vehicle to the first user computing device (e.g., user computing device 120), distributed data processing computing platform 110 may cause the first user computing device (e.g., user computing device 120) to prompt the first user associated with the first user computing device (e.g., user computing device 120) to confirm whether the user of the first user computing device (e.g., user computing device 120) was a driver of the vehicle or a passenger of the vehicle during the trip in the vehicle. For instance, distributed data processing computing platform 110 may cause user computing device 120 to wake and display one or more graphical user interfaces prompting the user of user computing device 120 to confirm the determination made by distributed data processing computing platform 110 with regard to driver detection. Distributed data processing computing platform 110 then may update its prediction model(s) based on receiving a response from user computing device 120 indicating whether the user of user computing device 120 confirmed or rejected the determination by distributed data processing computing platform 110, as this user response may serve as verified, actual, and/or "truth" data that is usable by distributed data processing computing platform 110 to validate and/or improve its driver detection models and/or other related algorithms.

In some instances, after analyzing the sensor data received from the first user computing device (e.g., user computing device 120) to determine whether the user of the first user computing device (e.g., user computing device 120) was a driver of the vehicle or a passenger of the vehicle during the trip in the vehicle at step 910, distributed data processing computing platform 110 may generate and send one or more notifications to an administrative device, such as an analyst device. For example, based on analyzing the sensor data received from the first user computing device (e.g., user computing device 120), distributed data processing computing platform 110 may send driver detection data indicating whether the user of the first user computing device (e.g., user computing device 120) was determined to be a driver of the vehicle or a passenger of the vehicle during the trip in the vehicle to a data analyst console computing device (e.g., data analyst console computing device 150). In addition, by sending the driver detection data indicating whether the user of the first user computing device (e.g., user computing device 120) was determined to be a driver of the vehicle or a passenger of the vehicle during the trip in the vehicle to the data analyst console computing device (e.g., data analyst console computing device 150), distributed data processing computing platform 110 may cause the data analyst console computing device (e.g., data analyst console computing device 150) to wake and display detection information corresponding to the driver detection data indicating whether the user of the first user computing device (e.g., user computing device 120) was determined to be a driver of the vehicle or a passenger of the vehicle during the trip in the vehicle. For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

Figure 10:
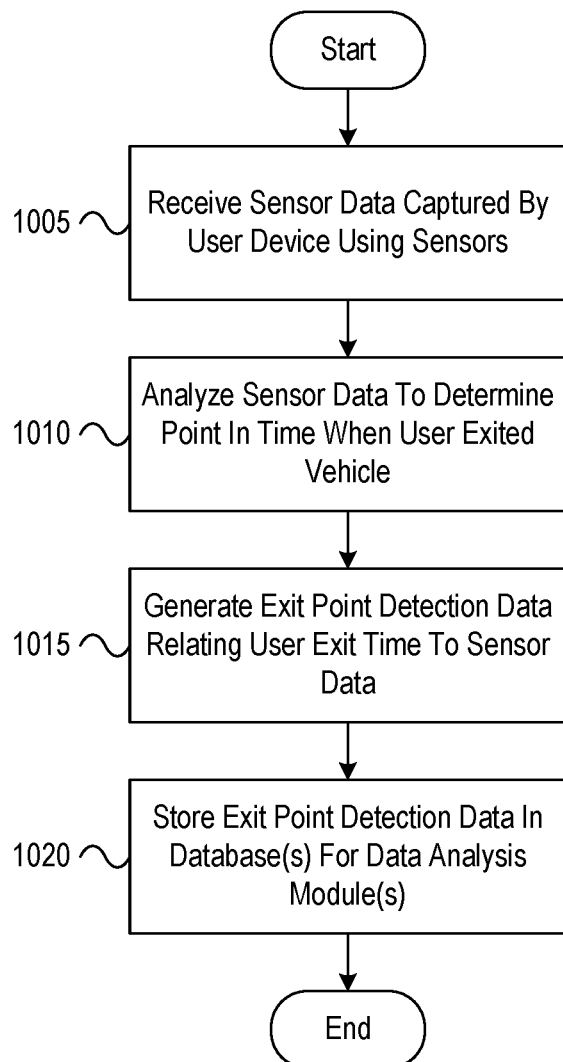
FIG. 10 depicts an illustrative method for processing sensor data to determine a point in time when a user exited a vehicle in accordance with one or more example embodiments.

FIG. 10 depicts an illustrative method for processing sensor data to determine a point in time when a user exited a vehicle in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 10, at step 1005, distributed data processing computing platform 110 may receive sensor data captured by a user device during a trip. For example, at step 1005, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120) during a trip in a vehicle. At step 1010, distributed data processing computing platform 110 may analyze the sensor data to determine when the user exited the vehicle. For example, at step 1010, distributed data processing computing platform 110 may analyze the sensor data received from the first user computing device (e.g., user computing device 120) to determine a point in time at which a user of the first user computing device (e.g., user computing device 120) exited the vehicle.

At step 1015, distributed data processing computing platform 110 may generate exit point detection data indicating when the user exited the vehicle. For example, at step 1015, based on determining the point in time at which the user of the first user computing device (e.g., user computing device 120) exited the vehicle, distributed data processing computing platform 110 may generate exit-point-detection data relating the point in time at which the user of the first user computing device (e.g., user computing device 120) exited the vehicle to the sensor data received from the first user computing device (e.g., user computing device 120).

At step 1020, distributed data processing computing platform 110 may store the exit point detection data in a database, such as a driver detection database, so that the exit point detection data can be used by the driver detection module, the left-right exit detection module, and/or other modules of distributed data processing computing platform 110 (e.g., when processing sensor data to provide driver detection functions and/or various other functions as described herein). For example, at step 1020, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the exit-point-detection data relating the point in time at which the user of the first user computing device (e.g., user computing device 120) exited the vehicle to the sensor data received from the first user computing device (e.g., user computing device 120). For instance, distributed data processing computing platform 110 may store the exit point detection data such that the exit point detection data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 1005, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, analyzing the sensor data received from the first user computing device to determine the point in time at which the user of the first user computing device exited the vehicle may include using a sliding window approach to determine the point in time at which the user of the first user computing device exited the vehicle. For example, in analyzing the sensor data received from the first user computing device (e.g., user computing device 120) to determine the point in time at which the user of the first user computing device (e.g., user computing device 120) exited the vehicle at step 1010, distributed data processing computing platform 110 may use a sliding window approach to determine the point in time at which the user of the first user computing device (e.g., user computing device 120) exited the vehicle. Such a sliding window approach may, for instance, involve calculating and analyzing statistical features associated with the sensor data received from user computing device 120, as discussed below.

In some instances, in using the window approach to determine the point in time at which the user of user computing device 120 exited the vehicle, distributed data processing computing platform 110 may calculate and analyze statistical features across multiple partially-overlapping window frames of the sensor data received from user computing device 120. For example, in using the sliding window approach to determine the point in time at which the user of the first user computing device (e.g., user computing device 120), distributed data processing computing platform 110 may create a plurality of partially overlapping window frames based on the sensor data received from the first user computing device (e.g., user computing device 120). For instance, distributed data processing computing platform 110 may create 3-second or 5-second window frames, and the window frames may form a partially-overlapping sequence of any and/or all of the sensor data received from user computing device 120. In some instances, the window frames might only include accelerometer data (e.g., raw MEMS data) received from user computing device 120. Subsequently, after creating the plurality of partially overlapping window frames based on the sensor data received from the first user computing device (e.g., user computing device 120), distributed data processing computing platform 110 may calculate one or more statistical features, peak-based features, or spectral features of each window frame of the plurality of partially overlapping window frames. For instance, distributed data processing computing platform 110 may calculate such features based on the raw MEMS data received from user computing device 120 and/or based on low-pass-filtered MEMS data (which may, e.g., be produced by distributed data processing computing platform 110 by applying a low-pass filter to the raw MEMS data received from user computing device 120).

After calculating the one or more statistical features, peak-based features, or spectral features of each window frame of the plurality of partially overlapping window frames, distributed data processing computing platform 110 may correlate peak-based features identified in the plurality of partially overlapping window frames with peak profiles associated with known car-exit events. For instance, distributed data processing computing platform 110 may maintain a database storing information identifying the peak profiles associated with known car-exit events (which may, e.g., be or correspond to signal templates or signatures that are indicative of different types of known car-exit events, such as stepping out of a car onto flat road surface to the left, stepping out of a car onto flat road surface to the right, such as stepping out of a car onto a high curb to the left, stepping out of a car onto a high curb to the right, etc.). Then, based on correlating the peak-based features with the peak profiles associated with the known car-exit events, distributed data processing computing platform 110 may identify an onset of walking noise in the sensor data received from the first user computing device (e.g., user computing device 120) to determine an exit point. For instance, distributed data processing computing platform 110 may identify the onset of walking noise in the sensor data received from the first user computing device (e.g., user computing device 120) by isolating and detecting a regular oscillation profile (which may, e.g., be more indicative of the user walking than the user handling the user computing device 120) in the sensor data.

In some instances, analyzing the sensor data received from the first user computing device to determine the point in time at which the user of the first user computing device exited the vehicle may include identifying a time window in which the user of the first user computing device exited the vehicle. For example, in analyzing the sensor data received from the first user computing device (e.g., user computing device 120) to determine the point in time at which the user of the first user computing device (e.g., user computing device 120) exited the vehicle at step 1010, distributed data processing computing platform 110 may identify a time window in which the user of the first user computing device (e.g., user computing device 120) exited the vehicle. For instance, distributed data processing computing platform 110 may identify one single time window at which the user of the first user computing device (e.g., user computing device 120) exited the vehicle.

In some instances, analyzing the sensor data received from the first user computing device to determine the point in time at which the user of the first user computing device exited the vehicle may include assigning probability values to a plurality of time windows associated with possible times at which the user of the first user computing device exited the vehicle. For example, in analyzing the sensor data received from the first user computing device (e.g., user computing device 120) to determine the point in time at which the user of the first user computing device (e.g., user computing device 120) exited the vehicle at step 1010, distributed data processing computing platform 110 may assign probability values to a plurality of time windows associated with possible times at which the user of the first user computing device (e.g., user computing device 120) exited the vehicle. For instance, in addition to or instead of identifying one single time window at which the user of the first user computing device (e.g., user computing device 120) exited the vehicle, distributed data processing computing platform 110 may assign probabilities to a plurality of time windows corresponding to the likelihood that the user of the first user computing device (e.g., user computing device 120) exited the vehicle in each time window of the plurality of time windows.

In some instances, after analyzing the sensor data received from the first user computing device (e.g., user computing device 120) to determine the point in time at which the user of the first user computing device (e.g., user computing device 120) exited the vehicle at step 1010, distributed data processing computing platform 110 may generate and send one or more notifications to one or more other systems and/or devices, such as one or more notifications to the first user computing device (e.g., user computing device 120). For example, based on analyzing the sensor data received from the first user computing device (e.g., user computing device 120) to determine the point in time at which the user of the first user computing device (e.g., user computing device 120) exited the vehicle, distributed data processing computing platform 110 may generate a notification indicating the point in time at which the user of the first user computing device (e.g., user computing device 120) exited the vehicle. Subsequently, distributed data processing computing platform 110 may send, via the communication interface (e.g., communication interface 115), to the first user computing device (e.g., user computing device 120), the notification indicating the point in time at which the user of the first user computing device (e.g., user computing device 120) exited the vehicle. In addition, by sending the notification indicating the point in time at which the user of the first user computing device (e.g., user computing device 120) exited the vehicle to the first user computing device (e.g., user computing device 120), distributed data processing computing platform 110 may cause the first user computing device (e.g., user computing device 120) to prompt the first user associated with the first user computing device (e.g., user computing device 120) to confirm the point in time at which the user of the first user computing device (e.g., user computing device 120) exited the vehicle. For instance, distributed data processing computing platform 110 may cause user computing device 120 to wake and display one or more graphical user interfaces prompting the user of user computing device 120 to confirm the determination made by distributed data processing computing platform 110 with regard to exit point detection. Distributed data processing computing platform 110 then may update its prediction model(s) based on receiving a response from user computing device 120 indicating whether the user of user computing device 120 confirmed or rejected the determination by distributed data processing computing platform 110, as this user response may serve as verified, actual, and/or "truth" data that is usable by distributed data processing computing platform 110 to validate and/or improve its exit point detection models and/or other related algorithms.

In some instances, after analyzing the sensor data received from the first user computing device (e.g., user computing device 120) to determine the point in time at which the user of the first user computing device (e.g., user computing device 120) exited the vehicle at step 1010, distributed data processing computing platform 110 may generate and send one or more notifications to an administrative device, such as an analyst device. For example, based on analyzing the sensor data received from the first user computing device (e.g., user computing device 120) to determine the point in time at which the user of the first user computing device (e.g., user computing device 120) exited the vehicle, distributed data processing computing platform 110 may send, to a data analyst console computing device (e.g., data analyst console computing device 150), the exit-point-detection data relating the point in time at which the user of the first user computing device (e.g., user computing device 120) exited the vehicle to the sensor data received from the first user computing device (e.g., user computing device 120). In addition, by sending the exit-point-detection data to the data analyst console computing device (e.g., data analyst console computing device 150), distributed data processing computing platform 110 may cause the data analyst console computing device (e.g., data analyst console computing device 150) to wake and display exit-point information corresponding to the exit-point-detection data relating the point in time at which the user of the first user computing device (e.g., user computing device 120) exited the vehicle to the sensor data received from the first user computing device (e.g., user computing device 120). For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

Figure 11:
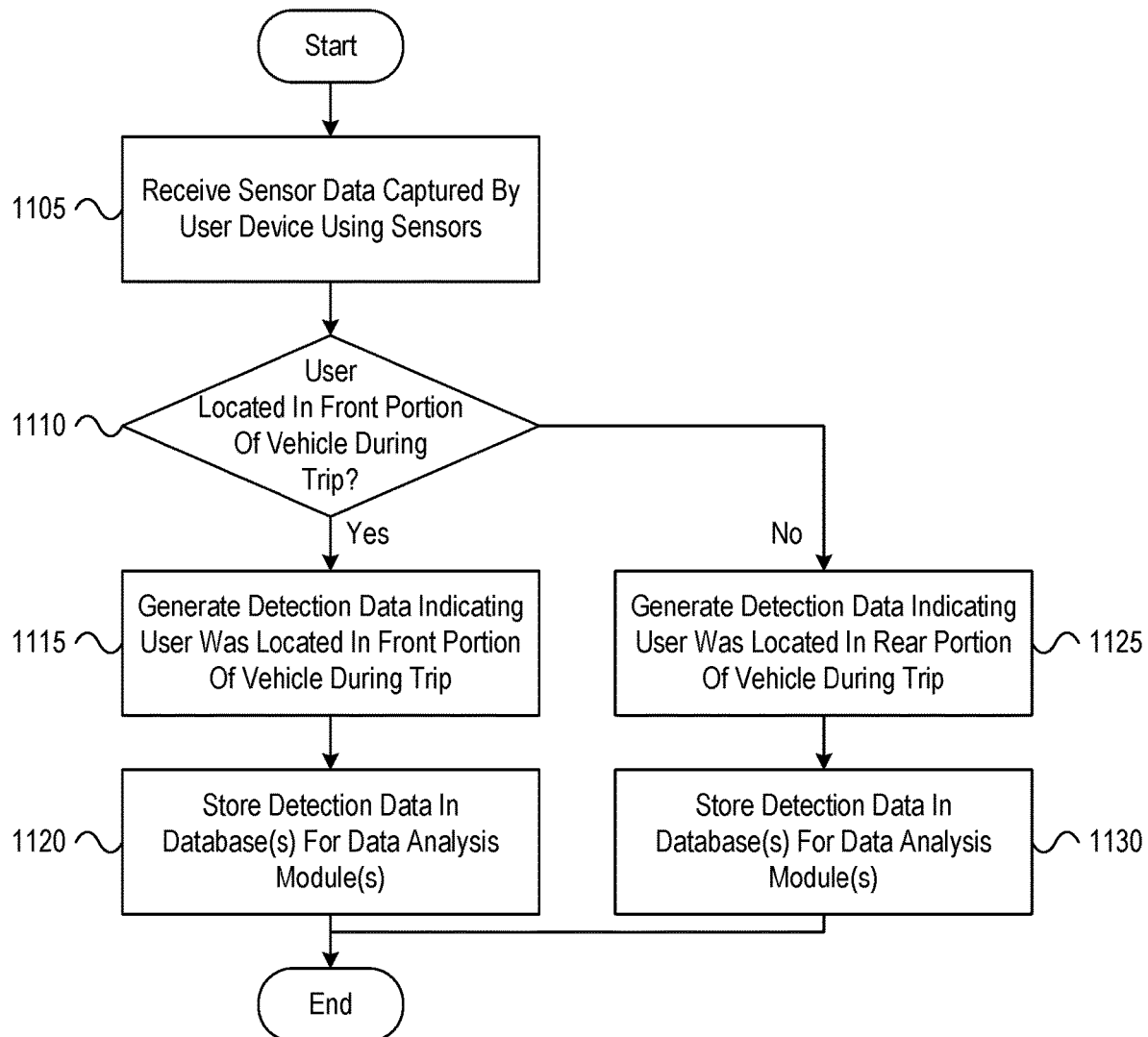
FIG. 11 depicts an illustrative method for processing sensor data to determine whether a user was located in a front portion or a rear portion of a vehicle during a trip in accordance with one or more example embodiments.

FIG. 11 depicts an illustrative method for processing sensor data to determine whether a user was located in a front portion or a rear portion of a vehicle during a trip in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 11, at step 1105, distributed data processing computing platform 110 may receive sensor data captured by a user device during a trip. For example, at step 1105, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120) during a trip in a vehicle.

At step 1110, distributed data processing computing platform 110 may analyze the sensor data to perform a front-rear detection analysis. For example, at step 1110, distributed data processing computing platform 110 may analyze the sensor data received from the first user computing device (e.g., user computing device 120) to determine whether a user of the first user computing device (e.g., user computing device 120) was located in a front portion of the vehicle during the trip or a rear portion of the vehicle during the trip.

If distributed data processing computing platform 110 determines that the user was located in the front portion of the vehicle during the trip, then distributed data processing computing platform 110 may generate and store detection data at step 1115 and 1120. For example, at step 1115, based on determining that the user of the first user computing device (e.g., user computing device 120) was located in the front portion of the vehicle during the trip, distributed data processing computing platform 110 may generate front-rear detection data indicating that the user of the first user computing device (e.g., user computing device 120) was located in the front portion of the vehicle during the trip. For instance, the front-rear detection data generated by distributed data processing computing platform 110 may include information indicating that distributed data processing computing platform 110 detected that the user of user computing device 120 was sitting in the front seat(s) of the car during the trip. Subsequently, at step 1120, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the front-rear detection data indicating that the user of the first user computing device (e.g., user computing device 120) was located in the front portion of the vehicle during the trip. For instance, distributed data processing computing platform 110 may store the front-rear detection data such that the front-rear detection data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

Alternatively, if distributed data processing computing platform 110 determines that the user was located in the rear portion of the vehicle during the trip, then distributed data processing computing platform 110 may generate and store detection data at step 1125 and 1130. For example, at step 1125, based on determining that the user of the first user computing device (e.g., user computing device 120) was located in the rear portion of the vehicle during the trip, distributed data processing computing platform 110 may generate front-rear detection data indicating that the user of the first user computing device (e.g., user computing device 120) was located in the rear portion of the vehicle during the trip. For instance, the front-rear detection data generated by distributed data processing computing platform 110 may include information indicating that distributed data processing computing platform 110 detected that the user of user computing device 120 was sitting in the back seat(s) of the car during the trip. Subsequently, at step 1130, distributed data processing computing platform 110 may store, in the at least one database maintained by the computing platform (e.g., distributed data processing computing platform 110) and accessible to the one or more data analysis modules associated with the computing platform (e.g., distributed data processing computing platform 110), the front-rear detection data indicating that the user of the first user computing device (e.g., user computing device 120) was located in the rear portion of the vehicle during the trip. For instance, distributed data processing computing platform 110 may store the front-rear detection data such that the front-rear detection data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

In some instances, receiving the sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device. For example, in receiving the sensor data captured by the first user computing device (e.g., user computing device 120) using the one or more sensors built into the first user computing device (e.g., user computing device 120) at step 1105, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, analyzing the sensor data received from the first user computing device (e.g., user computing device 120) may include isolating and aligning accelerometer data associated with the trip and then analyzing how the first user computing device (e.g., user computing device 120) experienced bumps and potholes during the trip. For example, in analyzing the sensor data received from the first user computing device (e.g., user computing device 120) to determine whether the user of the first user computing device (e.g., user computing device 120) was located in the front portion of the vehicle during the trip or the rear portion of the vehicle during the trip at step 1110, distributed data processing computing platform 110 may extract accelerometer data for the trip from the sensor data received from the first user computing device (e.g., user computing device 120). For instance, distributed data processing computing platform 110 may separate and/or otherwise extract the accelerometer data from any other sensor data received from user computing device 120 in connection with the trip. Subsequently, distributed data processing computing platform 110 may align a vertical axis of a reference frame of the first user computing device (e.g., user computing device 120) with a vertical axis of a reference frame of the vehicle. For instance, distributed data processing computing platform 110 may align these axes by performing one or more of the axis alignment techniques described above with respect to FIG. 8 and/or elsewhere herein. After aligning the vertical axis of the reference frame of the first user computing device (e.g., user computing device 120) with the vertical axis of the reference frame of the vehicle, distributed data processing computing platform 110 may predict one or more moments in the trip when one or more bumps or potholes were encountered based on one or more vertical spikes in the accelerometer data for the trip.

For instance, distributed data processing computing platform 110 may predict such moments in the trip using the bump detection algorithm described above to compare the timing and amplitudes of related spikes (e.g., corresponding to a single bump or pothole in the road driven over by the vehicle) in accelerometer data received from user computing device 120 to predict whether user computing device 120 experienced the bump or pothole while located in the front of the vehicle or in the rear of the vehicle. In particular, the sensor data associated with such a moment may indicate two events, for instance, a first event where the front tires of the vehicle hit the bump or pothole and a second event where the rear tires of the vehicle hit the bump or pothole. Based on the differences in the profile and/or magnitude of the signal (e.g., how the signal spikes look relative to each other, as discussed above), distributed data processing computing platform 110 may determine whether user computing device 120 experienced the bump or pothole while located in the front of the vehicle or in the rear of the vehicle. In addition, because the accelerometer data has been vertically aligned by distributed data processing computing platform 110 at this point in the analysis, distributed data processing computing platform 110 may identify such moments by searching for spikes in the vertical components of the accelerometer data signal.

In some instances, analyzing the sensor data received from the first user computing device (e.g., user computing device 120) may include performing a quadrant detection analysis. For example, in analyzing the sensor data received from the first user computing device (e.g., user computing device 120) to determine whether the user of the first user computing device (e.g., user computing device 120) was located in the front portion of the vehicle during the trip or the rear portion of the vehicle during the trip at step 1110, distributed data processing computing platform 110 may determine a quadrant of the vehicle in which the user of the first user computing device (e.g., user computing device 120) was located during the trip. For instance, distributed data processing computing platform 110 may combine the results of a front-rear determination with the results of a left-right-exit determination (e.g., as discussed above with respect to FIG. 7) to determine whether the user of user computing device 120 was located in the front-left quadrant of the vehicle, the front-right quadrant of the vehicle, the rear-left quadrant of the vehicle, or the rear-right quadrant of the vehicle during the trip. Based on which quadrant the user of user computing device 120 was located in, distributed data processing computing platform 110 may be able to predict whether the user of user computing device 120 was driving the vehicle or riding in the vehicle as a passenger (e.g., based on an assumption that a front-left quadrant detection may typically correspond to a driver in the location where the vehicle is being operated, or based on a different assumption if the vehicle is being operated in a different location where a driver would be seated in a different quadrant). Subsequently, based on determining the quadrant of the vehicle in which the user of the first user computing device (e.g., user computing device 120) was located during the trip, distributed data processing computing platform 110 may generate quadrant detection data identifying the quadrant of the vehicle in which the user of the first user computing device (e.g., user computing device 120) was located during the trip. For instance, distributed data processing computing platform 110 may generate output data indicating that the user of user computing device 120 was located in the front-left quadrant of the vehicle, the front-right quadrant of the vehicle, the rear-left quadrant of the vehicle, or the rear-right quadrant of the vehicle. Then, distributed data processing computing platform 110 may store, in the at least one database maintained by the computing platform (e.g., distributed data processing computing platform 110) and accessible to the one or more data analysis modules associated with the computing platform (e.g., distributed data processing computing platform 110), the quadrant detection data identifying the quadrant of the vehicle in which the user of the first user computing device (e.g., user computing device 120) was located during the trip. For instance, distributed data processing computing platform 110 may store the quadrant detection data such that the quadrant detection data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

In some instances, before analyzing the sensor data to perform the front-rear detection analysis at step 1110, distributed data processing computing platform 110 may build one or more models based on sample trip data. For example, prior to analyzing the sensor data received from the first user computing device (e.g., user computing device 120) to determine whether the user of the first user computing device (e.g., user computing device 120) was located in the front portion of the vehicle during the trip or the rear portion of the vehicle during the trip at step 1110, distributed data processing computing platform 110 may build one or more models for analyzing the sensor data received from the first user computing device (e.g., user computing device 120) based on data associated with at least one sample trip. For instance, distributed data processing computing platform 110 may build a model for analyzing the sensor data by loading data associated with a sample trip captured by a smartphone or other user device, aligning a vertical axis of the smartphone with the vertical axis of the vehicle, performing a bump detection analysis to identify bumps or potholes during the trip, creating statistical features that describe the bumps or potholes, training a predict model using the statistical features and historical driver and/or passenger trip classifications, and repeating these steps for a plurality of sample trips.

In some instances, after analyzing the sensor data to perform the front-rear detection analysis at step 1110, distributed data processing computing platform 110 may generate and send one or more notifications to one or more other systems and/or devices, such as one or more notifications to the first user computing device (e.g., user computing device 120). For example, based on analyzing the sensor data received from the first user computing device (e.g., user computing device 120) to determine whether the user of the first user computing device (e.g., user computing device 120) was located in the front portion of the vehicle during the trip or the rear portion of the vehicle during the trip, distributed data processing computing platform 110 may generate a notification indicating whether the user of the first user computing device (e.g., user computing device 120) was located in the front portion of the vehicle during the trip or the rear portion of the vehicle during the trip. Subsequently, distributed data processing computing platform 110 may send, via the communication interface (e.g., communication interface 115), to the first user computing device (e.g., user computing device 120), the notification indicating whether the user of the first user computing device (e.g., user computing device 120) was located in the front portion of the vehicle during the trip or the rear portion of the vehicle during the trip. In addition, by sending the notification indicating whether the user of the first user computing device (e.g., user computing device 120) was located in the front portion of the vehicle during the trip or the rear portion of the vehicle during the trip, distributed data processing computing platform 110 may cause the first user computing device (e.g., user computing device 120) to prompt the first user associated with the first user computing device (e.g., user computing device 120) to confirm whether the user of the first user computing device (e.g., user computing device 120) was located in the front portion of the vehicle during the trip or the rear portion of the vehicle during the trip. For instance, distributed data processing computing platform 110 may cause user computing device 120 to wake and display one or more graphical user interfaces prompting the user of user computing device 120 to confirm the determination made by distributed data processing computing platform 110 with regard to front-rear detection. Distributed data processing computing platform 110 then may update its prediction model(s) based on receiving a response from user computing device 120 indicating whether the user of user computing device 120 confirmed or rejected the determination by distributed data processing computing platform 110, as this user response may serve as verified, actual, and/or "truth" data that is usable by distributed data processing computing platform 110 to validate and/or improve its front-rear detection models and/or other related algorithms.

In some instances, after analyzing the sensor data to perform the front-rear detection analysis at step 1110, distributed data processing computing platform 110 may generate and send one or more notifications to an administrative device, such as an analyst device. For example, based on analyzing the sensor data received from the first user computing device (e.g., user computing device 120) to determine whether the user of the first user computing device (e.g., user computing device 120) was located in the front portion of the vehicle during the trip or the rear portion of the vehicle during the trip, distributed data processing computing platform 110 may send, to a data analyst console computing device (e.g., data analyst console computing device 150), detection data indicating whether the user of the first user computing device (e.g., user computing device 120) was located in the front portion of the vehicle during the trip or the rear portion of the vehicle during the trip. In addition, by sending the detection data to the data analyst console computing device (e.g., data analyst console computing device 150), distributed data processing computing platform 110 may cause the data analyst console computing device (e.g., data analyst console computing device 150) to wake and display front-rear information identifying whether the user of the first user computing device (e.g., user computing device 120) was located in the front portion of the vehicle during the trip or the rear portion of the vehicle during the trip. For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

Figure 12:
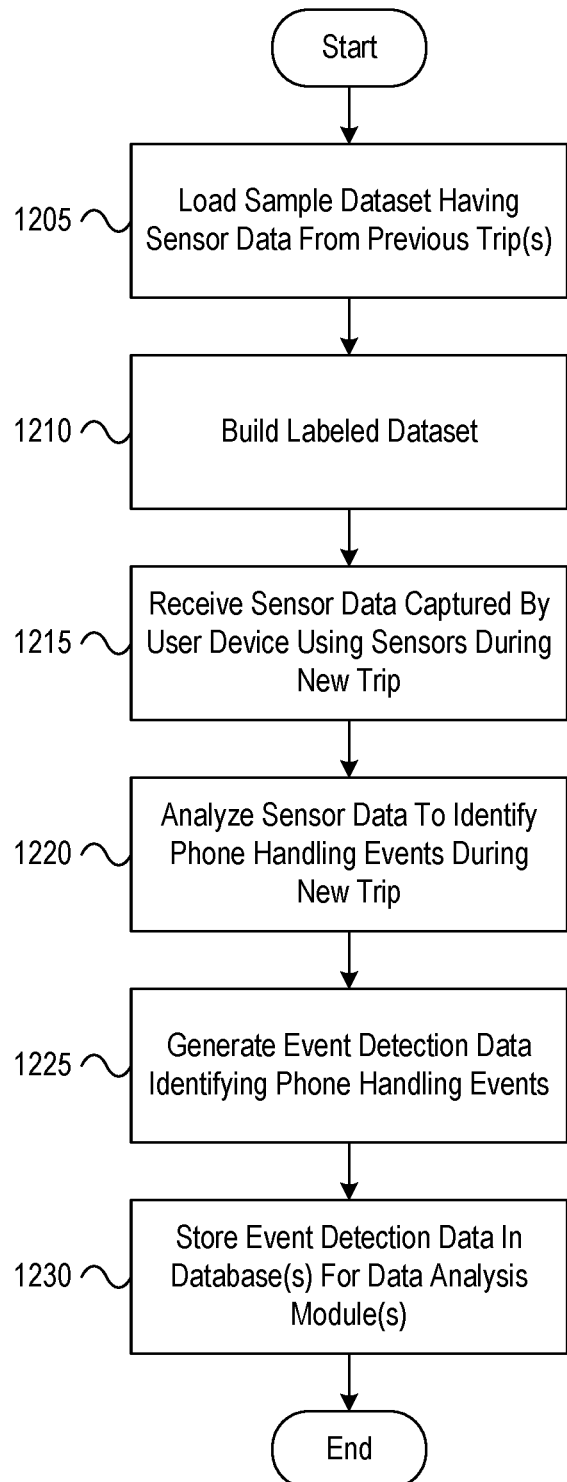
FIG. 12 depicts an illustrative method for processing sensor data to identifying phone handling events in accordance with one or more example embodiments.

FIG. 12 depicts an illustrative method for processing sensor data to identifying phone handling events in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 12, at step 1205, distributed data processing computing platform 110 may load a sample dataset that includes sensor data captured during one or more previous trips. For example, at step 1205, distributed data processing computing platform 110 may load a sample dataset comprising first sensor data captured by a first user computing device (e.g., user computing device 120) using one or more sensors built into the first user computing device (e.g., user computing device 120) during a first trip in a first vehicle. At step 1210, distributed data processing computing platform 110 may build a labeled dataset. For example, at step 1210, distributed data processing computing platform 110 may build a labeled dataset based on the sample dataset. In building a labeled dataset, distributed data processing computing platform 110 may relate and/or assign various labels (e.g., trip start, trip end, walking, driving, riding as passenger, etc.) to different features and/or segments in the sensor data signal, and these labels may be used in helping to generate and/or recognize patterns and/or signatures that may be used by distributed data processing computing platform 110 in automatically classifying future trips. In addition, distributed data processing computing platform 110 may build the labeled dataset based on the sample dataset loaded at step 1205 and/or a plurality of other sample datasets captured by the same user device (e.g., user computing device 120) and/or other user devices during other, different trips in the same vehicle and/or in different vehicles.

At step 1215, distributed data processing computing platform 110 may receive sensor data captured by a user device during a trip. For example, at step 1215, distributed data processing computing platform 110 may receive, via the communication interface (e.g., communication interface 115), from a second user computing device (e.g., user computing device 130), second sensor data captured by the second user computing device (e.g., user computing device 130) using one or more sensors built into the second user computing device (e.g., user computing device 130) during a second trip in a second vehicle.

At step 1220, distributed data processing computing platform 110 may analyze the sensor data to perform an event detection analysis. For example, at step 1120, distributed data processing computing platform 110 may analyze the second sensor data captured by the second user computing device (e.g., user computing device 130) to identify one or more phone-handling events associated with the second user computing device (e.g., user computing device 130) during the second trip in the second vehicle. For instance, distributed data processing computing platform 110 may analyze the one or more phone-handling events using a classification model that is derived by distributed data processing computing platform 110 from the labeled dataset and that includes motion signatures and/or patterns indicative of phone handling events (e.g., events where a user of a user device picks up, moves around, and/or otherwise handles a phone or other user device, as opposed to other times in a trip where the user device is resting, mounting, or otherwise stationary in the vehicle or at least fixed in the vehicle relative to the motion of the vehicle itself).

At step 1225, distributed data processing computing platform 110 may generate event detection data. For example, at step 1225, based on analyzing the second sensor data captured by the second user computing device (e.g., user computing device 130) to identify the one or more phone-handling events associated with the second user computing device (e.g., user computing device 130) during the second trip in the second vehicle, distributed data processing computing platform 110 may generate event-detection data identifying the one or more phone-handling events associated with the second user computing device (e.g., user computing device 130) during the second trip in the second vehicle. For instance, the event-detection data generated by distributed data processing computing platform 110 may indicate the time at which each event occurred, the type of event that occurred, the amplitude of the event that occurred, the particular pattern or signature that was recognized in identifying the event, and/or other information.

At step 1230, distributed data processing computing platform 110 may store the event detection data. For example, at step 1230, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the event-detection data identifying the one or more phone-handling events associated with the second user computing device (e.g., user computing device 130) during the second trip in the second vehicle. For instance, distributed data processing computing platform 110 may store the event detection data such that the event detection data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

In some instances, receiving the second sensor data captured by the second user computing device using the one or more sensors built into the second user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the second user computing device. For example, in receiving the second sensor data captured by the second user computing device (e.g., user computing device 130) using the one or more sensors built into the second user computing device (e.g., user computing device 130) at step 1215, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the second user computing device (e.g., user computing device 130).

In some instances, the sample dataset (which may, e.g., be loaded by distributed data processing computing platform 110 at step 1205) may include tracking data captured by an on-board diagnostics (OBD-II) device associated with the first vehicle during the first trip in the first vehicle. For instance, a fixed OBD-II device may be mounted in the vehicle and capturing data during a trip while user computing device 120 is also capturing and recording trip data. The data signals from both the OBD-II device and user computing device 120 can then be superimposed and/or otherwise compared with each other (e.g., by distributed data processing computing platform 110). At points where the signals are different (e.g., where the motion captured by user computing device 120 differs from the motion captured by the OBD-II device), distributed data processing computing platform 110 may determine that phone handling events occurred. Thus, distributed data processing computing platform 110 may label points in the data as being phone handling events based on identifying a difference between the motion recorded in the data received from user computing device 120 and the motion recorded in the data received from the OBD-II device. In this way, distributed data processing computing platform 110 may generate phone handling event labels when phone-captured data does not match OBD-II device-captured data. In some instances, before distributed data processing computing platform 110 can compare these two signals, the tracking data captured by the OBD-II device might first need to be matched with the sensor data captured by user computing device 120 (e.g., using a dynamic time warping algorithm), because distributed data processing computing platform 110 otherwise might not know that the OBD-II tracking data and the mobile device sensor data received from user computing device 120 correspond to the same trip (e.g., the first trip).

In some instances, in building the labeled dataset at step 1210, distributed data processing computing platform 110 may correlate OBD-II device data and mobile device data, remove noise from the signals associated with these devices, align one or more axes, and then identify time frames in which the signals deviate. For example, in building the labeled dataset based on the sample dataset at step 1210, distributed data processing computing platform 110 may apply a cross-correlation function to the tracking data captured by the OBD-II device and the first sensor data captured by the first user computing device (e.g., user computing device 120) to correct for time shift. For instance, distributed data processing computing platform 110 may use the cross-correlation function to ensure that the captured data is temporally aligned in the two sets of data. Subsequently, distributed data processing computing platform 110 may remove first noise from an end portion of the first sensor data captured by the first user computing device (e.g., user computing device 120). For instance, distributed data processing computing platform 110 may use a trip-end function to cut walking noise from the end of the trip data captured by the mobile device (e.g., user computing device 120). Then, distributed data processing computing platform 110 may remove second noise from accelerometer data included in the first sensor data captured by the first user computing device (e.g., user computing device 120). For instance, distributed data processing computing platform 110 may use a band pass filter to remove noise from accelerometer data associated with the trip data captured by the mobile device (e.g., user computing device 120).

After removing the noise from the data, distributed data processing computing platform 110 may align at least one axis of a reference frame of the first user computing device (e.g., user computing device 120) with at least one axis of a reference frame of the vehicle. For instance, distributed data processing computing platform 110 may perform an axis alignment method (e.g., as discussed above with respect to FIG. 8). Subsequently, distributed data processing computing platform 110 may identify one or more time frames in which an accelerometer reading in the accelerometer data included in the first sensor data captured by the first user computing device (e.g., user computing device 120) deviates from a corresponding reading in the tracking data captured by the OBD-II device. For instance, distributed data processing computing platform 110 may identify one or more time frames in which the Z-component of the accelerometer reading in the mobile device trip (e.g., the trip data captured by user computing device 120) exceeds a threshold, and in which the Z-component of the OBD-II device trip is substantially constant. The one or more identified time frames then may be labeled by distributed data processing computing platform 110 as phone handling events, since these time frames correspond to points where the captured data from the phone (which may, e.g., have been held or moved by the user) deviates from the captured data from the OBD-II device (which may, e.g., be statically mounted in the vehicle).

In some instances, in building the labeled dataset at step 1210, distributed data processing computing platform 110 may update one or more models used by distributed data processing computing platform 110 in identifying phone handling events, such as the one or more models used by distributed data processing computing platform 110 in identifying phone handling events at step 1220. For example, in building the labeled dataset based on the sample dataset at step 1210, distributed data processing computing platform 110 may analyze the first sensor data captured by the first user computing device (e.g., user computing device 120) during the one or more time frames to determine one or more features indicative of a phone-handling event. Subsequently, distributed data processing computing platform 110 may update a phone-handling identification model based on the one or more features indicative of the phone-handling event. For instance, distributed data processing computing platform 110 may analyze the data captured by the mobile device (e.g., user computing device 120) during the time frames (e.g., the times when the phone was being handled) to determine features and/or signatures that may be used in identifying future phone handling events (e.g., based only on mobile-device-captured accelerometer data). The features (which may, e.g., be identified by distributed data processing computing platform 110) may correspond to profiles and/or particular curves in a measured data set and may be expressed as statistical features and/or patterns that can be derived from the signal data (e.g., how many peaks are present in the accelerometer data, how many valleys are present in the accelerometer data, how much temporal spacing exists between different groups of peaks and/or valleys, etc.). These features may feed into a model that may be usable by distributed data processing computing platform 110 in classifying future phone handling events. In some instances, distributed data processing computing platform 110 may validate the phone-handling identification model and/or may validate thresholds used in identifying the time frames based on a preexisting validation dataset that includes captured sensor data corresponding to manually labeled phone handling events.

In some instances, in analyzing the sensor data captured by user computing device 130, distributed data processing computing platform 110 may divide the sensor data into frames and then analyze each frame for phone-handling activity. For example, in analyzing the second sensor data captured by the second user computing device (e.g., user computing device 130) to identify the one or more phone-handling events associated with the second user computing device (e.g., user computing device 130) during the second trip in the second vehicle at step 1220, distributed data processing computing platform 110 may divide the second sensor data captured by the second user computing device (e.g., user computing device 130) into a plurality of one-second frames. Subsequently, distributed data processing computing platform 110 may analyze the plurality of one-second frames based on the labeled dataset to determine whether each one-second frame of the plurality of one-second frames is indicative of phone handling activity or no phone handling activity. For instance, distributed data processing computing platform 110 may analyze the plurality of one-second frames for phone handling activity or no phone handling activity based on motion patterns, such as accelerometer motion patterns, detected during each frame and identified using the model derived by distributed data processing computing platform 110 from the labeled dataset.

In some instances, after analyzing the sensor data captured by user computing device 130 at step 1220, distributed data processing computing platform 110 may generate and send one or more notifications to one or more other systems and/or devices, such as one or more notifications to the second user computing device (e.g., user computing device 130). For example, based on analyzing the second sensor data captured by the second user computing device (e.g., user computing device 130) to identify the one or more phone-handling events associated with the second user computing device (e.g., user computing device 130) during the second trip in the second vehicle, distributed data processing computing platform 110 may generate a notification identifying the one or more phone-handling events associated with the second user computing device (e.g., user computing device 130) during the second trip in the second vehicle. Subsequently, distributed data processing computing platform 110 may send, via the communication interface (e.g., communication interface 115), to the second user computing device (e.g., user computing device 130), the notification identifying the one or more phone-handling events associated with the second user computing device (e.g., user computing device 130) during the second trip in the second vehicle. In addition, by sending the notification identifying the one or more phone-handling events associated with the second user computing device (e.g., user computing device 130) during the second trip in the second vehicle, distributed data processing computing platform 110 may cause the second user computing device (e.g., user computing device 130) to prompt a user of the second user computing device (e.g., user computing device 130) to confirm whether the user of the second user computing device (e.g., user computing device 130) was handling the second user computing device (e.g., user computing device 130) at one or more times corresponding to the one or more phone-handling events associated with the second user computing device (e.g., user computing device 130) during the second trip in the second vehicle. For instance, distributed data processing computing platform 110 may cause user computing device 130 to wake and display one or more graphical user interfaces prompting the user of user computing device 130 to confirm the determination made by distributed data processing computing platform 110 with regard to phone-handling event detection. Distributed data processing computing platform 110 then may update its prediction model(s) based on receiving a response from user computing device 130 indicating whether the user of user computing device 130 confirmed or rejected the determination by distributed data processing computing platform 110, as this user response may serve as verified, actual, and/or "truth" data that is usable by distributed data processing computing platform 110 to validate and/or improve its phone-handling event detection models and/or other related algorithms.

In some instances, after analyzing the sensor data captured by user computing device 130 at step 1220 and/or storing the event-detection data at step 1230, distributed data processing computing platform 110 may send the event-detection data to a driver detection module, such as the driver detection module maintained by and/or executed on distributed data processing computing platform 110. For example, distributed data processing computing platform 110 may provide, to a driver-detection module (e.g., driver detection module 112c) associated with the computing platform (e.g., distributed data processing computing platform 110), the event-detection data identifying the one or more phone-handling events associated with the second user computing device (e.g., user computing device 130) during the second trip in the second vehicle. In addition, the driver-detection module (e.g., driver detection module 112c) may be configured to determine whether a user of the second user computing device (e.g., user computing device 130) was a driver during the second trip in the second vehicle or a passenger during the second trip in the second vehicle based on the event-detection data identifying the one or more phone-handling events associated with the second user computing device (e.g., user computing device 130) during the second trip in the second vehicle (e.g., by implementing one or more features discussed above with respect to FIG. 9 and/or described elsewhere herein). For instance, because distributed data processing computing platform 110 is able to identify phone handling events and determine when a given phone handling event started and/or ended and what kind of phone handling event it was, distributed data processing computing platform 110 may then generate (e.g., based on the labeled dataset) and/or otherwise implement user-personalized models, as well as population-level models, to predict whether a given user was a driver or a passenger during a given trip based on any phone handling events detected during that trip.

In some instances, the driver-detection module associated with the computing platform may maintain a population-level model for analyzing phone-handling patterns to determine whether a particular user of a particular user computing device was a driver or a passenger during a particular trip. For example, the driver-detection module (e.g., driver detection module 112c) associated with the computing platform (e.g., distributed data processing computing platform 110) may maintain a population-level model for analyzing phone-handling patterns to determine whether a particular user of a particular user computing device (e.g., user computing device 120, user computing device 130) was a driver or a passenger during a particular trip. For instance, distributed data processing computing platform 110 may generate one or more population-level models and maintain such models in driver detection module 112c to identify certain types of phone handling events that are more indicative of a user being a driver of a vehicle than a passenger of a vehicle, and vice versa, based on population-level phone handling patterns determined by distributed data processing computing platform 110 from one or more labeled datasets.

Figure 13:
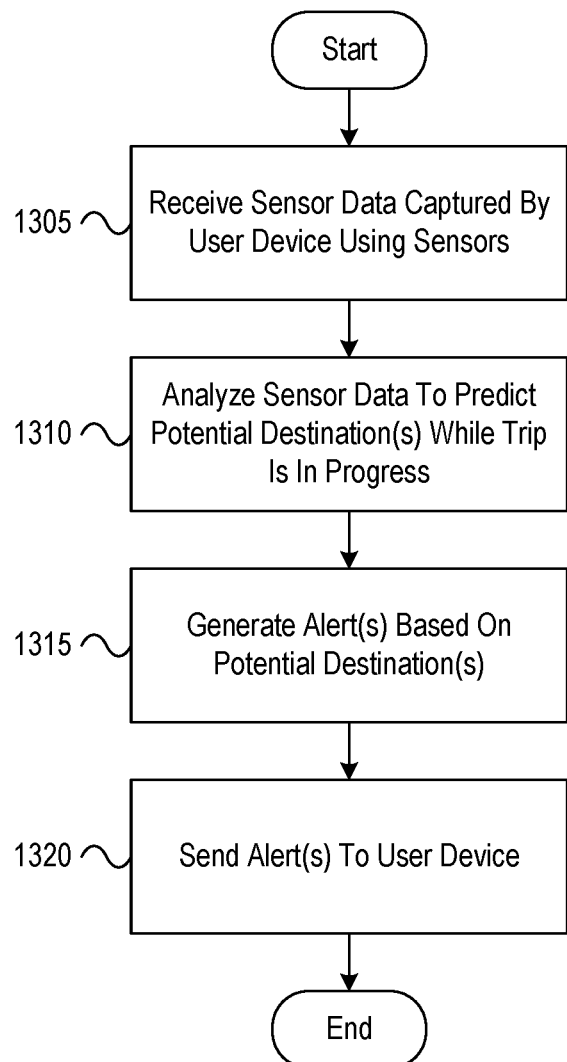
FIG. 13 depicts an illustrative method for processing sensor data to predict potential destinations of an in-progress trip in accordance with one or more example embodiments.

FIG. 13 depicts an illustrative method for processing sensor data to predict potential destinations of an in-progress trip in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 13, at step 1305, distributed data processing computing platform 110 may receive sensor data captured by a user device during a trip. For example, at step 1305, distributed data processing computing platform 110 may receive, via the communication interface (e.g., communication interface 115), from a first user computing device (e.g., user computing device 120), sensor data captured by the first user computing device (e.g., user computing device 120) using one or more sensors built into the first user computing device (e.g., user computing device 120) during a trip in a vehicle.

At step 1310, distributed data processing computing platform 110 may analyze the sensor data to predict potential destinations of the trip while the trip is in progress. For example, at step 1310, while the trip in the vehicle is in progress, distributed data processing computing platform 110 may analyze the sensor data received from the first user computing device (e.g., user computing device 120) to predict one or more potential destinations of a first user of the first user computing device (e.g., user computing device 120).

At step 1315, distributed data processing computing platform 110 may generate one or more alerts based on predicting one or more potential destinations. For example, at step 1315, based on analyzing the sensor data received from the first user computing device (e.g., user computing device 120) to predict the one or more potential destinations of the first user of the first user computing device (e.g., user computing device 120), distributed data processing computing platform 110 may generate one or more alerts associated with the one or more potential destinations predicted for the first user of the first user computing device (e.g., user computing device 120).

At step 1320, distributed data processing computing platform 110 may send the one or more alerts to user computing device 120. For example, at step 1320, distributed data processing computing platform 110 may send, via the communication interface (e.g., communication interface 115), to the first user computing device (e.g., user computing device 120), the one or more alerts associated with the one or more potential destinations predicted for the first user of the first user computing device (e.g., user computing device 120).

In some instances, analyzing the sensor data received from the first user computing device to predict the one or more potential destinations of the first user of the first user computing device may include predicting the one or more potential destinations of the first user of the first user computing device based on a historical distribution of pairs of clusters identifying corresponding start points and end points of different trips taken by the first user of the first user computing device. For example, in analyzing the sensor data received from the first user computing device (e.g., user computing device 120) to predict the one or more potential destinations of the first user of the first user computing device (e.g., user computing device 120) at step 1310, distributed data processing computing platform 110 may predict the one or more potential destinations of the first user of the first user computing device (e.g., user computing device 120) based on a historical distribution of pairs of clusters identifying corresponding start points and end points of different trips taken by the first user of the first user computing device (e.g., user computing device 120).

For instance, distributed data processing computing platform 110 may create, store, and/or update such a historical distribution of pairs of clusters over time as distributed data processing computing platform 110 and/or user computing device 120 records and/or otherwise captures data associated with multiple trips taken by the user of user computing device 120. Distributed data processing computing platform 110 may capture trip start and end points, other points along the trip route, times and/or days of various trips, and/or various other trip data. Based on this data, distributed data processing computing platform 110 may identify points of interest for the user of user computing device 120 (e.g., a set of locations that are the most frequently-visited places of the user of user computing device 120, such as their home, workplace, gym, grocery store, etc.). Once distributed data processing computing platform 110 has established a set of places of interest for the user of user computing device 120, distributed data processing computing platform 110 can predict where the user of user computing device 120 is going for a majority of his or her trips, and this prediction may be made by distributed data processing computing platform 110 based on prior trips that have been recorded by the user's user device (e.g., user computing device 120). While a trip is in progress, distributed data processing computing platform 110 may periodically (e.g., every few minutes) recalculate and/or otherwise update the probabilities associated with the user of user computing device 120 heading to a particular destination or set of destinations. For instance, as the user of user computing device 120 gets closer to and/or farther from one or more previously-predicted destinations, distributed data processing computing platform 110 may update and/or refine its probability calculations.

For instance, distributed data processing computing platform 110 may maintain a table of each user's previous trips, and the table may include data such as each trip's starting location, ending location, time of day the trip was taken, day of week the trip was taken, number of times the trip has been taken, and/or other data. From this table, distributed data processing computing platform 110 may calculate a probability percentage based on multiple different possible destinations, and this may account for the temporal history of the user (e.g., time of day, day of the week, etc.). For instance, if the user of user computing device 120 has gone to work 80 times and to the gym 20 times on Tuesday mornings between 7 am and 8 am, then distributed data processing computing platform 110 may determine for a current trip occurring on a Tuesday morning between 7 am and 8 am that there is an 80% likelihood that the user of user computing device 120 is going to work and a 20% likelihood that the user is going to the gym. In some instances, the manner in which the user of user computing device 120 is driving (which may, e.g., be inferred by distributed data processing computing platform 110 from accelerometer received from user computing device 120) also may be factored into the prediction made by user computing device 120. For instance, if the user of user computing device 120 is making steady progress in stop-and-go traffic (e.g., as indicated in accelerometer data received from user computing device 120), distributed data processing computing platform 110 may determine that the user of user computing device 120 is headed to a typical destination (e.g., home, work, etc.), whereas if the user of user computing device 120 is driving aggressively or experiencing rapid acceleration and/or deceleration (e.g., as indicated in accelerometer data received from user computing device 120), distributed data processing computing platform 110 may determine that the user of user computing device 120 is going to a non-typical destination (e.g., a hospital) or otherwise responding to an emergency situation.

In some instances, analyzing the sensor data received from the first user computing device to predict the one or more potential destinations of the first user of the first user computing device may include predicting the one or more potential destinations of the first user of the first user computing device based on snapping a current trip starting point to an existing points-of-interest cluster associated with the first user of the first user computing device. For example, in analyzing the sensor data received from the first user computing device (e.g., user computing device 120) to predict the one or more potential destinations of the first user of the first user computing device (e.g., user computing device 120) at step 1310, distributed data processing computing platform 110 may predict the one or more potential destinations of the first user of the first user computing device (e.g., user computing device 120) based on snapping a current trip starting point to an existing points-of-interest cluster associated with the first user of the first user computing device (e.g., user computing device 120). For instance, by snapping a current trip starting point to an existing points-of-interest cluster associated with the first user of the first user computing device (e.g., user computing device 120), distributed data processing computing platform 110 then may loop up a historical distribution or start-point and end-point pairs to determine the likelihood of the user of user computing device 120 ending the trip at one or more known user-specific points of interest (e.g., based on past trips starting at the existing points-of-interest cluster ending at one or more specific destinations). In some instances, distributed data processing computing platform 110 may factor in time of day and day of week when evaluating the current trip in view of the historical distribution. In addition, distributed data processing computing platform 110 may update its destination prediction while the trip is underway (e.g., new destination predictions may be generated by distributed data processing computing platform 110 at multiple points during the trip, such as every few minutes, every few miles, etc.).

In some instances, analyzing the sensor data received from the first user computing device to predict the one or more potential destinations of the first user of the first user computing device may include predicting the one or more potential destinations of the first user of the first user computing device based on population-level points-of-interest data. For example, in analyzing the sensor data received from the first user computing device (e.g., user computing device 120) to predict the one or more potential destinations of the first user of the first user computing device (e.g., user computing device 120) at step 1310, distributed data processing computing platform 110 may predict the one or more potential destinations of the first user of the first user computing device (e.g., user computing device 120) based on population-level points-of-interest data. For instance, if user-specific data is not available for the user of user computing device 120, distributed data processing computing platform 110 may generate a general destination prediction based on a most visited points of interest dataset associated with a general population of users (which may, e.g., be tracked by distributed data processing computing platform 110) and/or a group of users (which may, e.g., be associated with the user of user computing device 120).

In some instances, analyzing the sensor data received from the first user computing device to predict the one or more potential destinations of the first user of the first user computing device may include predicting the one or more potential destinations of the first user of the first user computing device based on a grid-based destination prediction model. For example, in analyzing the sensor data received from the first user computing device (e.g., user computing device 120) to predict the one or more potential destinations of the first user of the first user computing device (e.g., user computing device 120) at step 1310, distributed data processing computing platform 110 may predict the one or more potential destinations of the first user of the first user computing device (e.g., user computing device 120) based on a grid-based destination prediction model. For instance, in predicting the one or more potential destinations of the first user of the first user computing device (e.g., user computing device 120) based on a grid-based destination prediction model, distributed data processing computing platform 110 may divide a map into grids and build user-specific grid-to-grid probabilities (e.g., of the user traveling to each grid adjacent to a current grid). Distributed data processing computing platform 110 then may determine an initial predicted destination based on the grid probabilities, and distributed data processing computing platform 110 may update the predicted destination as the trip progresses and the user transitions from one grid to another grid.

In some instances, generating the one or more alerts associated with the one or more potential destinations predicted for the first user of the first user computing device may include generating at least one alert suggesting an alternate route to the first user of the first user computing device based on traffic conditions. For example, in generating the one or more alerts associated with the one or more potential destinations predicted for the first user of the first user computing device (e.g., user computing device 120) at step 1315, distributed data processing computing platform 110 may generate generating at least one alert suggesting an alternate route to the first user of the first user computing device (e.g., user computing device 120) based on traffic conditions. For instance, distributed data processing computing platform 110 may generate an alert instructing a user of user computing device 120 to take an alternate route to avoid one or more road closures, traffic accidents, traffic congestion, and/or other traffic conditions.

In some instances, generating the one or more alerts associated with the one or more potential destinations predicted for the first user of the first user computing device may include generating at least one alert suggesting one or more parking locations for the vehicle. For example, in generating the one or more alerts associated with the one or more potential destinations predicted for the first user of the first user computing device (e.g., user computing device 120) at step 1315, distributed data processing computing platform 110 may generate at least one alert suggesting one or more parking locations for the vehicle. For instance, distributed data processing computing platform 110 may generate an alert suggesting one or more places where the user of user computing device 120 can park the vehicle as the user approaches and/or arrives at a predicted destination.

In some instances, after analyzing the sensor data to predict potential destinations of the trip at step 1310, distributed data processing computing platform 110 may generate and share destination-prediction data. For example, based on analyzing the sensor data received from the first user computing device (e.g., user computing device 120) to predict the one or more potential destinations of the first user of the first user computing device (e.g., user computing device 120), distributed data processing computing platform 110 may generate destination-prediction data identifying the one or more potential destinations of the first user of the first user computing device (e.g., user computing device 120). Subsequently, distributed data processing computing platform 110 may provide, to a driver-detection module (e.g., driver-detection module 112c) associated with the computing platform (e.g., distributed data processing computing platform 110), the destination-prediction data identifying the one or more potential destinations of the first user of the first user computing device (e.g., user computing device 120). In addition, the driver-detection module (e.g., driver-detection module 112c) may be configured to determine whether the first user of the first user computing device (e.g., user computing device 120) is a driver during the trip in the vehicle or a passenger during the trip in the vehicle based on the destination-prediction data identifying the one or more potential destinations of the first user of the first user computing device (e.g., user computing device 120). For instance, driver-detection module 112c may determine whether the user of user computing device 120 is a driver or a passenger during the trip by implementing one or more features discussed above with respect to FIG. 9 and/or described elsewhere herein. For instance, if the user of user computing device 120 appears to be likely headed to a particular destination and the user has previously been identified as a driver on trips to the particular destination, then driver-detection module 112c and/or distributed data processing computing platform 110 may determine that the user is likely a driver during the current trip. Alternatively, if the user has previously been identified as a passenger on trips to the particular destination, then driver-detection module 112c and/or distributed data processing computing platform 110 may determine that the user is likely a passenger during the current trip.

In some instances, after analyzing the sensor data to predict potential destinations of the trip at step 1310, distributed data processing computing platform 110 may analyze the sensor data to predict potential routes for the trip. For example, while the trip in the vehicle is in progress, distributed data processing computing platform 110 may analyze the sensor data received from the first user computing device (e.g., user computing device 120) to predict one or more potential routes of the first user of the first user computing device (e.g., user computing device 120).

In some instances, analyzing the sensor data received from the first user computing device to predict the one or more potential routes of the first user of the first user computing device may include predicting the one or more potential routes of the first user of the first user computing device based on clustering and scoring one or more previous routes taken by the first user of the first user computing device. For example, in analyzing the sensor data received from the first user computing device (e.g., user computing device 120) to predict the one or more potential routes of the first user of the first user computing device (e.g., user computing device 120), distributed data processing computing platform 110 may predict the one or more potential routes of the first user of the first user computing device (e.g., user computing device 120) based on clustering and scoring one or more previous routes taken by the first user of the first user computing device (e.g., user computing device 120). For instance, distributed data processing computing platform 110 may cluster and score the one or more previous routes taken by the first user of the first user computing device (e.g., user computing device 120) to identify a likely route for the current trip (e.g., more frequently traveled routes may be scored higher and thus considered by distributed data processing computing platform 110 as being more likely for the current trip, while less frequently traveled routes may be scored lower and thus considered by distributed data processing computing platform 110 as being less likely for the current trip).

In some instances, clustering and scoring the one or more previous routes taken by the first user of the first user computing device may be based on a current time of day and a current day of week. For example, in clustering and scoring the one or more previous routes taken by the first user of the first user computing device (e.g., user computing device 120), distributed data processing computing platform 110 may cluster and score the one or more previous routes taken by the first user of the first user computing device (e.g., user computing device 120) based on a current time of day and a current day of week. For instance, distributed data processing computing platform 110 may assign a probability value to each unique potential route to a predicted destination on various factors, including time of day and day of week. Distributed data processing computing platform 110 may use dynamic time warping to compare all different routes that a user has taken in the past and then create a distance matrix based on these previous routes (e.g., if the user has three routes to a destination, there may be a 60% chance of route A, a 20% chance of route B, and a 20% chance of route C, based on the user making corresponding usage of these routes during similar timeframes). Distributed data processing computing platform 110 may use such dynamic time warping because, in some instances, a user of user computing device 120 might take the same route as a previous route but may stop at a gas station or get caught in traffic (which may, e.g., introduce slight variances in the sensor data captured by user computing device 120 even though the user is traveling along the same route). In addition, satellite positioning data may include some amount of signal noise, which also might need to be filtered out. Thus, distributed data processing computing platform 110 may use a DBSCAN clustering algorithm to cluster routes (e.g., two very similar routes may be considered the same route). Additionally, distributed data processing computing platform 110 may apply open-ended dynamic time warping to an in-progress trip to determine how changes in location are indicative of a change warranting an updated route prediction. In some instances, a change in route or a particular route prediction may help distributed data processing computing platform 110 update its destination prediction results (e.g., if a user is taking a particular route and has a deviation, this deviation information may be used to update a predicted destination).

In some instances, distributed data processing computing platform 110 may generate and send one or more alerts based on a route prediction analysis. For example, based on analyzing the sensor data received from the first user computing device (e.g., user computing device 120) to predict the one or more potential routes of the first user of the first user computing device (e.g., user computing device 120), distributed data processing computing platform 110 may generate one or more alerts associated with the one or more potential routes predicted for the first user of the first user computing device (e.g., user computing device 120). Subsequently, distributed data processing computing platform 110 may send, via the communication interface (e.g., communication interface 115), to the first user computing device (e.g., user computing device 120), the one or more alerts associated with the one or more potential routes predicted for the first user of the first user computing device (e.g., user computing device 120). For instance, the one or more alerts generated by distributed data processing computing platform 110 may include route information and/or information suggesting alternative routes, and by sending such alerts to user computing device 120, distributed data processing computing platform 110 may cause user computing device 120 to display and/or otherwise present the information associated with the one or more alerts.

In some instances, generating the one or more alerts associated with the one or more potential routes predicted for the first user of the first user computing device may include generating at least one alert that includes traffic information specific to at least one potential route of the one or more potential routes predicted for the first user of the first user computing device, weather information specific to at least one potential route of the one or more potential routes predicted for the first user of the first user computing device, or hazard information specific to at least one potential route of the one or more potential routes predicted for the first user of the first user computing device. For example, in generating the one or more alerts associated with the one or more potential routes predicted for the first user of the first user computing device (e.g., user computing device 120), distributed data processing computing platform 110 may generate at least one alert that includes traffic information specific to at least one potential route of the one or more potential routes predicted for the first user of the first user computing device (e.g., user computing device 120), weather information specific to at least one potential route of the one or more potential routes predicted for the first user of the first user computing device (e.g., user computing device 120), or hazard information specific to at least one potential route of the one or more potential routes predicted for the first user of the first user computing device (e.g., user computing device 120). This prediction and alerting functionality is different from alerts available in conventional navigation applications, because distributed data processing computing platform 110 has predicted a destination and a route for user computing device 120; thus, distributed data processing computing platform 110 is able to provide relevant traffic, weather, and other notifications to user computing device 120 without user computing device 120 manually informing distributed data processing computing platform 110 where user computing device 120 is going.

In some instances, distributed data processing computing platform 110 may utilize a customer insights module (e.g., customer insights module 112*n*) in combination with and/or independently from the destination prediction, route prediction, driver detection, and/or other features described herein. For example, using customer insights module 112*n*, distributed data processing computing platform 110 may load a user-specific dataset that includes captured sensor data from a user device (e.g., user computing device 120) associated with a plurality of trips taken by a user of the user device. Based on the user-specific dataset, distributed data processing computing platform 110 may generate a user profile for the user of the user device (e.g., user computing device 120). The user profile (which may, e.g., be generated by distributed data processing computing platform 110) may include information identifying the user's travel preferences, information identifying the user's points of interest, and/or other user-specific information. In some instances, distributed data processing computing platform 110 may use this user profile to predict when an imminent trip is about to begin (e.g., an imminent trip involving the user of user computing device 120) and/or when an in-progress trip is about to end (e.g., an in-progress trip involving the user of user computing device 120). For example, distributed data processing computing platform 110 may generate and send a notification to the user device (e.g., user computing device 120) and/or share this prediction information with one or more other modules (e.g., driver detection module 112c) to enable various other functionality. The prediction may be made by distributed data processing computing platform 110 based on time of day and/or day of week and may include a prediction of the mode of transport for the trip (e.g., car, train, subway, etc.).

Figure 14:
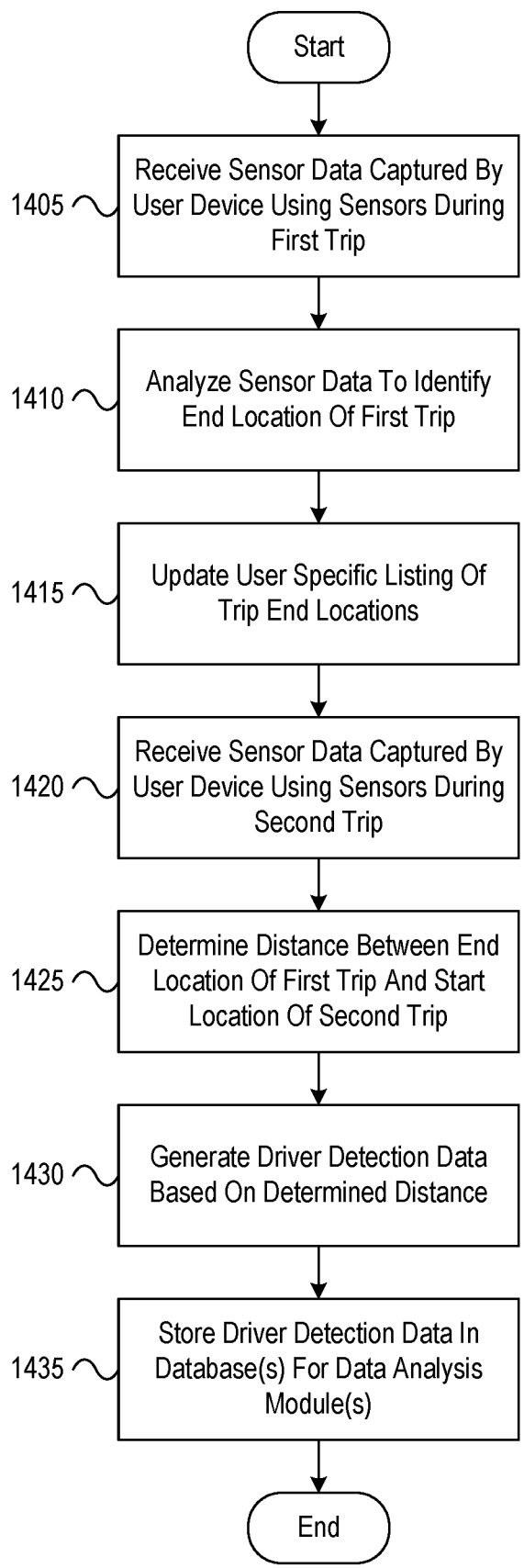
FIG. 14 depicts an illustrative method for processing sensor data to track vehicle locations across different trips in accordance with one or more example embodiments.

FIG. 14 depicts an illustrative method for processing sensor data to track vehicle locations across different trips in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 14, at step 1405, distributed data processing computing platform 110 may receive sensor data captured by a user device during a trip. For example, at step 1405, distributed data processing computing platform 110 may receive, via the communication interface (e.g., communication interface 115), from a first user computing device (e.g., user computing device 120), first sensor data captured by the first user computing device (e.g., user computing device 120) using one or more sensors built into the first user computing device (e.g., user computing device 120) during a first trip in a vehicle.

At step 1410, distributed data processing computing platform 110 may analyze the sensor data to identify an ending location of the trip. For example, at step 1410, distributed data processing computing platform 110 may analyze the first sensor data received from the first user computing device (e.g., distributed data processing computing platform 110) to identify an end location of the first trip in the vehicle. At step 1415, distributed data processing computing platform 110 may update a user-specific listing of trip end locations. For example, at step 1415, based on analyzing the first sensor data received from the first user computing device (e.g., user computing device 120) to identify the end location of the first trip in the vehicle, distributed data processing computing platform 110 may update a user-specific listing of trip-end locations.

At step 1420, distributed data processing computing platform 110 may receive sensor data captured by the user device during another trip. For example, at step 1425, after updating the user-specific listing of trip-end locations, distributed data processing computing platform 110 may receive, via the communication interface (e.g., communication interface 115), from the first user computing device (e.g., user computing device 120), second sensor data captured by the first user computing device (e.g., user computing device 120) using one or more sensors built into the first user computing device (e.g., user computing device 120) during a second trip in the vehicle. In some instances, the second trip may be another trip in the same vehicle as the first trip, and in some instances, the second trip may be another trip in a different vehicle as the first trip (in which case, e.g., it may be more likely that the user is a passenger, instead of a driver, as discussed below).

At step 1425, distributed data processing computing platform 110 may determine a distance between the two trips. For example, at step 1425, distributed data processing computing platform 110 may determine a distance between the end location of the first trip in the vehicle and a start location of the second trip in the vehicle. At step 1430, distributed data processing computing platform 110 may generate driver-detection data based on the distance between the two trips. For example, at step 1435, based on the distance between the end location of the first trip in the vehicle and the start location of the second trip in the vehicle, distributed data processing computing platform 110 may generate driver-detection data indicative of a user of whether the first user computing device (e.g., user computing device 120) is a driver of the vehicle during the second trip in the vehicle or a passenger of the vehicle during the second trip in the vehicle.

At step 1435, distributed data processing computing platform 110 may store the driver-detection data. For example, at step 1435, distributed data processing computing platform 110 may store, in at least one database maintained by the computing platform (e.g., distributed data processing computing platform 110) and accessible to one or more data analysis modules associated with the computing platform (e.g., distributed data processing computing platform 110), the driver-detection data indicative of whether the user of the first user computing device (e.g., user computing device 120) is a driver of the vehicle during the second trip in the vehicle or a passenger of the vehicle during the second trip in the vehicle. For instance, distributed data processing computing platform 110 may store the driver-detection data such that the driver-detection data is accessible to trip detection module 112a, axis alignment module 112b, driver detection module 112c, trip anomaly detection module 112d, exit point detection module 112e, left-right exit detection module 112f, front-rear detection module 112g, event detection module 112h, vehicle mode detection module 112i, places of interest determination module 112j, destination prediction module 112k, route prediction module 112m, customer insights module 112n, and/or car tracking module 112p.

In some instances, receiving the first sensor data captured by the first user computing device using the one or more sensors built into the first user computing device may include receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device.

For example, in receiving the first sensor data captured by the first user computing device (e.g., user computing device 120) using the one or more sensors built into the first user computing device (e.g., user computing device 120) at step 1405, distributed data processing computing platform 110 may receive data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device (e.g., user computing device 120).

In some instances, receiving the first sensor data from the first user computing device may include receiving location data identifying geographic coordinates of the end location of the first trip in the vehicle. For example, in receiving the first sensor data from the first user computing device (e.g., user computing device 120) at step 1405, distributed data processing computing platform 110 may receive location data identifying geographic coordinates of the end location of the first trip in the vehicle. For instance, such location data may be captured by and/or may otherwise originate from a satellite positioning system receiver (e.g., a GPS receiver) included in user computing device 120.

In some instances, analyzing the first sensor data received from the first user computing device to identify the end location of the first trip in the vehicle may include determining the end location of the first trip in the vehicle by determining an exit point associated with a time window in which the user of the first user computing device exited the vehicle. For example, in analyzing the first sensor data received from the first user computing device (e.g., user computing device 120) to identify the end location of the first trip in the vehicle at step 1410, distributed data processing computing platform 110 may determine the end location of the first trip in the vehicle by determining an exit point associated with a time window in which the user of the first user computing device (e.g., user computing device 120) exited the vehicle. For instance, distributed data processing computing platform 110 may determine the exit point associated with the time window in which the user of the first user computing device (e.g., user computing device 120) exited the vehicle by performing an exit-point detection analysis (e.g., as described above with respect to FIG. 10).

In some instances, the user-specific listing of trip-end locations may include information identifying one or more locations at which one or more previous car trips taken by the user of the first user computing device ended. For example, the user-specific listing of trip-end locations (which may, e.g., be updated by distributed data processing computing platform 110 at step 1415) may include information identifying one or more locations at which one or more previous car trips taken by the user of the first user computing device (e.g., user computing device 120) ended. For instance, the user-specific listing of trip-end locations (which may, e.g., be updated by distributed data processing computing platform 110 at step 1415) may include geographic coordinates of the one or more locations at which the one or more previous car trips taken by the user of the first user computing device (e.g., user computing device 120) ended.

In some instances, receiving the second sensor data from the first user computing device may include receiving location data identifying geographic coordinates of the start location of the second trip in the vehicle. For example, in receiving the second sensor data from the first user computing device (e.g., user computing device 120), distributed data processing computing platform 110 may receive location data identifying geographic coordinates of the start location of the second trip in the vehicle. For instance, such location data may be captured by and/or may otherwise originate from a satellite positioning system receiver (e.g., a GPS receiver) included in user computing device 120. In some instances, the second trip may be another trip in the same vehicle (e.g., the first vehicle) as the first trip, and in some instances, the second trip may be another trip in a different vehicle (e.g., a second vehicle different from the first vehicle).

In some instances, distributed data processing computing platform 110 may generate the driver-detection data at step 1430 based on a user-specific distance threshold. For example, generating the driver-detection data indicative of whether the user of the first user computing device is a driver of the vehicle during the second trip in the vehicle or a passenger of the vehicle during the second trip in the vehicle may include: generating data indicating that the user of the first user computing device is a driver of the vehicle during the second trip in the vehicle when the distance between the end location of the first trip in the vehicle and the start location of the second trip in the vehicle does not exceed a user-specific distance threshold; and generating data indicating that the user of the first user computing device is a passenger of the vehicle during the second trip in the vehicle when the distance between the end location of the first trip in the vehicle and the start location of the second trip in the vehicle exceeds the user-specific distance threshold. For example, in generating the driver-detection data indicative of whether the user of the first user computing device (e.g., user computing device 120) is a driver of the vehicle during the second trip in the vehicle or a passenger of the vehicle during the second trip in the vehicle at step 1430, distributed data processing computing platform 110 may generate data indicating that the user of the first user computing device (e.g., user computing device 120) is a driver of the vehicle during the second trip in the vehicle when the distance between the end location of the first trip in the vehicle and the start location of the second trip in the vehicle does not exceed a user-specific distance threshold. Alternatively, distributed data processing computing platform 110 may generate data indicating that the user of the first user computing device (e.g., user computing device 120) is a passenger of the vehicle during the second trip in the vehicle when the distance between the end location of the first trip in the vehicle and the start location of the second trip in the vehicle exceeds the user-specific distance threshold. For instance, distributed data processing computing platform 110 may treat a shorter distance (e.g., not exceeding the threshold) as more indicative of a driver trip because the user of user computing device 120 is more likely to be getting in their own car and driving. In addition, distributed data processing computing platform 110 may treat a longer distance (e.g., exceeding the threshold) as more indicative of a passenger trip because the user of user computing device 120 is more likely to have gone somewhere (e.g., walked somewhere, taken public transit, etc.) and is now riding in another person's car for that second trip.

In some instances, the user-specific distance threshold may be determined by the computing platform based on one or more previous trips taken by the user of the first user computing device. For example, the user-specific distance threshold (which may, e.g., be used by distributed data processing computing platform 110 in detecting the driver-detection data, as described above) may be determined by the computing platform (e.g., distributed data processing computing platform 110) based on one or more previous trips taken by the user of the first user computing device (e.g., user computing device 120). For instance, the one or more previous trips taken by the user of the first user computing device (e.g., user computing device 120) may be reflected in the user-specific listing of trip-end locations, and distributed data processing computing platform 110 may calculate the user-specific distance threshold based on any and/or all of the previous end points where the user's car trips have ended (and, e.g., based on how close subsequent car trips started, particularly car trips that were then determined by distributed data processing computing platform 110 to be driver trips and not passenger trips).

In some instances, after generating the driver-detection data at step 1430, distributed data processing computing platform 110 may generate and send one or more notifications to one or more other systems and/or devices, such as one or more notifications to the first user computing device (e.g., user computing device 120). For example, based on storing the driver-detection data indicative of whether the user of the first user computing device (e.g., user computing device 120) is a driver of the vehicle during the second trip in the vehicle or a passenger of the vehicle during the second trip in the vehicle, distributed data processing computing platform 110 may generate a notification indicating whether the user of the first user computing device (e.g., user computing device 120) is a driver of the vehicle during the second trip in the vehicle or a passenger of the vehicle during the second trip in the vehicle. Subsequently, distributed data processing computing platform 110 may send, via the communication interface (e.g., communication interface 115), to the first user computing device (e.g., user computing device 120), the notification indicating whether the user of the first user computing device (e.g., user computing device 120) is a driver of the vehicle during the second trip in the vehicle or a passenger of the vehicle during the second trip in the vehicle. In addition, by sending the notification indicating whether the user of the first user computing device (e.g., user computing device 120) is a driver of the vehicle during the second trip in the vehicle or a passenger of the vehicle during the second trip in the vehicle, distributed data processing computing platform 110 may cause the first user computing device (e.g., user computing device 120) to prompt the first user associated with the first user computing device (e.g., user computing device 120) to confirm whether the user of the first user computing device (e.g., user computing device 120) is a driver of the vehicle during the second trip in the vehicle or a passenger of the vehicle during the second trip in the vehicle. For instance, distributed data processing computing platform 110 may cause user computing device 120 to wake and display one or more graphical user interfaces prompting the user of user computing device 120 to confirm the determination made by distributed data processing computing platform 110 with regard to car-tracking-based driver detection. Distributed data processing computing platform 110 then may update its prediction model(s) based on receiving a response from user computing device 120 indicating whether the user of user computing device 120 confirmed or rejected the determination by distributed data processing computing platform 110, as this user response may serve as verified, actual, and/or "truth" data that is usable by distributed data processing computing platform 110 to validate and/or improve its car-tracking-based driver detection models and/or other related algorithms (e.g., to update or otherwise modify the user-specific distance threshold discussed above).

In some instances, after generating the driver-detection data at step 1430, distributed data processing computing platform 110 may generate and send one or more notifications to an administrative device, such as an analyst device. For example, based on storing the driver-detection data indicative of whether the user of the first user computing device (e.g., user computing device 120) is a driver of the vehicle during the second trip in the vehicle or a passenger of the vehicle during the second trip in the vehicle, distributed data processing computing platform 110 may send, to a data analyst console computing device (e.g., data analyst console computing device 150), detection data indicating whether the user of the first user computing device (e.g., user computing device 120) is a driver of the vehicle during the second trip in the vehicle or a passenger of the vehicle during the second trip in the vehicle. In addition, by sending the detection data to the data analyst console computing device (e.g., data analyst console computing device 150), distributed data processing computing platform 110 may cause the data analyst console computing device (e.g., data analyst console computing device 150) to wake and display driver-detection information identifying whether the user of the first user computing device (e.g., user computing device 120) is a driver of the vehicle during the second trip in the vehicle or a passenger of the vehicle during the second trip in the vehicle. For instance, distributed data processing computing platform 110 may cause data analyst console computing device 150 to display and/or otherwise present one or more graphical user interfaces including this information (which may, e.g., enable an analyst user of data analyst console computing device 150 to review and/or edit the information and/or any corresponding determinations made by distributed data processing computing platform 110 based on captured sensor data).

Figure 15:
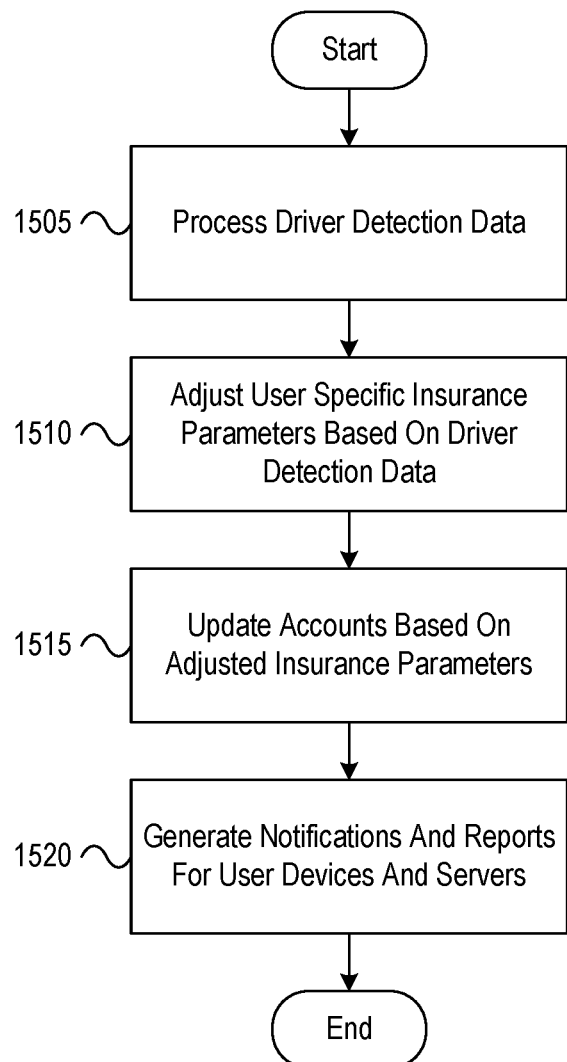
FIG. 15 depicts an illustrative method for processing driver detection data to adjust insurance parameters and update accounts in accordance with one or more example embodiments.

FIG. 15 depicts an illustrative method for processing driver detection data to adjust insurance parameters and update accounts in accordance with one or more example embodiments. In some embodiments, various aspects of this method may be implemented using one or more of the computer systems, computing devices, networks, and/or other operating infrastructure included in computing environment 100, as described in greater detail below. In addition, various aspects of this method may be executed independently and/or performed in combination with one or more steps of the example event sequence discussed above (e.g., in configuring user devices, capturing and/or receiving sensor data, analyzing sensor data, generating and/or storing records, generating and/or presenting user interfaces, etc.) and/or in combination with one or more steps of the other methods described below.

Referring to FIG. 15, at step 1505, distributed data processing computing platform 110 may load and process driver detection data. For example, at step 1505, distributed data processing computing platform 110 may load and process driver detection data from at least one database maintained by the computing platform (e.g., distributed data processing computing platform 110) and accessible to one or more data analysis modules associated with the computing platform (e.g., distributed data processing computing platform 110). The driver-detection data may be indicative of whether the user of a first user computing device (e.g., user computing device 120) is a driver of a vehicle during a trip in the vehicle or a passenger of the vehicle during the trip in the vehicle. For instance, distributed data processing computing platform 110 may load and process driver detection that may have been generated and/or stored (e.g., in connection with execution of one or more of the example methods described above) by one or more of trip detection module 112*a*, axis alignment module 112*b*, driver detection module 112*c*, trip anomaly detection module 112*d*, exit point detection module 112*e*, left-right exit detection module 112*f*, front-rear detection module 112*g*, event detection module 112*h*, vehicle mode detection module 112*i*, places of interest determination module 112*j*, destination prediction module 112*k*, route prediction module 112*m*, customer insights module 112*n*, and/or car tracking module 112*p*.

At step 1510, distributed data processing computing platform 110 may adjust one or more user-specific insurance parameters based on the driver detection data. For example, at step 1510, distributed data processing computing platform 110 may adjust a coverage amount of an insurance policy associated with the user of user computing device 120, a deductible of the insurance policy associated with the user of user computing device 120, a price of the insurance policy associated with the user of user computing device 120, and/or one or more other features and/or other parameters of the insurance policy associated with the user of user computing device 120 based on the driver detection data. For example, distributed data processing computing platform 110 may adjust the insurance policy associated with the user of user computing device 120 to increase costs associated with the insurance policy associated with the user of user computing device 120 based on detecting that the user of user computing device 120 is a driver (e.g., because being a driver may be associated with relatively greater insurance risk), and/or distributed data processing computing platform 110 may adjust the insurance policy associated with the user of user computing device 120 to decrease costs associated with the insurance policy associated with the user of user computing device 120 based on detecting that the user of user computing device 120 is a passenger (e.g., because being a passenger may be associated with relatively less insurance risk).

At step 1515, distributed data processing computing platform 110 may update one or more accounts based on adjusting the one or more user-specific insurance parameters. For example, based on adjusting the one or more user-specific insurance parameters based on the driver detection data, distributed data processing computing platform 110 may cause one or more accounts associated with the user of user computing device 120 to be debited or credited (e.g., depending on whether the costs associated with the insurance policy associated with the user of user computing device 120 were increased or decreased based on the driver detection data).

At step 1520, distributed data processing computing platform 110 may generate one or more notifications and/or reports for one or more user devices and/or servers. For example, at step 1520, distributed data processing computing platform 110 may generate and/or send one or more notifications and/or reports to one or more user devices (e.g., user computing device 120), and such notifications and/or reports may indicate and/or advise the user of user computing device 120 of the changes made to an insurance policy associated with the user of user computing device 120 based on adjusting the one or more user-specific insurance parameters based on the driver detection data. Additionally or alternatively, distributed data processing computing platform 110 may generate and/or send one or more notifications and/or reports to one or more servers associated with an insurer and/or other devices (e.g., data analyst console computing device 150), and such notifications and/or reports may indicate and/or advise the user of data analyst console computing device 150 of the changes made to an insurance policy associated with the user of user computing device 120 based on adjusting the one or more user-specific insurance parameters based on the driver detection data.

When analyzing telematics data captured by user mobile devices (e.g., smart phones, tablet computers, etc.) using various applications and/or various sensors (e.g., accelerometers, barometers, magnetometers, etc.), insurers may be faced with a critical question, namely, whether captured data is representative of driving behavior of an insured vehicle. In particular, some types of captured data may be considered "signal" data (which may, e.g., be representative of the driving behavior of the insured vehicle), while other types of data may be considered "noise" data (which might not, e.g., be representative of the driving behavior of the insured vehicle). For example, signal data may include:

a. Data associated with captured trips when a user was a driver in the insured car;

b. Data associated with captured trips when the user was a driver in another car;

c. Data associated with captured trips when the user was a passenger in the insured car.

In addition, noise data may include:

a. Data associated with captured trips when the user was a passenger in a different car;

b. Data associated with captured trips taken by the user using other modes of transportation (e.g., train, bus, boat, etc.).

c. Data associated with the user's walking activity preceding or following captured vehicular trips.

By developing and implementing systems, software, and techniques that better distinguish between the signal and the noise (and thus come closer to solving driver detection problems), an insurer may improve prediction of insurance loss (e.g., passenger trips may introduce noise in the relation between loss and mobile data). In addition, an insurer may increase fairness (e.g., by reducing the extent to which a policy holder is unfairly impacted by trips for which they are the passenger; e.g., 49% of all trips in the U.S. may be made in personal vehicles with more than one occupant). In addition, an insurer may improve customer experience (e.g., less manual interaction with a smartphone may be needed to ensure a representative log of the customer's driving experience; many mobile application users may reject one or more trips).

Some aspects of the disclosure relate to analyzing telematics data captured by user mobile devices using various applications and/or various sensors to determine whether captured data is representative of driving behavior of an insured vehicle. A computing platform having at least one processor, a communication interface, and memory may receive captured sensor data indicative of driving behavior of a person. Subsequently, the computing platform may apply one or more models to the captured sensor data to determine whether the person was a driver or a passenger during a trip associated with the driving behavior of the person (e.g., using one or more of the methods and/or other techniques described above). Based on determining that the person was the driver during the trip, the computing platform may output information indicating that the person was the driver during the trip. Alternatively, based on determining that the person was the passenger during the trip, the computing platform may output information indicating that the person was the passenger during the trip.

Algorithmic Paradigms for Driver Detection

In some instances, driver detection may be performed (e.g., by one or more insurer computer systems) using supervised learning algorithms that utilize labeled data. For example, with large quantities of labeled trip data, a computer system may develop a unique classifier (e.g., a driver "DNA" or a driver "fingerprint") for a particular driver. Such supervised learning may utilize a feature space that encompasses statistical, geospatial, dynamic, and spectral characteristics, etc., which may be derived from satellite positioning data (e.g., GPS data), accelerometer data, and/or other data. In addition, such supervised learning may utilize one or more models, such as GMM-UBM, GBM, RF, SVM, and/or other models. Further, the output of such supervised learning may be a confidence value representative of whether a trip is representative of a specific driver.

In some instances, utilizing supervised learning for driver detection may present one or more implementation challenges. For example, labeled data might need to be collected for each new driver. For instance, an introductory period may be provided during which a driver may be incentivized to interact with a mobile application that captures and/or collects the labeled data. In addition, semi-regular updates might be required to sustain the fidelity of the model. Another implementation challenge that may be associated with utilizing supervised learning for driver detection is that a unique model might need to be catalogued for each driver. In addition, features associated with the model might need to have high inter-driver variation, but low inter-trip variation for a single driver. For instance, an improper driver fingerprint model may remove abnormal but relevant behavior, such as bad weather, fatigue, road trips, and/or drunk driving. In some instances, a fleet of users who provide reliable trip labeling may be deployed to enable research and development of supervised learning models and techniques.

In some instances, driver detection may be performed (e.g., by one or more insurer computer systems) using semi-supervised learning algorithms that utilize unlabeled data. For example, a labeled data set may be formed by combining trips for a target driver with trips known to be from other drivers (e.g., "false trips"). Such an approach may provide relatively better performance compared to other predictive models for performing driver detection on an unlabeled data set.

In some instances, utilizing semi-supervised learning for driver detection may present one or more implementation challenges. For example, it may be difficult to account for the fact that some fraction of a target driver's data may reflect passenger trips. In some instances, research may be conducted using OBD device data as a proxy for mobile data, in order to eliminate passenger trips for the target driver. Another implementation challenge is that apparent performance of a semi-supervised model may be directly tied to how one selects "false trips." This may be especially true for features that have high geographical dependency.

In some instances, driver detection may be performed (e.g., by one or more insurer computer systems) using unsupervised learning algorithms. In addition, the use of unsupervised models may provide several key benefits: (1) unsupervised models may be generally applicable to all drivers; and (2) while labeled data might generally be required to validate the model, such data might not need to be collected from the target driver. In some instances, a fleet of users may be deployed who may provide reliable trip labeling to enable validation of unsupervised algorithms.

In some instances, unsupervised machine learning models may be successful in performing driver detection, although they also might be susceptible to the pitfall of removing abnormal but relevant trips. In one example of implementing unsupervised machine learning models, distance-based models may be used in which trips that deviate from a target driver's modal tendencies may be more likely to represent passenger trips. In another example of implementing unsupervised machine learning models, isolation forest models may be used in which passenger trips may be identified as those trips that are most readily separated from other trips by a decision tree. When using unsupervised machine learning models, advanced signal processing algorithms may be used to identify specific behaviors associated with driving.

In some instances, a consensus-driven approach may be used to improve unsupervised learning models. For example, the use of an ensemble of unsupervised models may be likely to improve accuracy and robustness of the detection algorithm. In particular, each model in the ensemble may address a different component of driver detection. Additionally, weak learners may be based on machine learning models or intelligent signal processing.

Estimating the Predictive Value of Driver Detection

In some instances, value may be measured in an entity's ability to predict loss. For example, a two-way lift chart may depict a new model's ability to classify risk groups relative to a simpler model. The desired features may include: (1) a large loss ratio disparity between predicted high and low risk groups, for the simpler model; and (2) a loss ratio near one, for the new model.

In some instances, theoretical value of driver detection may be measured by simulating passenger trip noise. For example, to understand the value of driver detection, loss models may be refit while simulating the introduction of passenger trips. The ratio of passenger trips may vary from driver to driver. A distribution for this ratio may be developed from a labeled data set.

In some instances, theoretical value of driver detection may be measured by comparing model performance against a traditional premium. In some instances, when comparing performance relative to a traditional premium, the benefit of adding driver detection may be modest.

In some instances, theoretical value of driver detection may be measured in terms of competitive edge. For example, a model fit to clean data may be clearly superior to a model fit to data that includes false trips. When assessing improvement relative to a telematics competitor, the benefit of adding driver detection may be significant.

In some instances, real value of driver detection may be measured. For example, the real value of driver detection may be assessed by refitting loss models after the application of driver detection. In some instances, models designed based on a small test set might not generalize well to a production population. In some instances, over-fit driver detection models may result in reduced capability to predict risk.

In some instances, driver detection may be important to improve the prediction of insurance loss, increase fairness in various applications, and improve customer experience. There may be a number of distinct paradigms for solving driver detection problems, each with its own advantages and pitfalls. In some instances, a consensus-based approach, combining individual-specific driver behaviors and generic driver behaviors, may be optimal. In the context of insurance loss prediction, robust and reliable driver detection may be a differentiator, but it may be important to demonstrate improvement in predictive capability at scale.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface; and
   memory storing computer-readable instructions that, when executed by the at least one processor, cause the computing platform to:
   receive, via the communication interface, from a first user computing device, sensor data captured by the first user computing device using one or more sensors built into the first user computing device during a trip in a vehicle;
   analyze the sensor data received from the first user computing device to determine whether a user of the first user computing device was a driver of the vehicle or a passenger of the vehicle during the trip in the vehicle,
   wherein analyzing the sensor data received from the first user computing device to determine whether the user of the first user computing device was a driver of the vehicle or a passenger of the vehicle during the trip in the vehicle comprises using a population-level model to analyze the sensor data received from the first user computing device, and
   wherein using the population-level model to analyze the sensor data received from the first user computing device comprises using a quadrant-detection model to determine a quadrant of the vehicle in which the user of the first user computing device was located during the trip in the vehicle;
   based on determining that the user of the first user computing device was a driver of the vehicle during the trip in the vehicle:
   generate driver-trip data comprising at least a portion of the sensor data received from the first user computing device and information identifying a time of the trip and one or more locations associated with the trip; and
   store, in at least one database maintained by the computing platform and accessible to one or more data analysis modules associated with the computing platform, the driver-trip data; and
   based on determining that the user of the first user computing device was a passenger of the vehicle during the trip in the vehicle:
   generate passenger-trip data comprising at least a portion of the sensor data received from the first user computing device and information identifying a time of the trip and one or more locations associated with the trip; and
   store, in at least one database maintained by the computing platform and accessible to one or more data analysis modules associated with the computing platform, the passenger-trip data.

2. The computing platform of claim 1, wherein receiving the sensor data captured by the first user computing device using the one or more sensors built into the first user computing device comprises receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device.

3. The computing platform of claim 1, wherein analyzing the sensor data received from the first user computing device to determine whether the user of the first user computing device was a driver of the vehicle or a passenger of the vehicle during the trip in the vehicle comprises using one or more user-personalized driver signature models to analyze the sensor data received from the first user computing device.

4. The computing platform of claim 1, wherein analyzing the sensor data received from the first user computing device to determine whether the user of the first user computing device was a driver of the vehicle or a passenger of the vehicle during the trip in the vehicle comprises using a gyroscope module that processes the sensor data received from the first user computing device and determines whether the user of the first user computing device exited the vehicle on a left side of the vehicle or a right side of the vehicle.

5. The computing platform of claim 1, wherein analyzing the sensor data received from the first user computing device to determine whether the user of the first user computing device was a driver of the vehicle or a passenger of the vehicle during the trip in the vehicle comprises using a phone-handling module that processes the sensor data received from the first user computing device and determines an amount of phone handling that occurred during the trip in the vehicle.

6. The computing platform of claim 1, wherein analyzing the sensor data received from the first user computing device to determine whether the user of the first user computing device was a driver of the vehicle or a passenger of the vehicle during the trip in the vehicle comprises using a car tracker module that processes the sensor data received from the first user computing device and evaluates a distance between a starting point of a current trip and an ending point of a previous trip.

7. The computing platform of claim 1, wherein analyzing the sensor data received from the first user computing device to determine whether the user of the first user computing device was a driver of the vehicle or a passenger of the vehicle during the trip in the vehicle comprises evaluating a vertical acceleration profile experienced by the vehicle during the trip based on the sensor data received from the first user computing device.

8. The computing platform of claim 1, wherein the memory stores additional computer-readable instructions that, when executed by the at least one processor, cause the computing platform to:
based on analyzing the sensor data received from the first user computing device, generate a notification indicating whether the user of the first user computing device was determined to be a driver of the vehicle or a passenger of the vehicle during the trip in the vehicle; and
send, via the communication interface, to the first user computing device, the notification indicating whether the user of the first user computing device was determined to be a driver of the vehicle or a passenger of the vehicle during the trip in the vehicle, wherein sending the notification indicating whether the user of the first user computing device was determined to be a driver of the vehicle or a passenger of the vehicle during the trip in the vehicle to the first user computing device causes the first user computing device to prompt the first user associated with the first user computing device to confirm whether the user of the first user computing device was a driver of the vehicle or a passenger of the vehicle during the trip in the vehicle.

9. The computing platform of claim 1, wherein the memory stores additional computer-readable instructions that, when executed by the at least one processor, cause the computing platform to:
based on analyzing the sensor data received from the first user computing device, send driver detection data indicating whether the user of the first user computing device was determined to be a driver of the vehicle or a passenger of the vehicle during the trip in the vehicle to a data analyst console computing device, wherein sending the driver detection data indicating whether the user of the first user computing device was determined to be a driver of the vehicle or a passenger of the vehicle during the trip in the vehicle to the data analyst console computing device causes the data analyst console computing device to wake and display detection information corresponding to the driver detection data indicating whether the user of the first user computing device was determined to be a driver of the vehicle or a passenger of the vehicle during the trip in the vehicle.

10. A method, comprising:
at a computing platform comprising at least one processor, a communication interface, and memory:
receiving, by the at least one processor, via the communication interface, from a first user computing device, sensor data captured by the first user computing device using one or more sensors built into the first user computing device during a trip in a vehicle;
analyzing, by the at least one processor, the sensor data received from the first user computing device to determine whether a user of the first user computing device was a driver of the vehicle or a passenger of the vehicle during the trip in the vehicle,
wherein analyzing the sensor data received from the first user computing device to determine whether the user of the first user computing device was a driver of the vehicle or a passenger of the vehicle during the trip in the vehicle comprises using a population-level model to analyze the sensor data received from the first user computing device, and
wherein using the population-level model to analyze the sensor data received from the first user computing device comprises using a quadrant-detection model to determine a quadrant of the vehicle in which the user of the first user computing device was located during the trip in the vehicle;
based on determining that the user of the first user computing device was a driver of the vehicle during the trip in the vehicle:
generating, by the at least one processor, driver-trip data comprising at least a portion of the sensor data received from the first user computing device and information identifying a time of the trip and one or more locations associated with the trip; and
storing, by the at least one processor, in at least one database maintained by the computing platform and accessible to one or more data analysis modules associated with the computing platform, the driver-trip data; and
based on determining that the user of the first user computing device was a passenger of the vehicle during the trip in the vehicle:
generating, by the at least one processor, passenger-trip data comprising at least a portion of the sensor data received from the first user computing device and information identifying a time of the trip and one or more locations associated with the trip; and storing, by the at least one processor, in at least one database maintained by the computing platform and accessible to one or more data analysis modules associated with the computing platform, the passenger-trip data.

11. The method of claim 10, wherein receiving the sensor data captured by the first user computing device using the one or more sensors built into the first user computing device comprises receiving data captured by one or more of an accelerometer, a gyroscope, a magnetometer, a barometer, a gravitometer, a proximity sensor, an ambient light sensor, an ambient temperature sensor, an orientation sensor, a pedometer, an altimeter, a satellite positioning sensor, or an activity recognition sensor built into the first user computing device.

12. The method of claim 10, wherein analyzing the sensor data received from the first user computing device to determine whether the user of the first user computing device was a driver of the vehicle or a passenger of the vehicle during the trip in the vehicle comprises using one or more user-personalized driver signature models to analyze the sensor data received from the first user computing device.

13. The method of claim 10, wherein analyzing the sensor data received from the first user computing device to determine whether the user of the first user computing device was a driver of the vehicle or a passenger of the vehicle during the trip in the vehicle comprises using a gyroscope module that processes the sensor data received from the first user computing device and determines whether the user of the first user computing device exited the vehicle on a left side of the vehicle or a right side of the vehicle.

14. The method of claim 10, wherein analyzing the sensor data received from the first user computing device to determine whether the user of the first user computing device was a driver of the vehicle or a passenger of the vehicle during the trip in the vehicle comprises using a phone-handling module that processes the sensor data received from the first user computing device and determines an amount of phone handling that occurred during the trip in the vehicle.

15. The method of claim 10, wherein analyzing the sensor data received from the first user computing device to determine whether the user of the first user computing device was a driver of the vehicle or a passenger of the vehicle during the trip in the vehicle comprises using a car tracker module that processes the sensor data received from the first user computing device and evaluates a distance between a starting point of a current trip and an ending point of a previous trip.

16. The method of claim 10, wherein analyzing the sensor data received from the first user computing device to determine whether the user of the first user computing device was a driver of the vehicle or a passenger of the vehicle during the trip in the vehicle comprises evaluating a vertical acceleration profile experienced by the vehicle during the trip based on the sensor data received from the first user computing device.

17. The method of claim 10, comprising:

based on analyzing the sensor data received from the first user computing device, generating, by the at least one processor, a notification indicating whether the user of the first user computing device was determined to be a driver of the vehicle or a passenger of the vehicle during the trip in the vehicle; and sending, by the at least one processor, via the communication interface, to the first user computing device, the notification indicating whether the user of the first user computing device was determined to be a driver of the vehicle or a passenger of the vehicle during the trip in the vehicle, wherein sending the notification indicating whether the user of the first user computing device was determined to be a driver of the vehicle or a passenger of the vehicle during the trip in the vehicle to the first user computing device causes the first user computing device to prompt the first user associated with the first user computing device to confirm whether the user of the first user computing device was a driver of the vehicle or a passenger of the vehicle during the trip in the vehicle.

18. One or more non-transitory computer-readable media storing instructions that, when executed by a computing platform comprising at least one processor, a communication interface, and memory, cause the computing platform to:

receive, via the communication interface, from a first user computing device, sensor data captured by the first user computing device using one or more sensors built into the first user computing device during a trip in a vehicle;

analyze the sensor data received from the first user computing device to determine whether a user of the first user computing device was a driver of the vehicle or a passenger of the vehicle during the trip in the vehicle, wherein analyzing the sensor data received from the first user computing device to determine whether the user of the first user computing device was a driver of the vehicle or a passenger of the vehicle during the trip in the vehicle comprises using a population-level model to analyze the sensor data received from the first user computing device, and wherein using the population-level model to analyze the sensor data received from the first user computing device comprises using a quadrant-detection model to determine a quadrant of the vehicle in which the user of the first user computing device was located during the trip in the vehicle;

based on determining that the user of the first user computing device was a driver of the vehicle during the trip in the vehicle:

generate driver-trip data comprising at least a portion of the sensor data received from the first user computing device and information identifying a time of the trip and one or more locations associated with the trip; and store, in at least one database maintained by the computing platform and accessible to one or more data analysis modules associated with the computing platform, the driver-trip data; and based on determining that the user of the first user computing device was a passenger of the vehicle during the trip in the vehicle:

generate passenger-trip data comprising at least a portion of the sensor data received from the first user computing device and information identifying a time of the trip and one or more locations associated with the trip; and store, in at least one database maintained by the computing platform and accessible to one or more data analysis modules associated with the computing platform, the passenger-trip data.

19. The one or more non-transitory computer-readable media of claim 18, wherein analyzing the sensor data received from the first user computing device to determine whether the user of the first user computing device was a driver of the vehicle or a passenger of the vehicle during the trip in the vehicle comprises using a car tracker module that processes the sensor data received from the first user computing device and evaluates a distance between a starting point of a current trip and an ending point of a previous trip.

20. The one or more non-transitory computer-readable media of claim 18, wherein analyzing the sensor data received from the first user computing device to determine whether the user of the first user computing device was a driver of the vehicle or a passenger of the vehicle during the trip in the vehicle comprises evaluating a vertical acceleration profile experienced by the vehicle during the trip based on the sensor data received from the first user computing device.

* * * * *